(12) United States Patent
Inoue

(10) Patent No.: US 10,689,065 B2
(45) Date of Patent: Jun. 23, 2020

(54) BICYCLE PEDAL AND BICYCLE CLEAT

(71) Applicant: SHIMANO INC., Sakai (JP)

(72) Inventor: Akira Inoue, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 16/145,197

(22) Filed: Sep. 28, 2018

(65) Prior Publication Data
US 2020/0102049 A1    Apr. 2, 2020

(51) Int. Cl.
*B62M 3/00*     (2006.01)
*B62M 3/08*     (2006.01)

(52) U.S. Cl.
CPC .................................. *B62M 3/086* (2013.01)

(58) Field of Classification Search
CPC ............ B62M 3/08; B62M 3/086; A43B 5/14
USPC .......................................................... 36/131
See application file for complete search history.

(56) References Cited

U.S. PATENT DOCUMENTS

| | | | | |
|---|---|---|---|---|
| 4,932,287 A * | 6/1990 | Ramos | .................... | B62M 3/086 36/131 |
| 5,115,692 A * | 5/1992 | Nagano | .................. | B62M 3/086 280/11.31 |
| 5,131,291 A * | 7/1992 | Beyl | ......................... | A43B 5/14 36/131 |
| 5,505,111 A * | 4/1996 | Nagano | .................. | B62M 3/086 36/131 |
| 5,634,383 A | 6/1997 | Lin | | |
| 5,992,266 A * | 11/1999 | Heim | ...................... | B62M 3/086 74/594.4 |
| 6,076,427 A * | 6/2000 | Nutto | ..................... | B62M 3/086 74/594.4 |
| 6,089,122 A | 7/2000 | Nagano | | |
| 6,324,941 B1 * | 12/2001 | Ho | ......................... | B62M 3/086 74/594.4 |
| 6,845,688 B2 * | 1/2005 | Muraoka | ............... | B62M 3/086 36/131 |
| 8,857,292 B2 * | 10/2014 | Bryne | .................... | B62M 3/086 74/594.6 |
| 9,021,918 B2 * | 5/2015 | Inoue | ..................... | B62M 3/086 74/594.6 |
| 9,056,652 B2 * | 6/2015 | Inoue | ..................... | B62M 3/086 |
| 9,469,372 B2 * | 10/2016 | Inoue | ..................... | B62M 3/086 |
| 10,000,254 B2 * | 6/2018 | Inoue | ..................... | B62M 3/086 |
| 10,040,507 B2 * | 8/2018 | Coderre | ................. | B62M 3/086 |

(Continued)

FOREIGN PATENT DOCUMENTS

DE    102004049510 A1 *   4/2006   ............ B62M 3/086

OTHER PUBLICATIONS

Machine translation of DE 102004049510 A1 obtained on Dec. 17, 2019.*

*Primary Examiner* — Adam D Rogers
(74) *Attorney, Agent, or Firm* — Mori & Ward, LLP

(57) ABSTRACT

A bicycle pedal comprises a pedal body, a first engagement member, and a biasing member. The first engagement member is movably coupled to the pedal body between a clamping position and a releasing position. The first engagement member is pivotable about a pivot axis in a pivot direction and slidable in a slide direction between the clamping position and the releasing position. The slide direction is different from the pivot direction. The biasing member biases the first engagement member toward the clamping position.

27 Claims, 31 Drawing Sheets

(56) References Cited

U.S. PATENT DOCUMENTS

2005/0011305 A1\* 1/2005 Menayan ............... B62M 3/086
74/594.6

\* cited by examiner

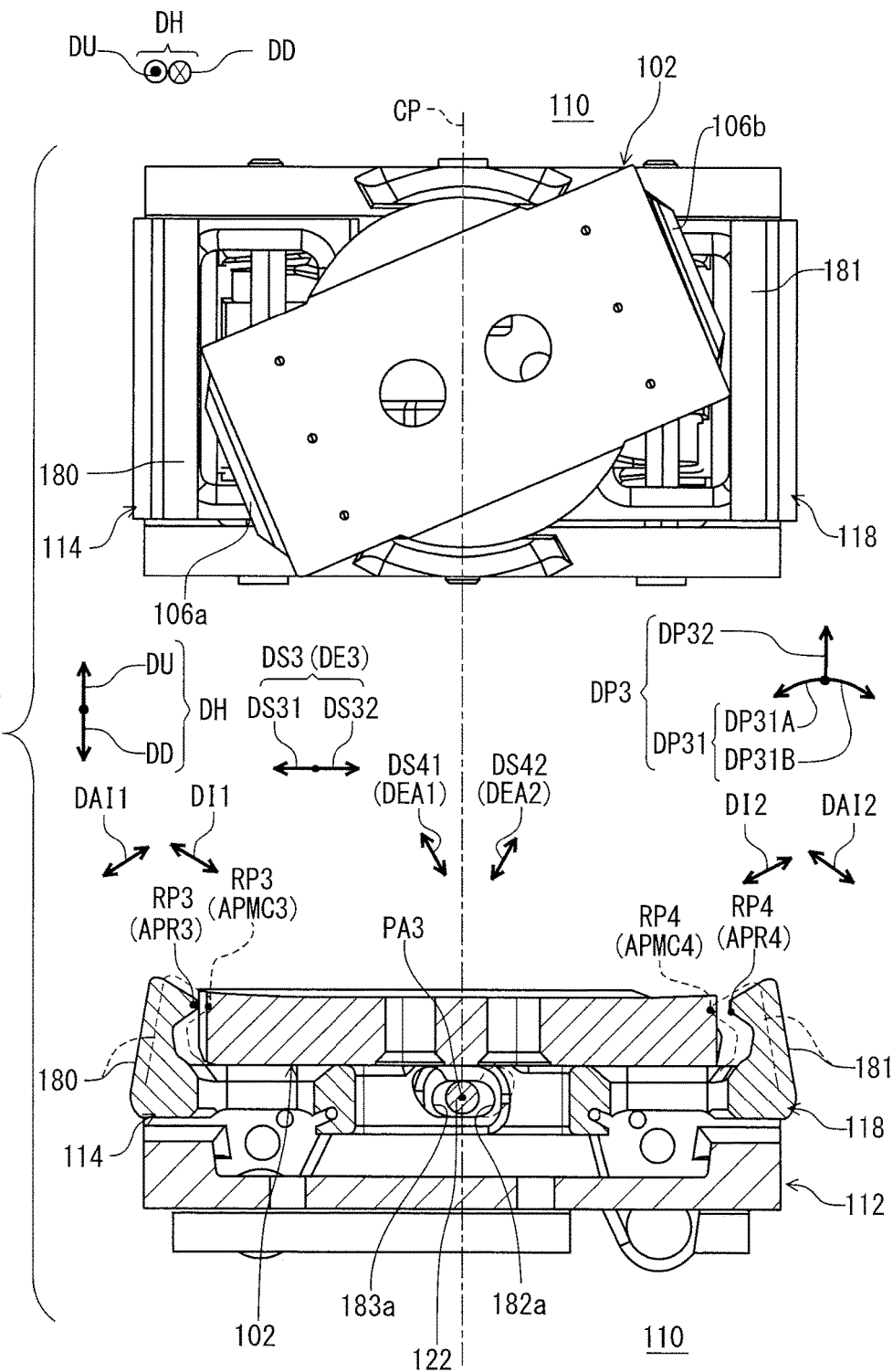

BICYCLE PEDAL AND BICYCLE CLEAT

BACKGROUND OF THE INVENTION

Field of the Invention

The present invention relates to a bicycle pedal and a bicycle cleat.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Bicycle components that have been extensively redesigned are a bicycle pedal and a bicycle cleat.

SUMMARY OF THE INVENTION

In accordance with a first aspect of the present invention, a bicycle pedal comprises a pedal body, a first engagement member, and a biasing member. The first engagement member is movably coupled to the pedal body between a clamping position and a releasing position. The first engagement member is pivotable about a pivot axis in a pivot direction and slidable in a slide direction between the clamping position and the releasing position. The slide direction is different from the pivot direction. The biasing member biases the first engagement member toward the clamping position.

With the bicycle pedal according to the first aspect, it is possible to prevent superfluous twist of the biasing member to decrease superfluous repulsive force from the biasing member when the cleat is mounted onto and released from the bicycle pedal. Accordingly, it is possible to smoothly mount a bicycle cleat onto the bicycle pedal and release the bicycle cleat from the bicycle pedal, because the first engagement member is pivotable and slidable.

In accordance with a second aspect of the present invention, the bicycle pedal according to the first aspect is configured so that the first engagement member slides in the slide direction after pivoting in the pivot direction during a releasing operation in which the first engagement member moves from the clamping position toward the releasing position.

With the bicycle pedal according to the second aspect, it is possible to further smoothly release the bicycle cleat from the bicycle pedal, because the first engagement member slides after pivoting.

In accordance with a third aspect of the present invention, the bicycle pedal according to the first or second aspect is configured so that the first engagement member pivots in the pivot direction after sliding in the slide direction during a clamping operation in which the first engagement member moves from the releasing position toward the clamping position.

With the bicycle pedal according to the third aspect, it is possible to further smoothly mount a bicycle cleat onto the bicycle pedal, because the first engagement member pivots after sliding.

In accordance with a fourth aspect of the present invention, the bicycle pedal according to any one of the first to third aspects is configured so that the pedal body includes a pivot axle that defines the pivot axis. The first engagement member has an opening to which the pivot axle is disposed.

With the bicycle pedal according to the fourth aspect, it is possible for the first engagement member to pivot with respect to the pedal body.

In accordance with a fifth aspect of the present invention, the bicycle pedal according to any one of the first to fourth aspects is configured so that an opening of the first engagement member is elongated at least in the slide direction after the first engagement member pivots in the pivot direction.

With the bicycle pedal according to the fifth aspect, it is possible for the first engagement member to slide in the slide direction.

In accordance with a sixth aspect of the present invention, the bicycle pedal according to the any one of the fourth to fifth aspects is configured so that an outer surface of the pivot axle is a cylindrical surface.

With the bicycle pedal according to the sixth aspect, it is possible for the first engagement member to smoothly pivot with respect to the pedal body.

In accordance with a seventh aspect of the present invention, the bicycle pedal according to any one of the first to sixth aspects is configured so that the pedal body includes a restriction member that prevents the first engagement member from sliding in the slide direction during a pivotal movement of the first engagement member in the pivot direction.

With the bicycle pedal according to the seventh aspect, it is possible for the first engagement member to accurately pivot with respect to the pedal body.

In accordance with an eighth aspect of the present invention, the bicycle pedal according to the seventh aspect is configured so that the first engagement member is configured to abut against the restriction member such that the first engagement member does not slide in the slide direction during the pivotal movement of the first engagement member in the pivot direction.

With the bicycle pedal according to the eighth aspect, it is possible to prevent the first engagement member from sliding in the slide direction during the pivotal movement.

In accordance with a ninth aspect of the present invention, the bicycle pedal according to any one of the first to eighth aspects is configured so that the first engagement member has a first contact portion. The restriction member has a second contact portion to contact the first contact portion during a pivotal movement of the first engagement member in the pivot direction. At least one of the first contact portion and the second contact portion has curvature.

With the bicycle pedal according to the ninth aspect, it is possible for the first engagement member to smoothly pivot with respect to the pedal body.

In accordance with a tenth aspect of the present invention, the bicycle pedal according to any one of the first to ninth aspects further comprises a second engagement member coupled to the pedal body.

With the bicycle pedal according to the tenth aspect, it is possible to securely engage a bicycle cleat with the bicycle pedal via the first engagement member and the second engagement member.

In accordance with an eleventh aspect of the present invention, a bicycle pedal comprises a pedal body, a first engagement member, and a biasing member. The pedal body includes a pivot axle that defines a pivot axis. The first engagement member is pivotally coupled to the pedal body about the pivot axis between a clamping position and a releasing position. The first engagement member has an opening to which the pivot axle is disposed. The opening of the first engagement member is elongated in an elongating direction. The biasing member biases the first engagement member toward the clamping position.

With the bicycle pedal according to the eleventh aspect, it is possible for the first engagement member to move in the elongating direction, thereby it is possible to prevent superfluous twist of the biasing member to decrease superfluous repulsive force from the biasing member when the cleat is mounted onto and released from the bicycle pedal. Accordingly, it is possible to smoothly mount a bicycle cleat onto the bicycle pedal and release the bicycle cleat from the bicycle pedal.

In accordance with a twelfth aspect of the present invention, the bicycle pedal according to any one of the first to tenth aspects is configured so that the first engagement member has a cleat engagement surface. The pivot direction is a bidirectional direction including a first pivot direction and a second pivot direction opposite to the first pivot direction. The cleat engagement surface is configured to move apart from the pedal body in the first pivot direction when the first engagement member is in the clamping position.

With the bicycle pedal according to the twelfth aspect, it is possible for the cleat to engage with the first engagement member even though the cleat moves apart from the pedal body without being twisted.

In accordance with a thirteenth aspect of the present invention, the bicycle pedal according to the twelfth aspect is configured so that the first engagement member at least slides in the slide direction during a releasing operation in which the first engagement member moves from the clamping position toward another releasing position.

With the bicycle pedal according to the thirteenth aspect, it further facilitates releasing a bicycle cleat from the bicycle pedal.

In accordance with a fourteenth aspect of the present invention, the bicycle pedal according to any one of the fifth to tenth aspects is configured so that the opening of the first engagement member is elongated in an additional slide direction that is different from the slide direction.

With the bicycle pedal according to the fourteenth aspect, it is possible to prevent the first engagement member from sliding in the slide direction during a pivotal movement of the first engagement member in the pivot direction.

In accordance with a fifteenth aspect of the present invention, the bicycle pedal according to the twelfth or thirteenth aspect is configured so that the opening of the first engagement member is elongated in an additional slide direction that is different from the slide direction.

With the bicycle pedal according to the fifteenth aspect, it is possible to prevent the first engagement member from sliding in the slide direction during a pivotal movement of the first engagement member in the pivot direction.

In accordance with a sixteenth aspect of the present invention, the bicycle pedal according to the fifteenth aspect is configured so that the additional slide direction extends toward the cleat engagement surface.

With the bicycle pedal according to the sixteenth aspect, it is possible for a user to easily mount a bicycle cleat onto the pedal body even though there is some mud on the bottom of the bicycle cleat.

In accordance with a seventeenth aspect of the present invention, the bicycle pedal according to any one of the twelfth to sixteenth aspects is configured so that the first engagement member has a cleat receiving surface inclined toward the pedal body in an inclination direction that is slanted from the slide direction.

With the bicycle pedal according to the seventeenth aspect, it facilitates engaging a bicycle cleat onto the bicycle pedal.

In accordance with an eighteenth aspect of the present invention, the bicycle pedal according to any one of the twelfth, thirteenth, and fifteenth to seventeenth aspects is configured so that the cleat engagement surface faces toward the pedal body and is inclined toward the pedal body in an additional inclination direction that is slanted from the slide direction when viewed in a pivot axial direction along the pivot axis.

With the bicycle pedal according to the eighteenth aspect, it facilitates engaging a bicycle cleat with the cleat engagement surface of the first engagement member.

In accordance with a nineteenth aspect of the present invention, the bicycle pedal according to any one of the first to eighteenth aspects is configured so that the biasing member has a biasing body, a first biasing end, and a second biasing end opposite to the first biasing end with respect to the biasing body. The first biasing end contacts the first engagement member. The second biasing end contacts the pedal body. The biasing body is coupled to the pedal body such that the biasing body is immovable away from the pivot axle in the slide direction while the first engagement member slides from the clamping position toward the releasing position in the slide direction.

With the bicycle pedal according to the nineteenth aspect, it is possible to securely attach the biasing member to the pedal body, and to apply the biasing force to the first engagement member effectively.

In accordance with a twentieth aspect of the present invention, the bicycle pedal according to any one of the first to nineteenth aspects further comprises a pedal axle having a pedal axis.

With the bicycle pedal according to the twentieth aspect, it is possible for the pedal body to rotate around the pedal axis.

In accordance with a twenty-first aspect of the present invention, the bicycle pedal according to the twentieth aspect is configured so that the slide direction is parallel to the pedal axis.

With the bicycle pedal according to the twenty-first aspect, it is possible to move the engagement member along the pedal axis to release the bicycle cleat from the bicycle pedal.

In accordance with a twenty-second aspect of the present invention, the bicycle pedal according to the twentieth aspect is configured so that the slide direction is perpendicular to the pedal axis.

With the bicycle pedal according to the twenty-second aspect, it is possible to move the engagement member in a direction perpendicular to the pedal axis to release the bicycle cleat from the bicycle pedal.

In accordance with a twenty-third aspect of the present invention, the bicycle pedal according to the any one of the tenth, twelfth, thirteenth, and fifteenth to twenty-second aspects is configured so that the second engagement member is pivotally coupled to the pedal body about the pivot axis between an additional clamping position and an additional releasing position.

With the bicycle pedal according to the twenty-third aspect, it is possible to simplify a structure of the bicycle pedal to reduce the manufacturing cost when two engagement members are pivotally coupled to the pedal body.

In accordance with a twenty-fourth aspect of the present invention, the bicycle pedal according to the any one of the tenth, twelfth, thirteenth, and fifteenth to twenty-third aspects is configured so that the first engagement member has a cleat engagement portion. The second engagement member has an additional cleat engagement portion. The cleat engagement portion and the additional cleat engagement portion are symmetrically disposed with respect to the pivot axis.

With the bicycle pedal according to the twenty-fourth aspect, it is possible for the first engagement portion and the second engagement portion to hold a bicycle cleat on the pedal body.

In accordance with a twenty-fifth aspect of the present invention, the bicycle pedal according to the twenty-fourth aspect is configured so that a shape of the cleat engagement portion and a shape of the additional cleat engagement portion are substantially symmetrical with respect to the pivot axis.

With the bicycle pedal according to the twenty-fifth aspect, it is possible to simplify a structure of the bicycle pedal.

In accordance with a twenty-sixth aspect of the present invention, the bicycle pedal according to the twenty-fourth or twenty-fifth aspect is configured so that the second engagement member is pivotable in the pivot direction and slidable in the slide direction between the additional clamping position and the additional releasing position.

With the bicycle pedal according to the twenty-sixth aspect, it is possible for the second engagement member to move opposite to the first engagement member with respect to the pivot axis.

In accordance with a twenty-seventh aspect of the present invention, a bicycle cleat comprises a main body, a first pedal engagement portion, and a second pedal engagement portion. The main body is configured to be attached to a sole of a bicycle shoe. The main body has a first end portion and a second end portion opposite to the first end portion in a first direction. The first pedal engagement portion is provided on the first end portion of the main body and extends in a second direction substantially perpendicular to the first direction. The second pedal engagement portion is provided on the second end portion of the main body and extends in the second direction. A ratio of a first length of the bicycle cleat in the first direction to a second length of the bicycle cleat in the second direction is more than or equal to 4/3 and less than or equal to 2.

With the bicycle pedal according to the twenty-seventh aspect, it is possible for the bicycle cleat to be smoothly attached to the pedal and detached from the pedal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 31 includes a top view and a cross-sectional view of the bicycle pedal illustrated in FIG. 18 for explaining a step-out operation of the bicycle pedal.

DESCRIPTION OF THE EMBODIMENTS

Figure 1:
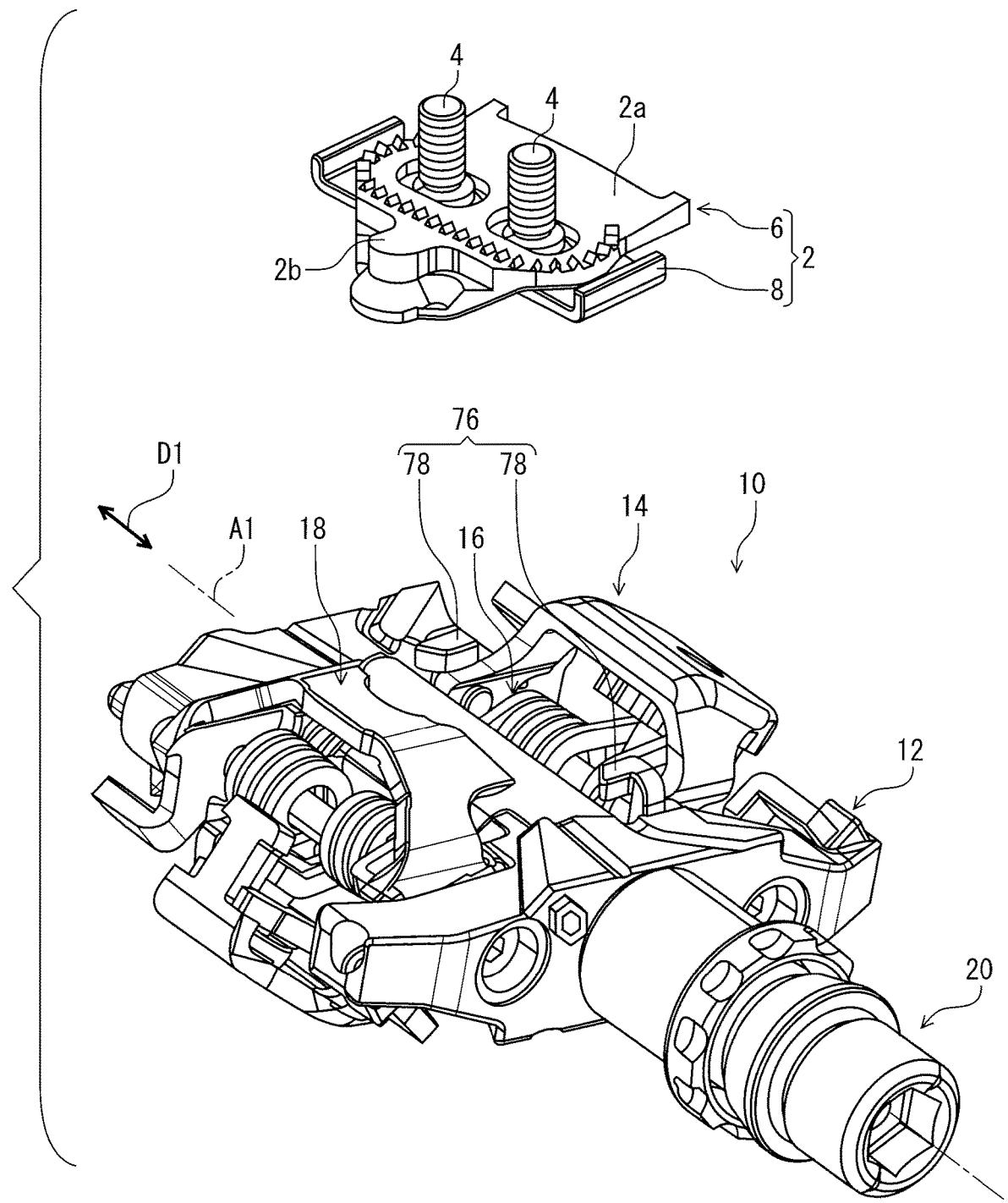
FIG. 1 is a perspective view of a bicycle pedal in accordance with a first embodiment, with a bicycle cleat.

The embodiment(s) will now be described with reference to the accompanying drawings, wherein like reference numerals designate corresponding or identical elements throughout the various drawings.

First Embodiment

Figure 2:
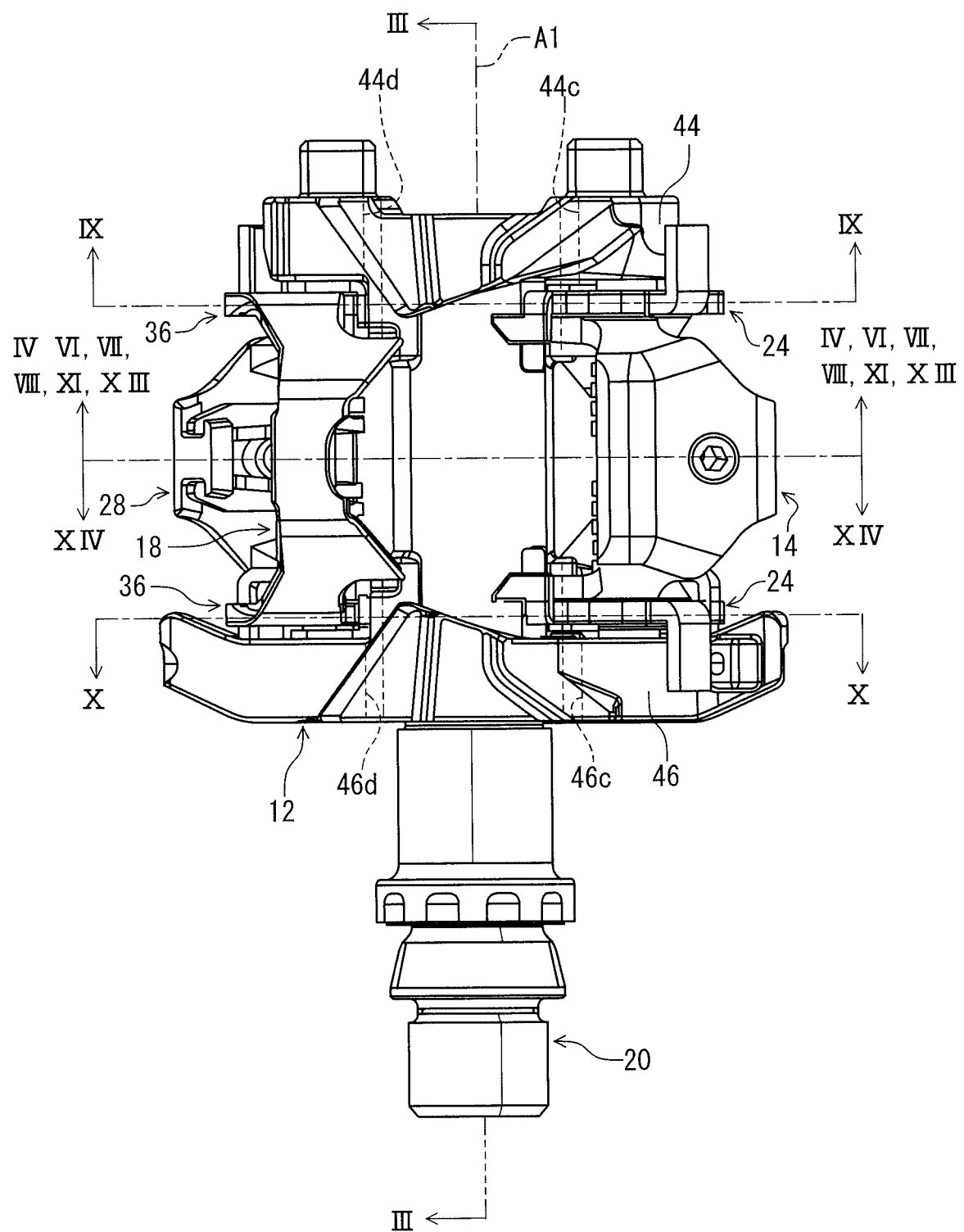
FIG. 2 is a top view of the bicycle pedal illustrated in FIG. 1.

Referring initially to FIGS. 1 and 2, a bicycle pedal 10 in accordance with the first embodiment comprises a pedal body 12, a first engagement member 14, and a biasing member 16. The bicycle pedal 10 further comprises a second engagement member 18. The bicycle pedal 10 further comprises a pedal axle 20 having a pedal axis A1. The pedal axle 20 is configured to be secured to a crank arm (not shown). The pedal body 12 is rotatably supported on the pedal axle 20. The pedal body 12 is rotatable relative to the pedal axle 20 about the pedal axis A1. The first engagement member 14 is coupled to the pedal body 12. The second engagement member 18 is coupled to the pedal body 12. The second engagement member 18 is configured to clamp a bicycle cleat 2 together with the first engagement member 14. The bicycle cleat 2 is attached to a sole of a shoe (not shown) using bolts 4. The bicycle cleat 2 includes a main body 6 and an attachment plate 8.

In the illustrated embodiment, the first engagement member 14 is a rear engagement member configured to engage with a rear end 2a of the bicycle cleat 2. The second engagement member 18 is a front engagement member configured to engage with a front end 2b of the bicycle cleat 2. However, the first engagement member 14 can be a front engagement member, and the second engagement member 18 can be a rear engagement member if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle (not shown) with facing a handlebar (not shown). Accordingly, these terms, as utilized to describe the bicycle pedal 10, should be interpreted relative to the bicycle equipped with the bicycle pedal 10 as used in an upright riding position on a horizontal surface.

Figure 3:
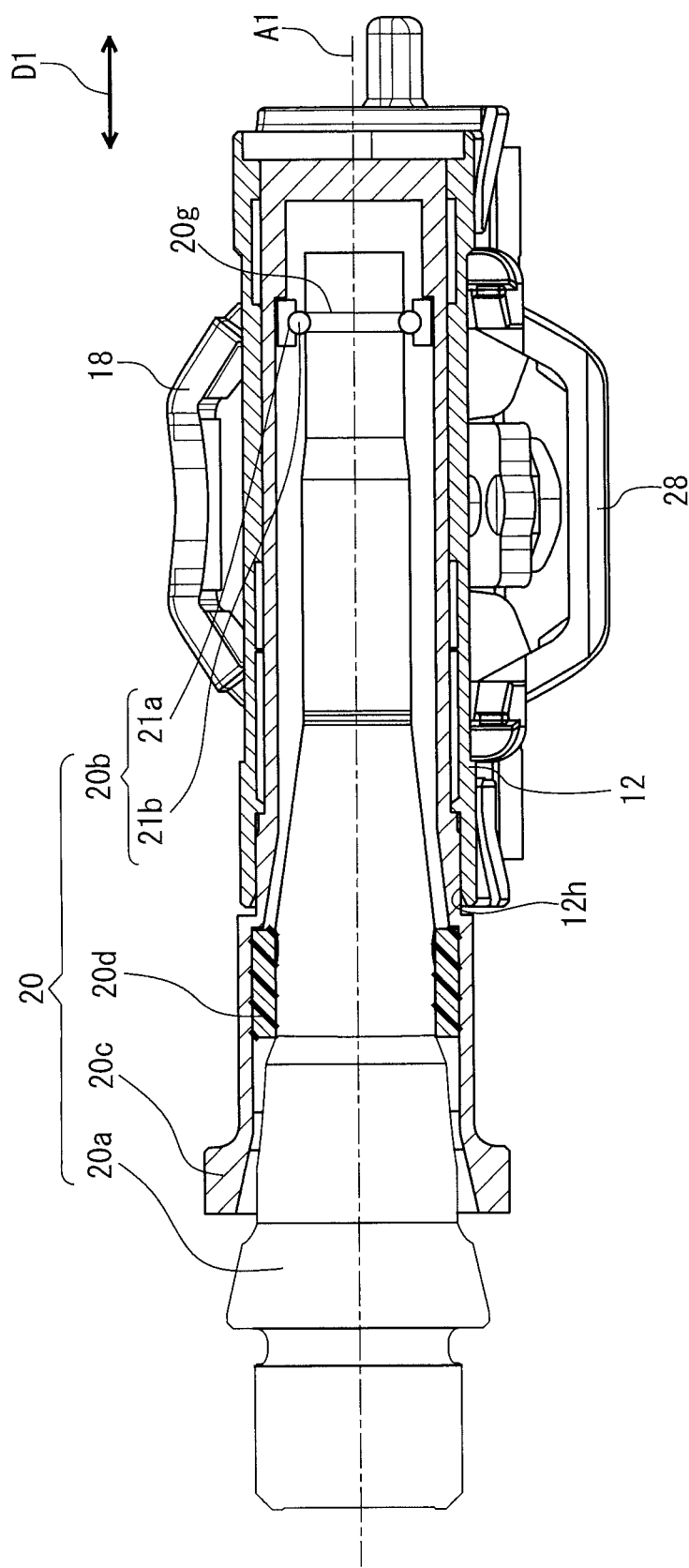
FIG. 3 is a cross-sectional view of the bicycle pedal taken along line of FIG. 2.

As seen in FIG. 3, the pedal axle 20 comprises an axle shaft 20a, a bearing unit 20b, a cylinder unit 20c, and a bush 20d. The axle shaft 20a has a center axis that defines the pedal axis A1. The axle shaft 20a extends in an axial direction D1 along the pedal axis A1. The bearing unit 20b includes an outer race 21a and bearing balls 21b. The bearing unit 20b does not include an inner race. Instead, the axle shaft 20a is inserted into the bearing unit 20b. More specifically, the bearing balls 21b are sandwiched between the axle shaft 20a and the outer race 21a. The axle shaft 20a has a groove 20g around the pedal axis A1. The groove 20g is configured to guide the bearing balls 21b around the groove 20g. The groove 20g restrains the bearing balls 21b from moving in an axial direction D1 along the pedal axis A1. The number of the bearing balls 21b is relatively small and preferably six or seven. The cylinder unit 20c receives the axle shaft 20a, the bearing unit 20b, and the bush 20d. The bush 20d supports the axle shaft 20a to stabilize the pedal axis A1. The bush 20d does not interfere with a rotation of the axle shaft 20a with respect to the cylinder unit 20c. The pedal axle 20 is assembled as follows. The bearing balls 21b are inserted between the outer race 21a and the groove 20g of the axle shaft 20a in a state where a rotation axis of the bearing unit 20b is deviated from the center axis (the pedal axis A1) of the axle shaft 20a. Then a retainer (not shown) of the bearing unit 20b is inserted between the bearing balls 21b to adjust the rotation axis of the bearing unit 20b to the pedal axis A1. Then, the axle shaft 20a and the bearing unit 20b are integrally inserted into the cylinder unit 20c such that the outer race 21a of the bearing unit 20b is press-fitted to an inner surface of the cylinder unit 20c. Finally, the bush 20d is inserted between the axle shaft 20a and the cylinder unit 20c. The pedal axle 20, which is assembled as described above, is inserted into a hole 12h of the pedal body 12 such that the cylinder unit 20c is press-fitted to the hole of the pedal body 12. The cylinder unit 20c can be omitted from the pedal axle 20 and the cylinder unit 20c can be integrally formed with the pedal body 12.

Figure 4:
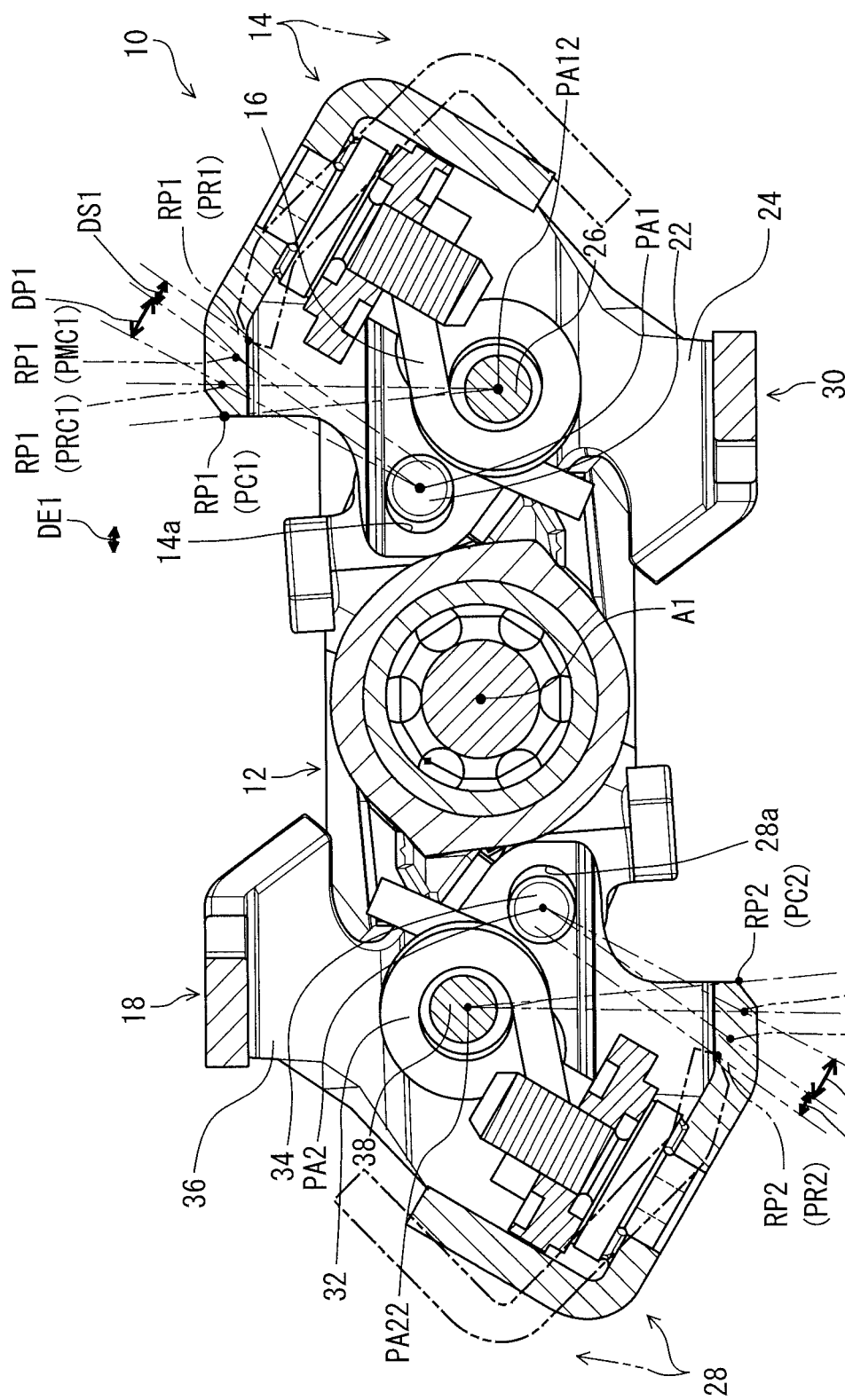
FIG. 4 is a cross-sectional view of the bicycle pedal taken along line IV-IV of FIG. 2.
Figure 5:
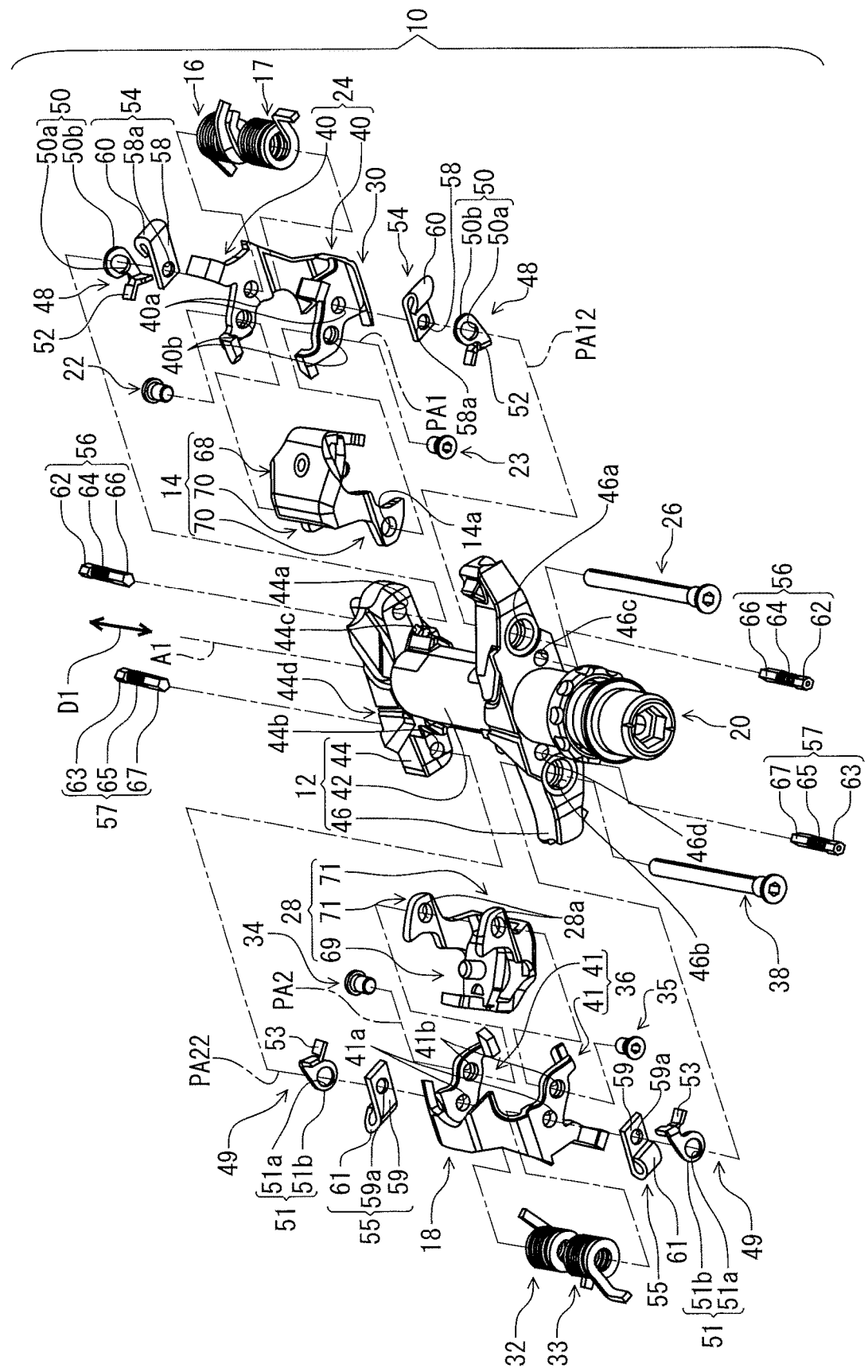
FIG. 5 is an exploded perspective view of the bicycle pedal illustrated in FIG. 2.

As seen in FIG. 4, the first engagement member 14 is movably coupled to the pedal body 12 between a clamping position PC1 and a releasing position PR1. The first engagement member 14 is positioned at the clamping position PC1 in a state where the bicycle cleat 2 (FIG. 1) is clamped by the first engagement member 14. The first engagement member 14 is positioned at the releasing position PR1 in the course of releasing the bicycle cleat 2 from the bicycle pedal 10. The first engagement member 14 returns to the clamping position PC1 after the bicycle cleat 2 (FIG. 1) is released from the bicycle pedal 10. In the illustrated embodiment, the first engagement member 14 is pivotable about a pivot axis PA1 in a pivot direction DP1 and slidable in a slide direction DS1 between the clamping position PC1 and the releasing position PR1. The pedal body 12 includes a pivot axle 22 that defines the pivot axis PA1. More specifically, as seen in FIG. 5, the pedal body further includes a secondary pivot axle 23 that also defines the pivot axis PA1. An outer surface of the pivot axle 22 is a cylindrical surface. An outer surface of the secondary pivot axle 23 is a cylindrical surface. The pivot axis PA1 is defined as center axes of the pivot axle 22 and the secondary pivot axle 23. The pivot axle 22 and the secondary pivot axle 23 are configured to pivotably support the first engagement member 14 about the pivot axis PAL The pivot axle 22 and the secondary pivot axle 23 are attached to a first sub member 24. The first engagement member 14 is pivotably coupled to the first sub member 24 about the pivot axis PA1 by the pivot axle 22 and the secondary pivot axle 23. The pivot axis PA1 is parallel to the pedal axis A1 of the pedal body 12. The slide direction DS1 is perpendicular to the pedal axis A1. In the illustrated embodiment, as seen in FIG. 4, the clamping position PC1 and the releasing position PR1 of the first engagement member 14 are defined based on a reference point RP1 of the first engagement member 14 with respect to the pedal axis A1. An exterior wall of the first engagement member 14 which is disposed at the releasing position PR1 is shown by a two-dot chain line. In the following description, the movement of the first engagement member 14 is explained in more detail.

As seen in FIG. 5, the bicycle pedal 10 can further comprise the first sub member 24 and a first pivot shaft 26. However, the first sub member 24 can be omitted from the bicycle pedal 10 if needed and/or desired. If the first sub member 24 is omitted from the bicycle pedal 10, the pivot axle 22 and the secondary pivot axle 23 are directly attached to the pedal body 12. The first sub member 24 is pivotably coupled to the pedal body 12 via the first pivot shaft 26. The first engagement member 14 is pivotably coupled to the first sub member 24 via the pivot axle 22 and the secondary pivot axle 23. The first pivot shaft 26 is configured to pivotably support the first sub member 24 about a secondary pivot axis PA12. The first pivot shaft 26 is attached to the pedal body 12. The first sub member 24 is pivotably coupled to the pedal body 12 about the secondary pivot axis PA12 by the first pivot shaft 26. The secondary pivot axis PA12 is parallel to the pedal axis A1 of the pedal body 12. As seen in FIG. 4, the secondary pivot axis PA12 is defined as a center axis of the first pivot shaft 26.

Figure 6:
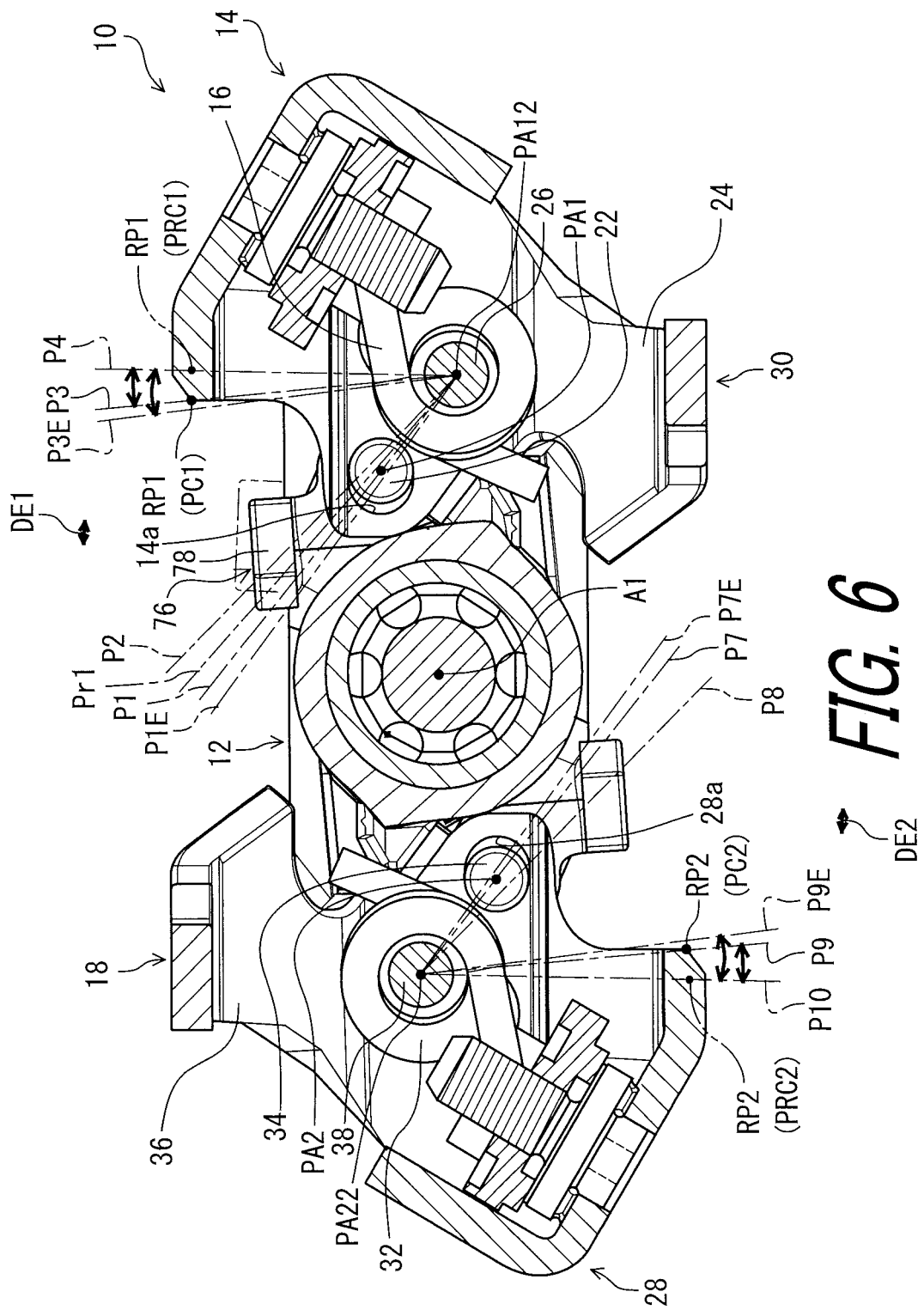
FIG. 6 is a cross-sectional view of the bicycle pedal taken along line VI-VI of FIG. 2.

As seen in FIG. 6, the first sub member 24 is pivotable relative to the pedal body 12 about the secondary pivot axis PA12 between a first position P1 and a second position P2. The first sub member 24 is positioned at the first position P1 in a state where the reference point RP1 is positioned at the clamping position PC1 (FIG. 4) with respect to the pedal axis A1. However, the first sub member 24 may be pivotable relative to the pedal body 12 about the secondary pivot axis PA12 between a first extra position P1E and the second position P2. As seen in FIG. 6, the first position P1, the first extra position P1E, and the second position P2 of the first sub member 24 are defined based on the pivot axis PA1 and the secondary pivot axis PA12, and the first position P1 is between the first extra position P1E and the second position P2.

As seen in FIG. 6, the first engagement member 14 is pivotable together with the first sub member 24 relative to the pedal body 12 about the secondary pivot axis PA12. In the illustrated embodiment, the first engagement member 14 is pivotable together with the first sub member 24 relative to the pedal body 12 about the secondary pivot axis PA12 between a third position P3 and a fourth position P4. The first engagement member 14 pivots relative to the pedal body 12 about the secondary pivot axis PA12 between the third position P3 and the fourth position P4. However, the first engagement member 14 may be pivotable together with the first sub member 24 relative to the pedal body 12 about the secondary pivot axis PA12 between a third extra position P3E and the fourth position P4. The third position P3 of the first engagement member 14 corresponds to the first position P1 of the first sub member 24. The fourth position P4 of the first engagement member 14 corresponds to the second position P2 of the first sub member 24. The third extra position P3E of the first engagement member 14 corresponds to the first extra position P1E of the first sub member 24. The third position P3 of the first engagement member 14 corresponds to the clamping position PC1 of the first engagement member 14 with respect to the pedal axis A1. The fourth position P4 of the first engagement member 14 corresponds to a rotation change position PRC1 (FIG. 4) of the first engagement member 14 with respect to the pedal axis A1. How to define the second position P2 of the first sub member 24 and the fourth position P4 of the first engagement member 14 is explained posteriorly.

Figure 7:
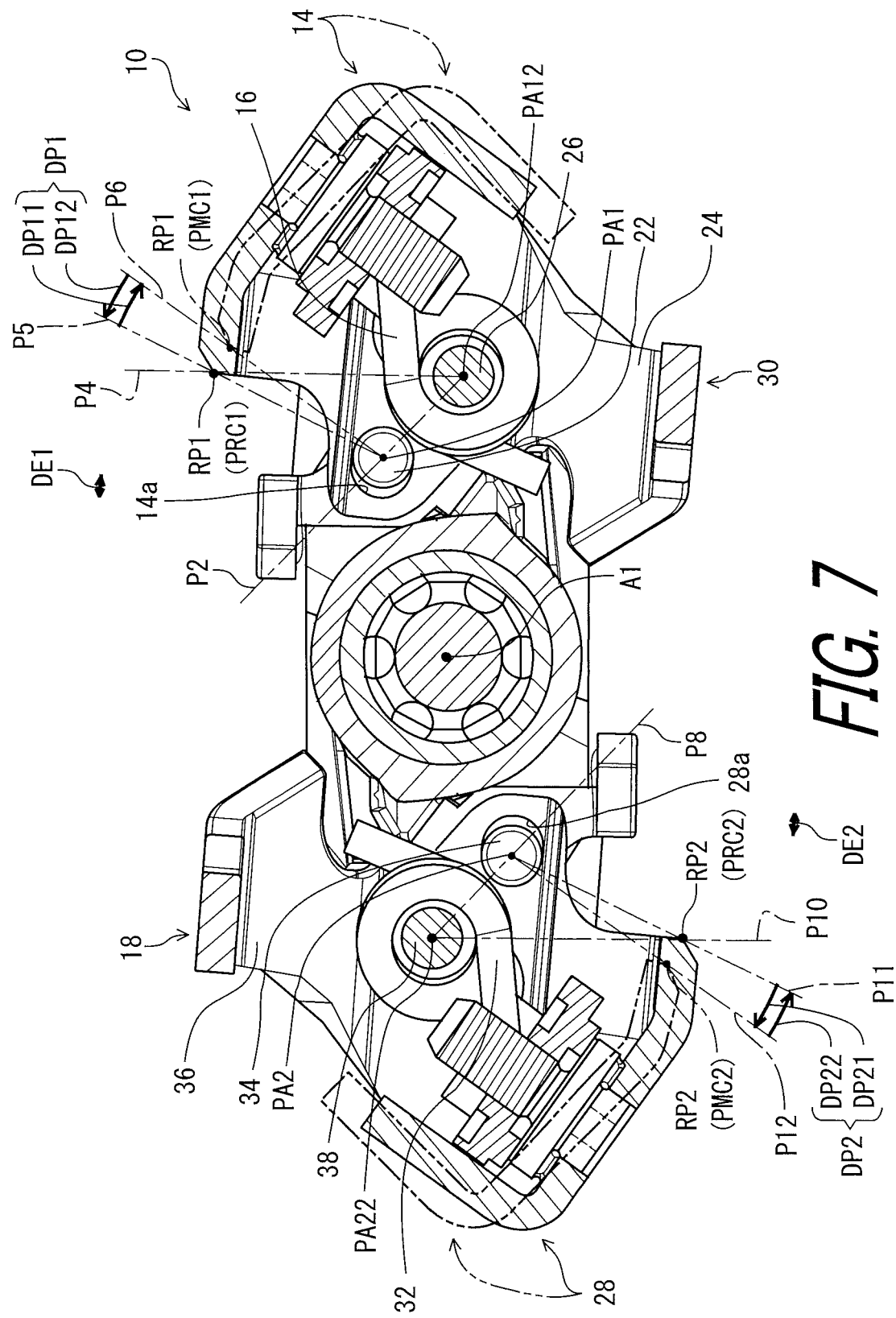
FIG. 7 is a cross-sectional view of the bicycle pedal taken along line VII-VII of FIG. 2.

As seen in FIG. 7, the first engagement member 14 is pivotable about the pivot axis PA1 in the pivot direction DP1. The pivot direction DP1 is a bilateral direction including a first pivot direction DP11 and a second pivot direction DP12 opposite to the first pivot direction DP11. The first pivot direction DP11 is a direction in which the first engagement member 14 pivots during a releasing operation in which the first engagement member 14 moves from the clamping position PC1 toward the releasing position PR1. The second pivot direction DP12 is a direction in which the first engagement member 14 pivots during a clamping operation in which the first engagement member 14 moves from the releasing position PR1 toward the clamping position PC1.

More specifically, the first engagement member 14 is pivotable relative to the first sub member 24 about the pivot axis PA1 between a fifth position P5 and a sixth position P6. The fifth position P5 and the sixth position P6 of the first engagement member 14 are defined based on the pivot axis PA1 and the reference point RP1 of the first engagement member 14. In FIG. 7, an exterior wall of the first engagement member 14 is disposed at the sixth position P6 is shown by a two-dot chain line. The first pivot direction DP11 is a direction from the fifth position P5 to the sixth position P6. The second pivot direction DP12 is a direction from the sixth position P6 to the fifth position P5. The fifth position P5 of the first engagement member 14 corresponds to the rotation change position PRC1 (FIG. 4) of the first engagement member 14 with respect to the pedal axis A1 and the fourth position P4 of the first engagement member 14 with respect to the secondary pivot axis PA12. The sixth position P6 of the first engagement member 14 corresponds to a movement change position PMC1 (FIG. 4) of the first engagement member 14 with respect to the pedal axis A1. How to define the fourth position P4 of the first engagement member 14 is explained posteriorly.

Figure 8:
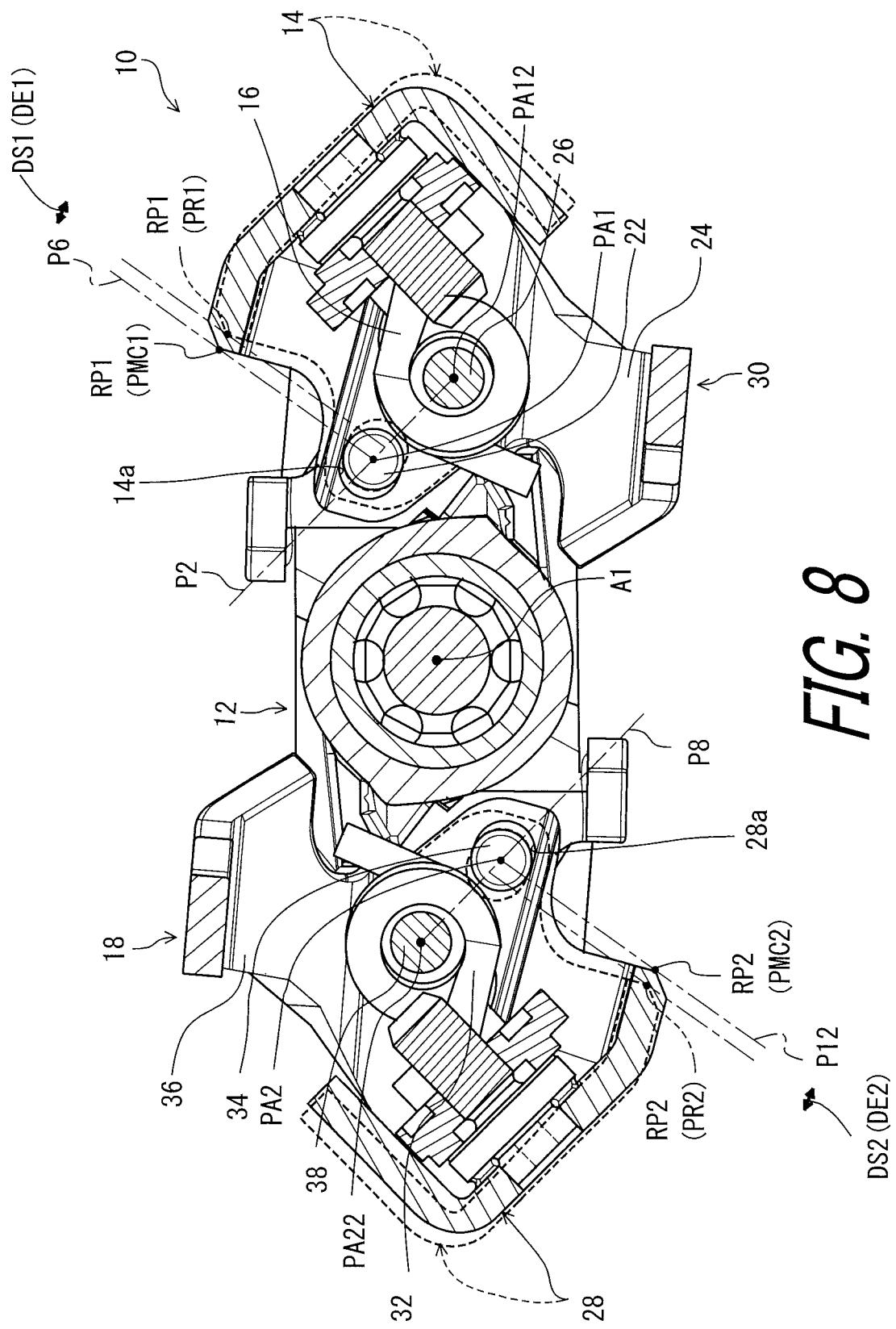
FIG. 8 is a cross-sectional view of the bicycle pedal taken along line VIII-VIII of FIG. 2.

As seen in FIG. 8, the first engagement member 14 slides in the slide direction DS1 after pivoting in the pivot direction DP1 during the releasing operation in which the first engagement member 14 moves from the clamping position PC1 toward the releasing position PR1. Conversely, the first engagement member 14 pivots in the pivot direction DP1 after sliding in the slide direction DS1 during the clamping operation in which the first engagement member 14 moves from the releasing position PR1 toward the clamping position PC1. As seen in FIGS. 4, and 6 to 8, the first engagement member 14 has an opening 14a to which the pivot axle 22 is disposed. The opening 14a of the first engagement member 14 is elongated in an elongating direction DE1. In FIG. 8, an external form of the first engagement member 14 which is disposed at the releasing position PR1 is shown by a dotted line. When a pivot movement of the first engagement member 14 relative to the first sub member 24 is finished (i.e. the reference point RP1 of the first engagement member 14 reaches the rotation change position PRC1), the elongating direction DE1 becomes parallel to the slide direction DS1. Accordingly, the opening 14a of the first engagement member 14 is elongated at least in the slide direction DS1 after the first engagement member 14 pivots in the pivot direction DP1. After the pivot movement of the first engagement member 14 relative to the first sub member 24 is finished, the first engagement member 14 is slidable such that at least part of a peripheral wall of the opening 14a of the first engagement member 14 abuts the pivot axle 22. The elongating direction DE1 is straight, not arc-like. Accordingly, the slide direction DS1 is different from the pivot direction DP1. Even though there is a room in the opening 14a of the first engagement member 14, the first engagement member 14 is not slidable before the pivot movement of the first engagement member 14 relative to the first sub member 24 is finished. A structure of the bicycle pedal 10 to enable such movement of the first engagement member 14 is explained posteriorly.

In the illustrated embodiment, as seen in FIGS. 4 to 8, the bicycle pedal 10 is a two-sided pedal (e.g., mounting bicycle style). More specifically, the bicycle pedal 10 further comprises a third engagement member 28, a fourth engagement member 30, an additional biasing member 32, a second sub member 36, and a second pivot shaft 38. The third engagement member 28, the fourth engagement member 30, the additional biasing member 32, the second sub member 36, and the second pivot shaft 38 correspond to the first engagement member 14, the second engagement member 18, the biasing member 16, the first sub member 24, the first pivot shaft 26, respectively. In the illustrated embodiment, the third engagement member 28 has substantially the same structure as the structure of the first engagement member 14. The fourth engagement member 30 has substantially the same structure as the structure of the second engagement member 18. The additional biasing member 32 has substantially the same structure as the structure of the biasing member 16. The second sub member 36 has substantially the same structure as the structure of the first sub member 24. The second pivot shaft 38 has substantially the same structure as the structure of the first pivot shaft 26. Further, the third engagement member 28, the fourth engagement member 30, the additional biasing member 32, the second sub member 36, and the second pivot shaft 38 are provided on opposite sides of the first engagement member 14, the second engagement member 18, the biasing member 16, the first sub member 24, the first pivot shaft 26, respectively, relative to the pedal body 12 (the pedal axis A1).

However, in a case where the bicycle pedal 10 is a one-sided pedal (e.g., road style), at least one of the third engagement member 28, the fourth engagement member 30, and the second sub member 36 can be omitted from the bicycle pedal 10. Further, the third engagement member 28 can have a different structure from the structure of the first engagement member 14. The fourth engagement member 30 can have a different structure from the structure of the second engagement member 18. The second sub member 36 can have a different structure from the structure of the first sub member 24.

The third engagement member 28 is a rear clamping member configured to engage with the rear end 2a of the bicycle cleat 2 (FIG. 1) as well as the first engagement member 14. The fourth engagement member 30 is a front clamping member configured to engage with the front end 2b of the bicycle cleat 2 (FIG. 1) as well as the second engagement member 18. However, the third engagement member 28 can be a front clamping member, and the fourth engagement member 30 can be a rear clamping member if needed and/or desired.

As seen in FIG. 4, the third engagement member 28 is movably coupled to the pedal body 12 between a reverse-side clamping position PC2 and a reverse-side releasing position PR2. The third engagement member 28 is positioned at the reverse-side clamping position PC2 in a state where the bicycle cleat 2 (FIG. 1) is clamped by the third engagement member 28. The third engagement member 28 is positioned at the reverse-side releasing position PR2 in a state where the bicycle cleat 2 is released from the bicycle pedal 10. In the illustrated embodiment, the third engagement member 28 is pivotable about an additional pivot axis PA2 in a reverse-side pivot direction DP2 and slidable in a reverse-side slide direction DS2 between the reverse-side clamping position PC2 and the reverse-side releasing position PR2. As seen in FIG. 5, the pedal body 12 includes an additional pivot axle 34 and an additional secondary pivot axle 35 that define the additional pivot axis PA2. Outer surfaces of the additional pivot axle 34 and the additional secondary pivot axle 35 are cylindrical surfaces. The additional pivot axle 34 and the additional secondary pivot axle 35 have substantially the same structure as the structure of the pivot axle 22 and the secondary pivot axle 23, respectively. The additional pivot axle 34 and the additional secondary pivot axle 35 are configured to pivotably support the third engagement member 28 about the additional pivot axis PA2. The additional pivot axle 34 and the additional secondary pivot axle 35 are attached to the second sub member 36. The third engagement member 28 is pivotably coupled to the second sub member 36 about the additional pivot axis PA2 by the additional pivot axle 34 and the additional secondary pivot axle 35. The additional pivot axis PA2 is parallel to the pedal axis A1 of the pedal body 12. In the illustrated embodiment, as seen in FIG. 4, the reverse-side clamping position PC2 and the reverse-side releasing position PR2 of the third engagement member 28 are defined based on a reference point RP2 of the third engagement member 28 with respect to the pedal axis A1. An exterior wall of the third engagement member 28 which is disposed at the reverse-side releasing position PR2 is shown by a two-dot chain line.

More specifically, as seen in FIG. 5, the second sub member 36 is pivotably coupled to the pedal body 12 via the second pivot shaft 38. The third engagement member 28 is pivotably coupled to the second sub member 36 via the second pivot shaft 38. The second pivot shaft 38 is configured to pivotably support the second sub member 36 about an additional secondary pivot axis PA22. The second pivot shaft 38 is attached to the pedal body 12. The second sub member 36 is pivotably coupled to the pedal body 12 about the additional secondary pivot axis PA22 by the second pivot shaft 38. The additional secondary pivot axis PA22 is parallel to the pedal axis A1 of the pedal body 12. As seen in FIG. 4, the additional secondary pivot axis PA22 is defined as a center axis of the second pivot shaft 38.

As seen in FIG. 6, the second sub member 36 is pivotable relative to the pedal body 12 about the additional secondary pivot axis PA22 between a seventh position P7 and an eighth position P8. The second sub member 36 is positioned at the seventh position P7 in a state where the reference point RP2 is positioned at the reverse-side clamping position PC2 (FIG. 4) with respect to the pedal axis A1. However, the second sub member 36 may be pivotable relative to the pedal body 12 about the additional secondary pivot axis PA22 between a seventh extra position P7E and the eighth position P8. As seen in FIG. 6, the seventh position P7, the seventh extra position P7E, and the eighth position P8 of the second sub member 36 are defined based on the additional pivot axis PA2 and the additional secondary pivot axis PA22, and the seventh position P7 is between the seventh extra position P7E and the eighth position P8.

As seen in FIG. 6, the third engagement member 28 is pivotable together with the second sub member 36 relative to the pedal body 12 about the additional secondary pivot axis PA22. In the illustrated embodiment, the third engagement member 28 is pivotable together with the second sub member 36 relative to the pedal body 12 about the additional secondary pivot axis PA22 between a ninth position P9 and a tenth position P10. The third engagement member 28 pivots relative to the pedal body 12 about the additional secondary pivot axis PA22 between the ninth position P9 and the tenth position P10. However, the third engagement member 28 may be pivotable together with the second sub member 36 relative to the pedal body 12 about the additional secondary pivot axis PA22 between a ninth extra position P9E and the tenth position P10. The ninth position P9 of the third engagement member 28 corresponds to the seventh position P7 of the second sub member 36. The tenth position P10 of the third engagement member 28 corresponds to the eighth position P8 of the second sub member 36. The ninth extra position P9E of the third engagement member 28 corresponds to the seventh extra position P7E of the second sub member 36. The ninth position P9 of the third engagement member 28 corresponds to the reverse-side clamping position PC2 of the third engagement member 28 with respect to the pedal axis A1. The tenth position P10 of the third engagement member 28 corresponds to a reverse-side rotation change position PRC2 (FIG. 4) of the third engagement member 28 with respect to the pedal axis A1.

As seen in FIG. 7, the third engagement member 28 is pivotable about the additional pivot axis PA2 in the reverse-side pivot direction DP2. In FIG. 7, a pair of the first engagement member 14 and the first sub member 24 is rotated with respect to the secondary pivot axis PA12 while a pair of the third engagement member 28 and the second sub member 36 is rotated with respect to the additional secondary pivot axis PA22. However, it is so illustrated for the convenience of explanation, and the pair of the third engagement member 28 and the second sub member 36 is rotated with respect to the additional secondary pivot axis PA22 independently of the movements of the first engagement member 14 and the first sub member 24. The reverse-side pivot direction DP2 is a bilateral direction including a first reverse-side pivot direction DP21 and a second reverse-side pivot direction DP22 opposite to the first reverse-side pivot direction DP21. The first reverse-side pivot direction DP21 is a direction in which the third engagement member 28 pivots during a releasing operation in which the third engagement member 28 moves from the reverse-side clamping position PC2 toward the reverse-side releasing position PR2. The second reverse-side pivot direction DP22 is a direction in which the third engagement member 28 pivots during a clamping operation in which the third engagement member 28 moves from the reverse-side releasing position PR2 toward the reverse-side clamping position PC2.

More specifically, the third engagement member 28 is pivotable relative to the second sub member 36 about the additional pivot axis PA2 between an eleventh position P11 and a twelfth position P12. The eleventh position P11 and the twelfth position P12 of the third engagement member 28 are defined based on the additional pivot axis PA2 and the reference point RP2 of the third engagement member 28. In FIG. 7, an exterior wall of the third engagement member 28 which is disposed at the twelfth position P12 is shown by a two-dot chain line. The first reverse-side pivot direction DP21 is a direction from the eleventh position P11 to the twelfth position P12. The second reverse-side pivot direction DP22 is a direction from the twelfth position P12 to the eleventh position P11. The eleventh position P11 of the third engagement member 28 corresponds to the reverse-side rotation change position PRC2 (FIG. 4) of the third engagement member 28 with respect to the pedal axis A1 and the tenth position P10 of the third engagement member 28 with respect to the additional secondary pivot axis PA22. The twelfth position P12 of the third engagement member 28 corresponds to a reverse-side movement change position PMC2 (FIG. 4) of the third engagement member 28 with respect to the pedal axis A1.

As seen in FIG. 8, the third engagement member 28 slides in the reverse-side slide direction DS2 after pivoting in the reverse-side pivot direction DP2 during the releasing operation in which the third engagement member 28 moves from the reverse-side clamping position PC2 toward the reverse-side releasing position PR2. Conversely, the third engagement member 28 pivots in the reverse-side pivot direction DP2 after sliding in the reverse-side slide direction DS2 during the clamping operation in which the third engagement member 28 moves from the reverse-side releasing position PR2 toward the reverse-side clamping position PC2. In FIG. 8, the first sub member 24 is rotated with respect to the secondary pivot axis PA12 and the first engagement member 14 is rotated with respect to the secondary pivot axis PA12 and the pivot axis PA1, while the second sub member 36 is rotated with respect to the additional secondary pivot axis PA22 and the third engagement member 28 is rotated with respect to the additional secondary pivot axis PA22 and the additional pivot axis PA2. However, it is so illustrated for the convenience of explanation, the second sub member 36 is rotated with respect to the additional secondary pivot axis PA22 and the third engagement member 28 is rotated with respect to the additional secondary pivot axis PA22 and the additional pivot axis PA2 independently of the movements of the first engagement member 14 and the first sub member 24. As seen in FIGS. 4, and 6 to 8, the third engagement member 28 has an opening 28a to which the additional pivot axle 34 is disposed. The opening 28a of the third engagement member 28 is elongated in the reverse-side elongating direction DE2. In FIG. 8, an external form of the third engagement member 28 which is disposed at the reverse-side releasing position PR2 is shown by a dotted line. When a pivot movement of the third engagement member 28 relative to the second sub member 36 is finished (i.e. the reference point RP2 of the third engagement member 28 reaches the reverse-side rotation change position PRC2), the reverse-side elongating direction DE2 becomes parallel to the reverse-side slide direction DS2. Accordingly, the opening 28a of the third engagement member 28 is elongated at least in the reverse-side slide direction DS2 after the third engagement member 28 pivots in the reverse-side pivot direction DP2. After the pivot movement of the third engagement member 28 relative to the second sub member 36 is finished, the third engagement member 28 is slidable such that at least part of a peripheral wall of the opening 28a of the third engagement member 28 abuts against the additional pivot axle 34. The reverse-side elongating direction DE2 is straight, not arc-like. Accordingly, the reverse-side slide direction DS2 is different from the reverse-side pivot direction DP2. Even though there is a room in the opening 28a of the third engagement member 28, the third engagement member 28 is not slidable before the pivot movement of the third engagement member 28 relative to the second sub member 36 is finished.

As seen in FIG. 5, the first sub member 24 is integrally provided with the fourth engagement member 30. In the illustrated embodiment, the first sub member 24 is integrally provided with the fourth engagement member 30 as a single unitary member. The fourth engagement member 30 is pivotable relative to the pedal body 12 about the secondary pivot axis PA12 together with the first sub member 24. The first sub member 24 can, however, be a separate member from the fourth engagement member 30. In this case, the fourth engagement member 30 can non-movably be fixed on the pedal body 12. Alternatively, the fourth engagement member 30 is integrally provided with the pedal body 12 as a single unitary member.

Similarly, the second sub member 36 is integrally provided with the second engagement member 18. In the illustrated embodiment, the second sub member 36 is integrally provided with the second engagement member 18 as a single unitary member. The second engagement member 18 is pivotable relative to the pedal body 12 about the additional secondary pivot axis PA22 together with the second sub member 36. The second sub member 36 can, however, be a separate member from the second engagement member 18. In this case, the second engagement member 18 can non-movably be fixed on the pedal body 12. Alternatively, the second engagement member 18 is integrally provided with the pedal body 12 as a single unitary member.

As seen in FIG. 5, the first sub member 24 includes a pair of coupling portions 40 spaced apart from each other in an axial direction D1 parallel to the pedal axis A1 of the pedal body 12. The coupling portions 40 are coupled to each other by the fourth engagement member 30. Each of the coupling portions 40 includes a first pivot hole 40a and a second pivot hole 40b. The first pivot shaft 26 extends through the first pivot holes 40a. The pivot axle 22 and the secondary pivot axle 23 respectively extend through the second pivot holes 36b.

The second sub member 36 includes a pair of additional coupling portions 41 spaced apart from each other in an axial direction D1 parallel to the pedal axis A1 of the pedal body 12. The additional coupling portions 41 are coupled to each other by the second engagement member 18. Each of the additional coupling portions 41 includes an additional first pivot hole 41a and an additional second pivot hole 41b. The second pivot shaft 38 extends through the additional first pivot holes 41a. The additional pivot axle 34 and the additional secondary pivot axle 35 respectively extend through the additional second pivot holes 41b.

As seen in FIG. 5, the pedal body 12 includes an axle portion 42, a first support 44, and a second support 46. The axle portion 42 has a cylindrical shape and extends in the axial direction D1. The axle portion 42 is rotatably supported on the pedal axle 20. The first support 44 is secured to the axle portion 42. The second support 46 is secured to the axle portion 42 and is spaced apart from the first support 44 in the axial direction D1. In the illustrated embodiment, the first support 44 and the second support 46 are integrally provided with the axle portion 42 as a single unitary member. However, at least one of the first support 44 and the second support 46 can be a separate member from the axle portion 42 if needed and/or desired.

As seen in FIG. 5, the first support 44 includes first securing holes 44a and 44b. The second support 46 includes second securing holes 46a and 46b. Each of the first securing holes 44a and 44b includes an internal thread, for example. The first pivot shaft 26 includes a threaded part screwed in the first securing hole 44a. The first pivot shaft 26 extends through the second securing hole 46a. The second pivot shaft 38 includes a threaded part screwed in the first securing hole 44b. The second pivot shaft 38 extends through the second securing hole 46b.

As seen in FIG. 5, the bicycle pedal 10 can further comprise a pair of stoppers 48 and a pair of additional stoppers 49. In the illustrated embodiment, each of the additional stoppers 49 has substantially the same structure as a structure of each of the stoppers 48. However, the pair of the additional stoppers 49 can be omitted if needed and/or desired, or each of the additional stoppers 49 can have a different structure from a structure of each of the stoppers 48. The stoppers 48 are slidably coupled to the pedal body 12 by the first pivot shaft 26. The additional stoppers 49 are slidably coupled to the pedal body 12 by the second pivot shaft 38. In the illustrated embodiment, each of the stoppers 48 has substantially the same shape, and each of the additional stoppers 49 has substantially the same shape. The stoppers 48 are disposed opposite to each other with respect to the first sub member 24 in the axial direction D1. The additional stoppers 49 are disposed opposite to each other with respect to the second sub member 36 in the axial direction D1. Each of the stoppers 48 includes a base part 50 and a contact part 52. The base part 50 includes a through-hole 50a. The first pivot shaft 26 extends through the through-holes 50a. The contact part 52 protrudes from the base part 50 in the axial direction D1. Each of the additional stoppers 49 includes an additional base part 51 and an additional contact part 53. The additional base part 51 includes an additional through-hole 51a. The second pivot shaft 38 extends through the additional through-holes 51a. The additional contact part 53 protrudes from the additional base part 51 in the axial direction D1.

Figure 9:
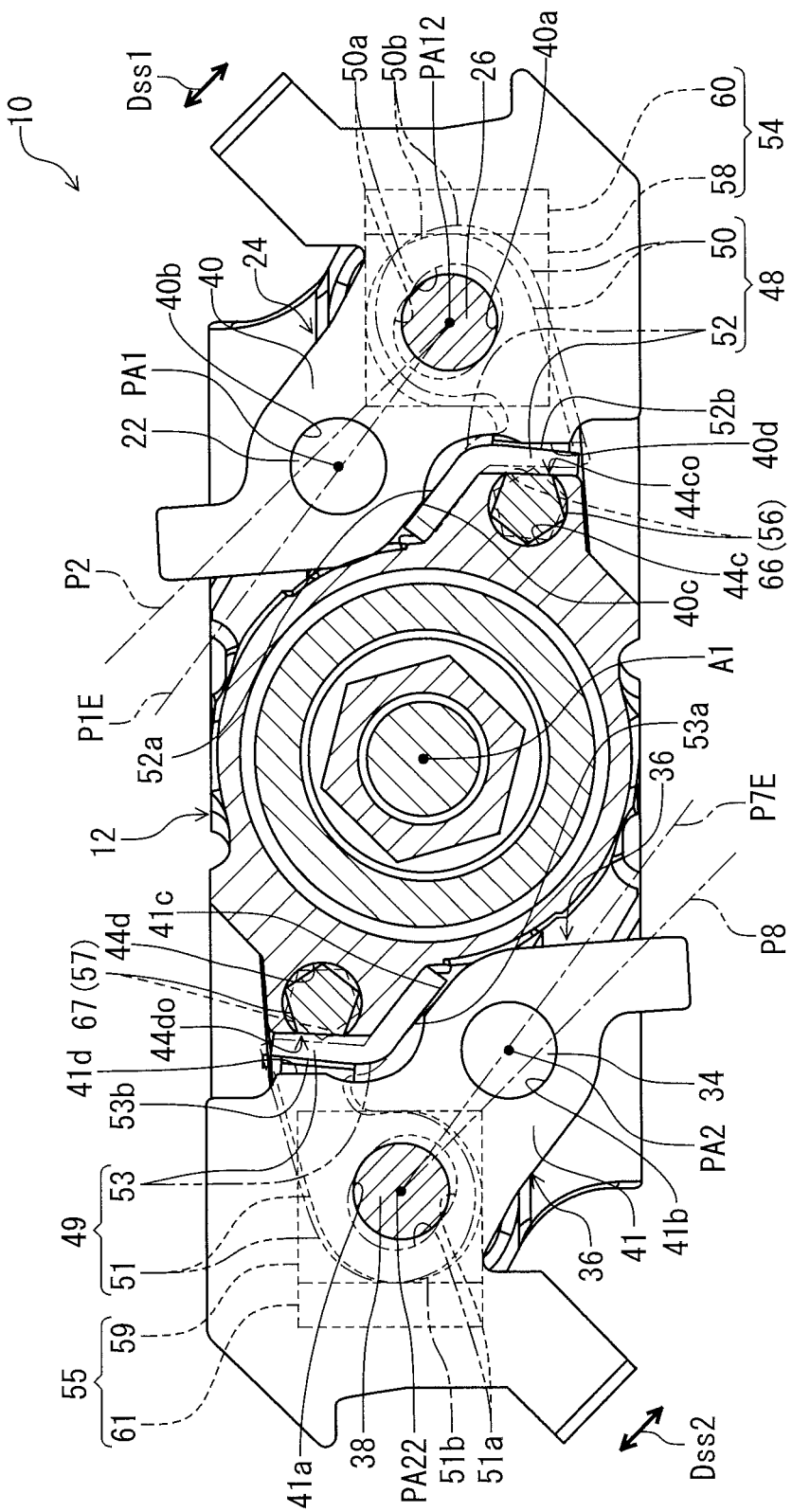
FIG. 9 is a cross-sectional view of the bicycle pedal taken along line IX-IX of FIG. 2.
Figure 10:
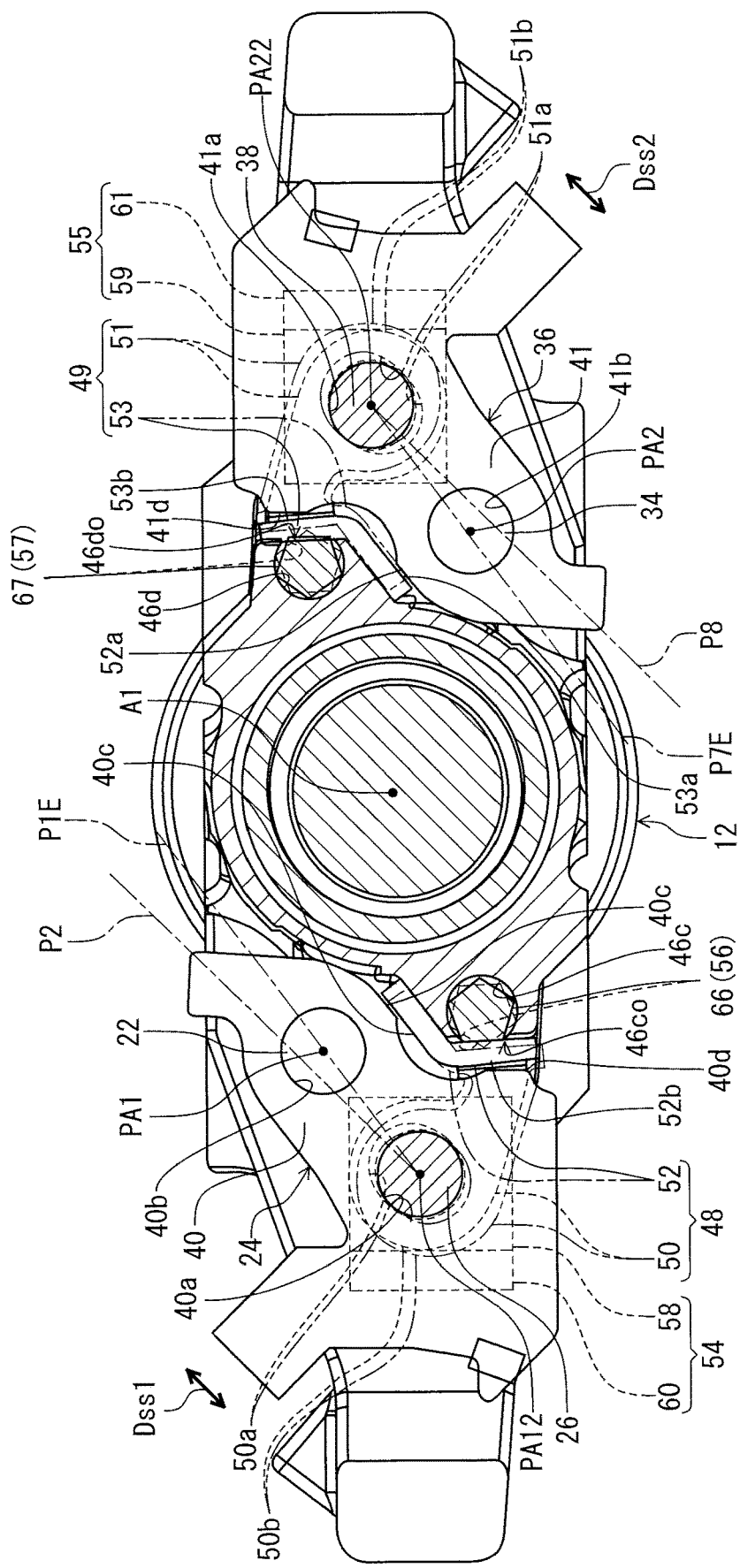
FIG. 10 is a cross-sectional view of the bicycle pedal taken along line X-X of FIG. 2.

As seen in FIGS. 9 and 10, the contact part 52 is provided between the coupling portion 40 and the pedal body 12, and the additional contact part 53 is provided between the additional coupling portion 41 and the pedal body 12. Here, the coupling portions 40 and additional coupling portions 41 illustrated in FIGS. 9 and 10 are cross-sectional views. However, the coupling portions 40 and the additional coupling portions 41 illustrated in FIGS. 9 and 10 are not hatched in order to clearly show hidden-lines of the stopper 48 and the additional stopper 49.

The contact part 52 is contactable with the coupling portion 40 of the first sub member 24. The contact part 52 includes a first receiving surface 52a and a second receiving surface 52b. The first receiving surface 52a is inclined relative to the second receiving surface 52b. A surface of the contact part 52 which is opposite to the first receiving surface 52a is in contact with the pedal body 12. The coupling portion 40 includes a first contact surface 40c and a second contact surface 40d. The first contact surface 40c is contactable with the first receiving surface 52a. The second contact surface 40d is contactable with the second receiving surface 52b. The first contact surface 40c is inclined relative to the second contact surface 40d. The first sub member 24 is positioned at the first extra position P1E in a state where the first contact surface 40c contacts the first receiving surface 52a. The first sub member 24 is positioned at the second position P2 in a state where the second contact surface 40d contacts the second receiving surface 52b.

Similarly, the additional contact part 53 is contactable with the additional coupling portion 41 of the second sub member 36. The additional contact part 53 includes an additional first receiving surface 53a and an additional second receiving surface 53b. The additional first receiving surface 53a is inclined relative to the additional second receiving surface 53b. A surface of the additional contact part 53 which is opposite to the additional first receiving surface 53a is in contact with the pedal body 12. The additional coupling portion 41 includes an additional first contact surface 41c and an additional second contact surface 41d. The additional first contact surface 41c is contactable with the additional first receiving surface 53a. The additional second contact surface 41d is contactable with the additional second receiving surface 53b. The additional first contact surface 41c is inclined relative to the additional second contact surface 41d. The second sub member 36 is positioned at the seventh extra position P7E in a state where the additional first contact surface 41c contacts the additional first receiving surface 53a. The second sub member 36 is positioned at the eighth position P8 in a state where the additional second contact surface 41d contacts the additional second receiving surface 53b.

As seen in FIGS. 9 and 10, the through-hole 50a of the base part 50 of each of the stoppers 48 is an elongated hole elongating in a stopper slide direction Dss1. Preferably, the first receiving surface 52a extends in the stopper slide direction Dss1. Each of the stoppers 48 is slidable in the stopper slide direction Dss1. In FIGS. 9 and 10, the stopper 48 that is disposed closest to the pedal body 12 is illustrated by a dotted line, the stopper 48 that is disposed farthest from the pedal body 12 is illustrated by a two-dot chain line. Each of the stoppers 48 is slidable such that at least part of a peripheral wall of the through-hole 50a of the base part 50 abuts against the first pivot shaft 26.

Similarly, the additional through-hole 51a of the additional base part 51 of each of the additional stoppers 49 is an elongated hole elongating in an additional stopper slide direction Dss2. Preferably, the additional first receiving surface 53a extends in the additional stopper slide direction Dss2. Each of the additional stoppers 49 is slidable in the additional stopper slide direction Dss2. In FIGS. 9 and 10, the additional stopper 49 that is disposed closest to the pedal body 12 is illustrated by a dotted line, the additional stopper 49 that is disposed farthest from the pedal body 12 is illustrated by a two-dot chain line. Each of the additional stoppers 49 is slidable such that at least part of a peripheral wall of the additional through-hole 51a of the additional base part 51 abuts against the second pivot shaft 38.

As seen in FIG. 5, the bicycle pedal 10 can further comprise a pair of plate springs 54, a pair of additional plate springs 55, a pair of stopper adjustment bolts 56, and a pair of additional stopper adjustment bolts 57. In the illustrated embodiment, each of the additional plate springs 55 has substantially the same structure as a structure of each of the plate springs 54, and each of the additional stopper adjustment bolts 57 has substantially the same structure as a structure of each of the stopper adjustment bolts 56. However, the pair of the additional plate springs 55 and the pair of the additional stopper adjustment bolts 57 can be omitted if needed and/or desired. Each of the additional plate springs 55 can have a different structure from a structure of each of the plate springs 54. Each of the additional stopper adjustment bolts 57 can have a different structure from a structure of each of the stopper adjustment bolts 56.

The plate springs 54 are coupled to the pedal body 12 by the first pivot shaft 26. In the illustrated embodiment, each of the plate springs 54 has the substantially the same shape, and the plate springs 54 are disposed opposite to each other with respect to the first sub member 24 in the axial direction D1. Each of the plate springs 54 includes a base part 58 and a biasing part 60. The base part 58 includes a through-hole 58a. The first pivot shaft 26 extends through the through-holes 58a. An inner diameter of the through-hole 58a is substantially same as an outer diameter of the first pivot shaft 26. As seen in FIGS. 5, 9 and 10, the biasing part 60 protrudes from the base part 58 in the axial direction D1 to contact an outer edge 50b of the base part 50 of the stopper 48. The biasing part 60 is configured to bias the stopper 48 toward the pedal body 12.

The additional plate springs 55 are coupled to the pedal body 12 by the second pivot shaft 38. In the illustrated embodiment, each of the additional plate springs 55 has substantially the same shape, and the additional plate springs 55 are disposed opposite to each other with respect to the second sub member 36 in the axial direction D1. Each of the additional plate springs 55 includes an additional base part 59 and an additional biasing part 61. The additional base part 59 includes an additional through-hole 59a. The second pivot shaft 38 extends through the additional through-holes 59a. An inner diameter of the additional through-hole 59a is substantially same as an outer diameter of the second pivot shaft 38. As seen in FIGS. 5, 9 and 10, the additional biasing part 61 protrudes from the additional base part 59 in the axial direction D1 to contact an outer edge 51b of the additional base part 51 of the additional stopper 49. The additional biasing part 61 is configured to bias the additional stopper 49 toward the pedal body 12.

As seen in FIG. 5, the first support 44 includes third securing holes 44c and 44d. The second support 46 includes fourth securing holes 46c and 46d. One of the stopper adjustment bolts 56 extends through the third securing hole 44c. Another of the stopper adjustment bolts 56 extends through the fourth securing hole 46c. One of the additional stopper adjustment bolts 57 extends through the third securing hole 44d. Another of the additional stopper adjustment bolts 57 extends through the fourth securing hole 46d. Each of the third securing holes 44c and 44d and the fourth securing holes 46c and 46d includes an internal thread, for example.

As seen in FIG. 9, the first support 44 includes a first side opening 44co and a second side opening 44do. The first side opening 44co faces the contact part 52 of the stopper 48 and communicates with the third securing hole 44c. The second side opening 44do faces the additional contact part 53 of the additional stopper 49 and communicates with the third securing hole 44d. As seen in FIG. 10, the second support 46 includes a third side opening 46co and a fourth side opening 46do. The third side opening 46co faces the contact part 52 of the stopper 48 and communicates with the fourth securing hole 46c. The fourth side opening 46do faces the additional contact part 53 of the additional stopper 49 and communicates with the fourth securing hole 46d.

As seen in FIG. 5, each of the stopper adjustment bolts 56 includes an operated part 62, a thread part 64, and an adjustment part 66. The operated part 62 is configured to be rotated by a user with e.g., a wrench or a screwdriver. The thread part 64 is screwed in the internal thread of the third securing hole 44c or the fourth securing hole 46c. As seen in FIGS. 9 and 10, the adjustment part 66 has a columnlike shape which has at least two parts on the side of the adjustment part 66, the at least two parts having different distances from a central rotational axis of the stopper adjustment bolt 56. Preferably, the adjustment part 66 has a shape of a pentagonal prism. More preferably, the adjustment part 66 has a shape of an equilateral pentagonal prism. However, the adjustment part 66 can have a different shape. For example, the adjustment part 66 can have a shape of a triangular prism, a hexagonal prism, or an elliptical column.

As seen in FIGS. 9 and 10, the adjustment part 66 can protrude at least one part of the side of the adjustment part 66 from the first side opening 44co or the third side opening 46co depending on a rotational angle of the stopper adjustment bolt 56. An extrusion amount of the adjustment part 66 from the first side opening 44co or the third side opening 46co depends on the rotational angle of the stopper adjustment bolt 56. In FIGS. 9 and 10, a cross-sectional shape of the adjustment part 66 that minimally protrudes from the first side opening 44co and a cross-sectional shape of the adjustment part 66 that minimally protrudes from the third side opening 46co are illustrated by solid lines. A cross-sectional shape of the adjustment part 66 that maximally protrudes from the first side opening 44co and a cross-sectional shape of the adjustment part 66 that maximally protrudes from the third side opening 46co are illustrated by dotted lines. When the adjustment part 66 minimally protrudes from the first side opening 44co or the third side opening 46co, the stopper 48 is positioned closest to the pedal body 12 due to the biasing force of the plate spring 54. In this case, at least one of the first contact surface 40c and the second contact surface 40d is apart from the contact part 52 of the stopper 48, and the coupling portion 40 of the first sub member 24 is pivotable relative to the pedal body 12 in the largest range. However, when a part of the side of the adjustment part 66 which is closest to the central rotational axis of the stopper adjustment bolt 56 is in contact with the contact part 52 of the stopper 48, at least a part of the contact part 52 of the stopper 48 may be provided in at least one of the third securing hole 44c and the fourth securing hole 46c, and the second contact surface 40d of the first sub member 24 may be in contact with the pedal body 12. When the adjustment part 66 maximally protrudes from the first side opening 44co or the third side opening 46co, the stopper 48 is positioned farthest from the pedal body 12. In this case, both the first contact surface 40c and the second contact surface 40d may be in contact with the contact part 52 of the stopper 48, thereby the coupling portion 40 of the first sub member 24 is not pivotable relative to the pedal body 12. Alternatively, at least one of the first contact surface 40c and the second contact surface 40d can be apart from the contact part 52 of the stopper 48, and the coupling portion 40 of the first sub member 24 is pivotable relative to the pedal body 12 in the smallest range. In the illustrated embodiment as seen in FIGS. 9 and 10, an edge of the side of the adjustment part 66 is in contact with the contact part 52 of the stopper 48, but it is preferable that a smooth surface of the side of the adjustment part 66 is in contact with the contact part 52 of the stopper 48.

Similarly, as seen in FIG. 5, each of the additional stopper adjustment bolts 57 includes an additional operated part 63, an additional thread part 65, and an additional adjustment part 67. The additional operated part 63 is configured to be rotated by a user with e.g., a wrench or a screwdriver. The additional thread part 65 is screwed in the internal thread of the third securing hole 44d or the fourth securing hole 46d. As seen in FIGS. 9 and 10, the additional adjustment part 67 has a columnlike shape which has at least two parts on the side of the additional adjustment part 67, the at least two parts having different distances from a central rotational axis of the additional stopper adjustment bolt 57. Preferably, the additional adjustment part 67 has a shape of a pentagonal prism. More preferably, the additional adjustment part 67 has a shape of an equilateral pentagonal prism. However, the additional adjustment part 67 can have a different shape. For example, the additional adjustment part 67 can have a shape of a triangular prism, a hexagonal prism, or an elliptical column.

As seen in FIGS. 9 and 10, the additional adjustment part 67 can protrude at least one part of the side of the additional adjustment part 67 from the second side opening 44do or the fourth side opening 46do depending on a rotational angle of the additional stopper adjustment bolt 57. An extrusion amount of the additional adjustment part 67 from the second side opening 44do or the fourth side opening 46do depends on the rotational angle of the additional stopper adjustment bolt 57. In FIGS. 9 and 10, a cross-sectional shape of the additional adjustment part 67 that minimally protrudes from the second side opening 44do and a cross-sectional shape of the additional adjustment part 67 that minimally protrudes from the fourth side opening 46do are illustrated by solid lines. A cross-sectional shape of the additional adjustment part 67 that maximally protrudes from the second side opening 44do and a cross-sectional shape of the additional adjustment part 67 that maximally protrudes from the fourth side opening 46do are illustrated by dotted lines. When the additional adjustment part 67 minimally protrudes from the second side opening 44do or the fourth side opening 46do, the additional stopper 49 is positioned closest to the pedal body 12 due to the biasing force of the additional plate spring 55. In this case, at least one of the additional first contact surface 41c and the additional second contact surface 41d is apart from the additional contact part 53 of the additional stopper 49, and the additional coupling portion 41 of the second sub member 36 is pivotable relative to the pedal body 12 in the largest range. However, when a part of the side of the additional adjustment part 67 which is closest to the central rotational axis of the additional stopper adjustment bolt 57 is in contact with the additional contact part 53 of the additional stopper 49, at least a part of the additional contact part 53 of the additional stopper 49 may be provided in at least one of the third securing hole 44d and the fourth securing hole 46d, and the additional second contact surface 41d of the second sub member 36 may be in contact with the pedal body 12. When the additional adjustment part 67 maximally protrudes from the second side opening 44do or the fourth side opening 46do, the additional stopper 49 is positioned farthest from the pedal body 12. In this case, both the additional first contact surface 41c and the additional second contact surface 41d may be in contact with the additional contact part 53 of the additional stopper 49, thereby the additional coupling portion 41 of the second sub member 36 is not pivotable relative to the pedal body 12. Alternatively, at least one of the additional first contact surface 41c and the additional second contact surface 41d can be apart from the additional contact part 53 of the additional stopper 49, and the additional coupling portion 41 of the second sub member 36 is pivotable relative to the pedal body 12 in the smallest range. In the illustrated embodiment as seen in FIGS. 9 and 10, an edge of the side of the additional adjustment part 67 is in contact with the additional contact part 53 of the additional stopper 49, but it is preferable that a smooth surface of the side of the additional adjustment part 67 is in contact with the additional contact part 53 of the additional stopper 49.

As seen in FIG. 5, the first engagement member 14 includes a clamping body 68 and a pair of attachment portions 70. The clamping body 68 is configured to engage with the rear end 2a of the bicycle cleat 2 (FIG. 1). The attachment portions 70 are coupled to each other by the clamping body 68. The attachment portions 70 protrude from the clamping body 68 and are spaced apart from each other in the axial direction D1. Each of the attachment portions 70 includes the opening 14a. The pivot axle 22 and the secondary pivot axle 23 extend through the opening 14a to pivotably support the first engagement member 14 relative to the first sub member 24 about the pivot axis PA1.

Similarly, the third engagement member 28 includes an additional clamping body 69 and a pair of additional attachment portions 71. The additional clamping body 69 is configured to engage with the rear end 2a of the bicycle cleat 2 (FIG. 1). The additional attachment portions 71 are coupled to each other by the additional clamping body 69. The additional attachment portions 71 protrude from the additional clamping body 69 and are spaced apart from each other in the axial direction D1. Each of the additional attachment portions 71 includes the opening 28a. The additional pivot axle 34 and the additional secondary pivot axle 35 extend through the opening 14a to pivotably support the third engagement member 28 relative to the second sub member 36 about the additional pivot axis PA2.

Figure 11:
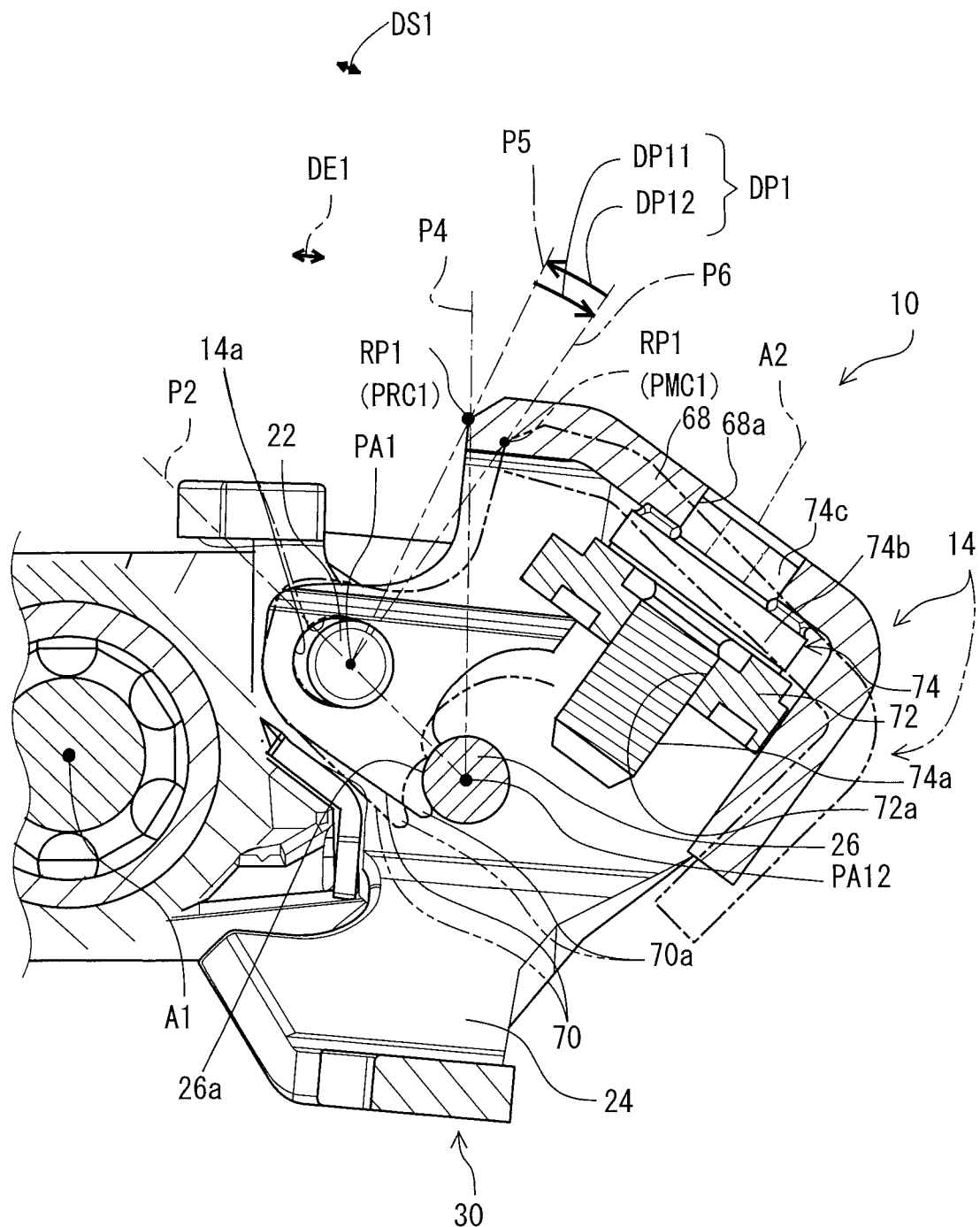
FIG. 11 is a partial enlarged cross-sectional view of the bicycle pedal taken along line XI-XI of FIG. 2, with a biasing structure removed for the purpose of illustration.

As seen in FIG. 11, the attachment portion 70 includes a first contact portion 70a. That is, the first engagement member 14 has the first contact portion 70a. The first contact portion 70a is configured to restrict the first engagement member 14 from sliding relative to the first sub member 24 in the slide direction DS1, during a pivotal movement of the first engagement member 14 in the pivot direction DP1 before the first engagement member 14 reaches the movement change position PMC1. The first contact portion 70a allows the first engagement member 14 to pivot relative to the first sub member 24 about the pivot axis PA1 from the fifth position P5 toward the sixth position P6. The first contact portion 70a is contactable with the first pivot shaft 26. In other words, the first pivot shaft 26 can prevent the first engagement member 14 from sliding in the slide direction DS1. Thus, the first pivot shaft 26 can be referred to as a restriction member 26. Then, the pedal body 12 includes the restriction member 26 that prevents the first engagement member 14 from sliding in the slide direction DS1 during a pivotal movement of the first engagement member 14 in the pivot direction DP1. The first engagement member 14 is configured to abut against the restriction member 26 such that the first engagement member 14 does not slide in the slide direction DS1 during the pivotal movement of the first engagement member 14 in the pivot direction DP1. More specifically, the restriction member 26 has a second contact portion 26a to contact the first contact portion 70a during the pivotal movement of the first engagement member 14 in the pivot direction DP1. At least one of the first contact portion 70a and the second contact portion 26a has curvature. In this embodiment, both the first contact portion 70a and the second contact portion 26a have curvature, but one of the first contact portion 70a and the second contact portion 26a can have only a flat surface and/or an angular edge.

As seen in FIG. 11, the first engagement member 14 further includes an adjustment plate 72 and an adjustment bolt 74. The adjustment plate 72 has a threaded hole 72a. The adjustment bolt 74 includes a thread bolt 74a, a flange portion 74b, and a head portion 74c. The thread bolt 74a protrudes from the flange portion 74b. The head portion 74c protrudes from the flange portion 74b toward an opposite side of the thread bolt 74a. The thread bolt 74a is screwed in the threaded hole 72a. The flange portion 74b is provided between the adjustment plate 72 and the clamping body 68. The flange portion 74b engages with the clamping body 68. The clamping body 68 includes a through-hole 68a. The head portion 74c is provided in the through-hole 68a. The adjustment bolt 74 is rotatable relative to the clamping body 68 and the adjustment plate 72 about a center axis A2 of the adjustment bolt 74.

Figure 12:
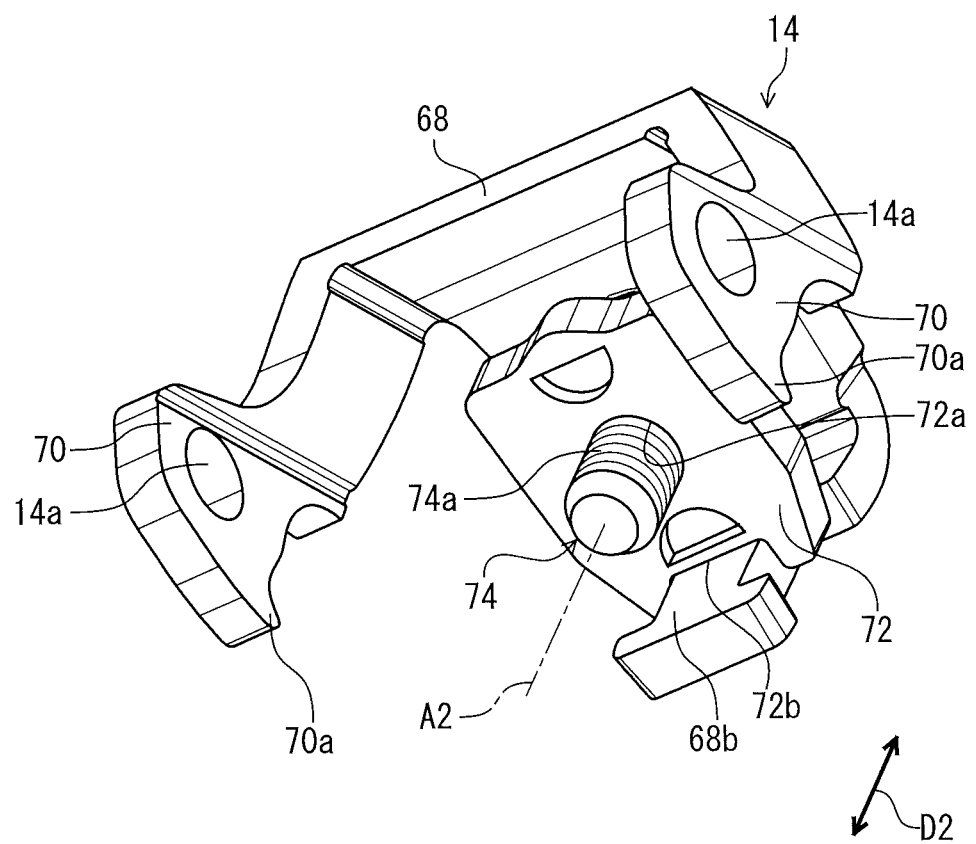
FIG. 12 is a perspective view of a first engagement member of the bicycle pedal illustrated in FIG. 2.

As seen in FIG. 12, the clamping body 68 includes a guide portion 68b configured to guide the adjustment plate 72 in an adjustment direction D2 parallel to the center axis A2 of the adjustment bolt 74. The adjustment plate 72 includes a guide groove 72b. The guide portion 68b is provided in the guide groove 72b to guide the adjustment plate 72 in the adjustment direction D2. The guide portion 68b is configured to prevent the adjustment plate 72 from rotating relative to the clamping body 68 about the center axis A2. Rotation of the adjustment bolt 74 relative to the clamping body 68 moves the adjustment plate 72 relative to the clamping body 68 in the adjustment direction D2. Similarly, the third engagement member 28 has substantially the same structure as the structure of the first engagement member 14 as illustrated in FIGS. 11 and 12.

As described above, as seen in FIG. 13, the bicycle pedal 10 comprises the biasing member 16. The biasing member 16 is configured to bias the first engagement member 14 toward the clamping position PC1. The biasing member 16 is configured to bias the first sub member 24 toward the first position P1. In the illustrated embodiment, the biasing member 16 is configured to bias the first engagement member 14 (the adjustment plate 72) toward the third position P3 so that the first sub member 24 is biased toward the first position P1.

As seen in FIG. 5, the bicycle pedal 10 can further comprises a secondary biasing member 17. The biasing member 16 and the secondary biasing member 17 are arranged in the axial direction D1. In the illustrated embodiment, for example, each of the biasing member 16 and the secondary biasing member 17 is a torsion spring. However, at least one of the biasing member 16 and the secondary biasing member 17 can be a biasing member other than the torsion spring. The biasing member 16 and the secondary biasing member 17 can be integrally provided with each other as a single unitary member. The secondary biasing member 17 can be omitted.

Figure 13:
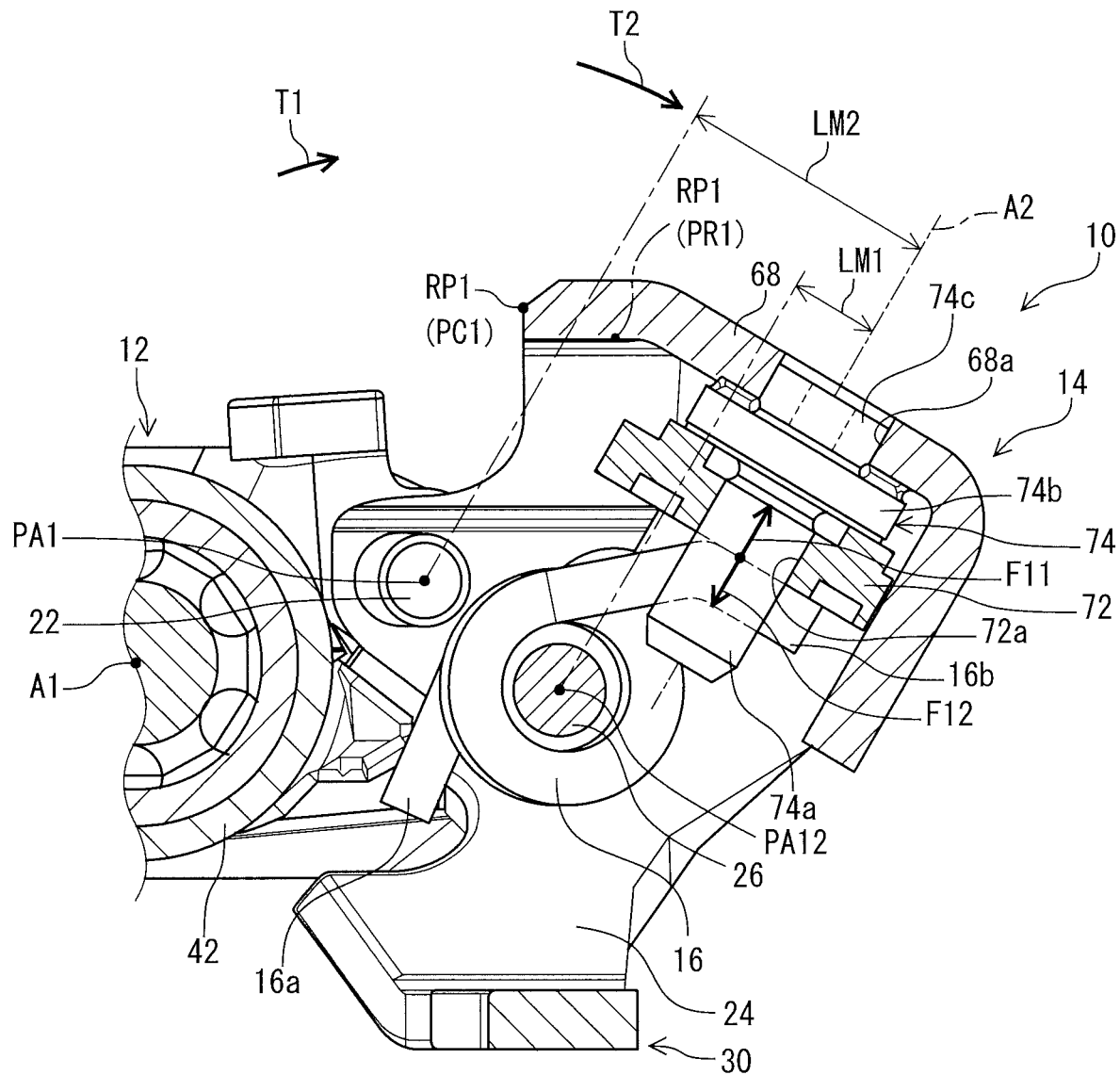
FIG. 13 is a partial enlarged cross-sectional view of the bicycle pedal taken along line XIII-XIII of FIG. 2.
Figure 14:
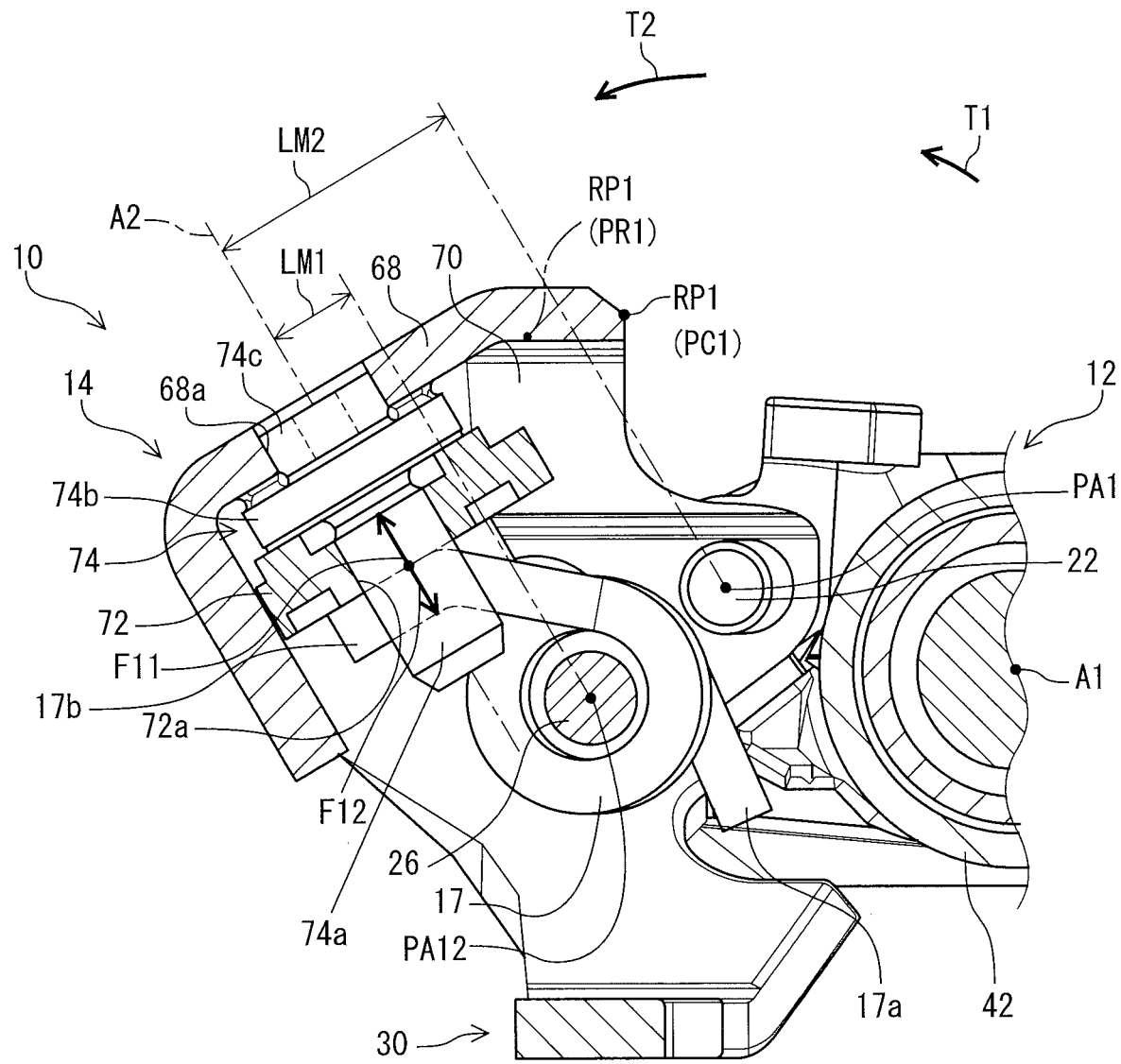
FIG. 14 is a partial enlarged cross-sectional view of the bicycle pedal taken along line XIV-XIV of FIG. 2.

The first pivot shaft 26 extends through the biasing member 16 and the secondary biasing member 17. The biasing member 16 and the secondary biasing member 17 are mounted to the pedal body 12 with the first pivot shaft 26. Thus, the biasing member 16 and the secondary biasing member 17 are mounted on the secondary pivot axis PA12. However, the biasing member 16 and the secondary biasing member 17 can be mounted on the pivot axis PA1 or at the other location of on the pedal body 12. As seen in FIG. 13, the biasing member 16 includes the first end 16a and the second end 16b. As seen in FIG. 14, the secondary biasing member 17 includes a third end 17a and a fourth end 17b.

As seen in FIG. 13, the biasing member 16 is configured to bias the first engagement member 14 relative to the pedal body 12 toward the third position P3. The first end 16a is configured to engage with the pedal body 12. The second end 16b is configured to engage with the first engagement member 14. In the illustrated embodiment, the first end 16a is configured to engage with the axle portion 42 of the pedal body 12. The second end 16b is configured to engage with the adjustment plate 72 of the first engagement member 14.

As seen in FIG. 14, the secondary biasing member 17 is configured to bias the first engagement member 14 relative to the pedal body 12 toward the third position P3. The third end 17a is configured to engage with the pedal body 12. The fourth end 17b is configured to engage with the first engagement member 14. In the illustrated embodiment, the third end 17a is configured to engage with the axle portion 42 of the pedal body 12. The fourth end 17b is configured to engage with the adjustment plate 72 of the first engagement member 14.

As seen in FIGS. 13 and 14, the flange portion 74b of the adjustment bolt 74 is pressed against the clamping body 68 by the biasing member 16 and the secondary biasing member 17. A biasing force F11 is applied to the first engagement member 14 (the adjustment plate 72) by the biasing member 16 and the secondary biasing member 17. An actuating force F12 greater than an amount of the biasing force F11 is needed to pivot the first engagement member 14 toward the releasing position PR1. The actuating force F12 directs in an opposite direction of the biasing force F11. Each of the biasing force F11 and the actuating force F12 can be defined on the center axis A2 of the adjustment bolt 74, for example.

As seen in FIG. 13, the secondary pivot axis PA12 is closer to the center axis A2 of the adjustment bolt 74 than the pivot axis PAL A first minimum distance LM1 is defined between the secondary pivot axis PA12 and the center axis A2. A second minimum distance LM2 is defined between the pivot axis PA1 and the center axis A2. The first minimum distance LM1 is shorter than the second minimum distance LM2. Furthermore, the secondary pivot axis PA12 is farther from the pedal axle 20 than the pivot axis PAL More specifically, the secondary pivot axis PA12 is farther from the pedal axis A1 of the pedal body 12 than the pivot axis PA1.

As seen in FIG. 13, the first sub member 24, the secondary pivot axis PA12, the first engagement member 14, the pivot axis PA1, the biasing member 16, and the secondary biasing member 17 are configured such that a first torque T1 to pivot the first sub member 24 about the secondary pivot axis PA12 is less than a second torque T2 to pivot the first engagement member 14 about the pivot axis PA1. In the illustrated embodiment, the first torque T1 can also be defined as a torque to pivot the first engagement member 14 about the secondary pivot axis PA12.

The first torque T1 is defined as a torque (a rotational moment) obtained by multiplying the actuating force F12 by the first minimum distance LM1. The second torque T2 is defined as a torque (a rotational moment) obtained by multiplying the actuating force F12 by the second minimum distance LM2. The first torque T1 is less than the second torque T2 since the first minimum distance LM1 is shorter than the second minimum distance LM2.

In the illustrated embodiment, the first torque T1 is less than the second torque T2. Accordingly, when the first engagement member 14 is pressed toward the releasing position PR1, the first engagement member 14 pivots relative to the pedal body 12 about the secondary pivot axis PA12 together with the first sub member 24 without pivoting relative to the first sub member 24 about the pivot axis PA1, at the first pivotal movement of the first engagement member 14. Then, after the first sub member 24 contacts the second receiving surface 52b of the stopper 48 due to a pivotal movement of the first sub member 24, the first sub member 24 is not further rotatable, then the first engagement member 14 pivots relative to the first sub member 24. In addition, as seen in FIG. 5, the bicycle pedal 10 can further comprises the additional biasing member 32 and an additional secondary biasing member 33 configured to bias the third engagement member 28 relative to the pedal body 12 toward the ninth position P9 (FIG. 6). The structure and functions of the additional biasing member 32 and the additional secondary biasing member 33 with respect to the third engagement member 28 and the second sub member 36 is substantially the same as those of the biasing member 16 and the secondary biasing member 17 with respect to the first engagement member 14 and the first sub member 24, respectively.

In the bicycle pedal 10, the first sub member 24 is restricted from pivoting about the secondary pivot axis PA12 relative to the pedal body 12 when the bicycle cleat 2 (FIG. 1) is released from the bicycle pedal 10.

More specifically, as seen in FIG. 6, the bicycle pedal 10 comprises a restricting structure 76. The restricting structure 76 is configured to restrict the first sub member 24 from pivoting about the secondary pivot axis PA12 relative to the pedal body 12. In the illustrated embodiment, the restricting structure 76 is configured to restrict the first sub member 24 from moving from a restricted position Pr1 toward the second position P2. The restricted position Pr1 is defined between the first position P1 and the second position P2. However, the restricted position Pr1 can completely coincide with the first position P1.

As seen in FIG. 6, the restricting structure 76 includes a first pressed portion 78 configured to be pressed by the bicycle cleat 2 (FIG. 1) so that the first sub member 24 is restricted from pivoting relative to the pedal body 12 about the secondary pivot axis PA12 toward the second position P2. The first pressed portion 78 is pressed by the bicycle cleat 2 in a state where the first engagement member 14 and the second engagement member 18 clamp the bicycle cleat 2. The first sub member 24 is positioned at the restricted position Pr1 in a state where the first pressed portion 78 is pressed by the bicycle cleat 2. In other words, the first sub member 24 is restricted from pivoting relative to the pedal body 12 about the secondary pivot axis PA12 toward the second position P2 when the first pressed portion 78 is pressed by the bicycle cleat 2.

In the illustrated embodiment, as seen in FIG. 1, the restricting structure 76 includes a pair of first pressed portions 78 configured to be pressed by the bicycle cleat 2 so that the first sub member 24 is restricted from pivoting relative to the pedal body 12 about the secondary pivot axis PA12 toward the second position P2 (FIG. 6). Each of the first pressed portions 78 is contactable with the bicycle cleat 2. In the illustrated embodiment, each of the first pressed portions 78 is contactable with the attachment plate 8 of the bicycle cleat 2.

The first pressed portions 78 are spaced apart from each other in the axial direction D1. The first pressed portions 78 are respectively provided on the coupling portions 40. The first pressed portions 78 respectively protrude from the coupling portions 40.

As seen in FIG. 6, the first pressed portion 78 is provided on the first sub member 24 and is pivotable integrally with the first sub member 24 about the secondary pivot axis PA12. The first pressed portion 78 protrudes from the first sub member 24 away from the pivot axis PA1. The pivot axis PA1 is provided between the first pressed portion 78 and the secondary pivot axis PA12.

Figure 15:
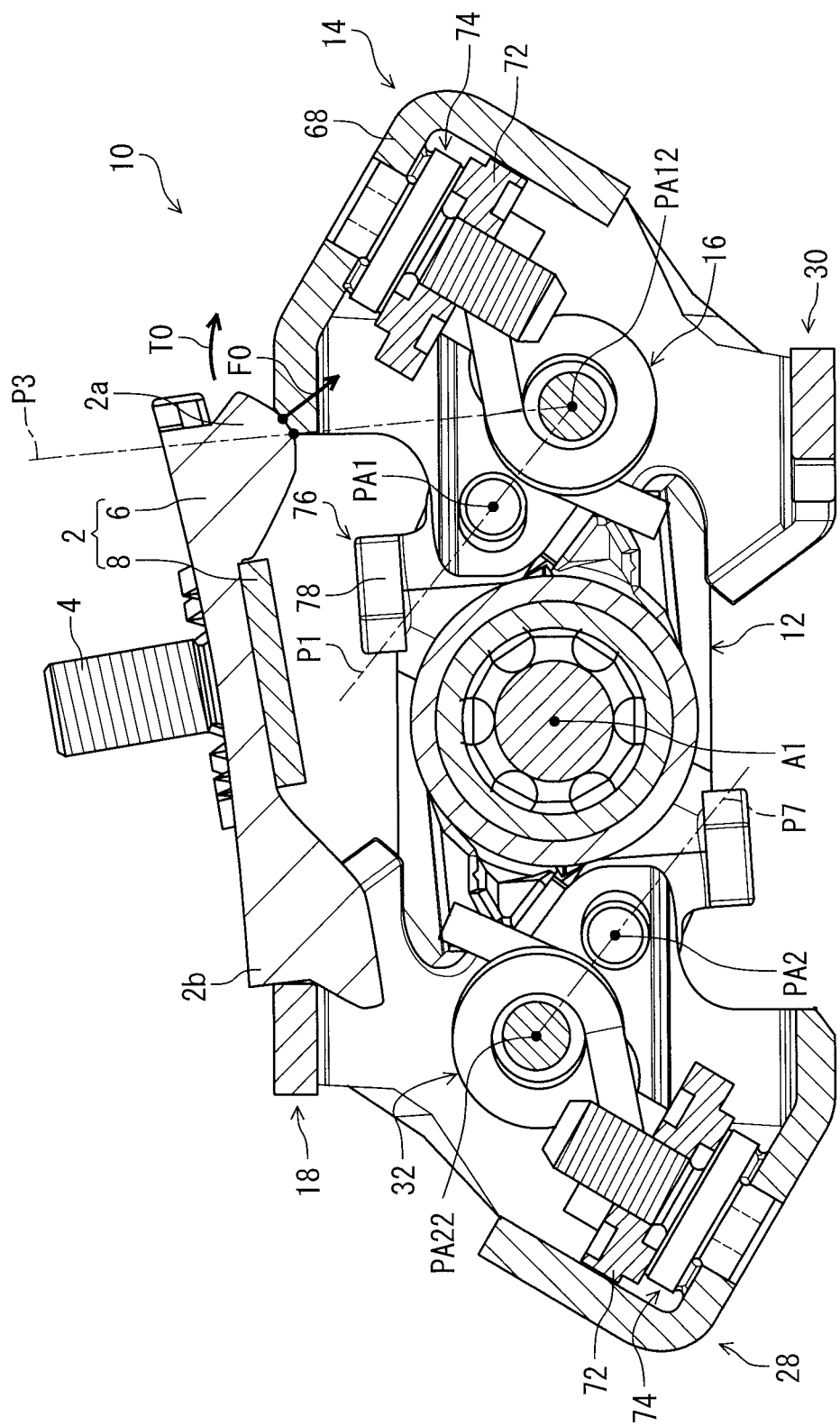
FIG. 15 is a cross-sectional view of the bicycle pedal illustrated in FIG. 1 for explaining a step-in operation of the bicycle pedal.

As seen in FIG. 15, the first pressed portion 78 is disposed at a position such that, in a step-in operation of the bicycle pedal 10, the first engagement member 14 comes into contact with the bicycle cleat 2 before the first pressed portion 78 comes into contact with the bicycle cleat 2. More specifically, in the step-in operation of the bicycle pedal 10, the rear end 2a of the bicycle cleat 2 is engaged with the second engagement member 18. After that, the front end 2b of the bicycle cleat 2 is pressed against the first engagement member 14. The step-in operation is an operation in which a user (a rider) clips into the bicycle pedal 10. An actuating force F0 is applied to the first engagement member 14 from the bicycle cleat 2 attached to the sole of the shoe (not shown). An actuating torque T0 is applied to the first engagement member 14 in response to the actuating force F0.

Figure 16:
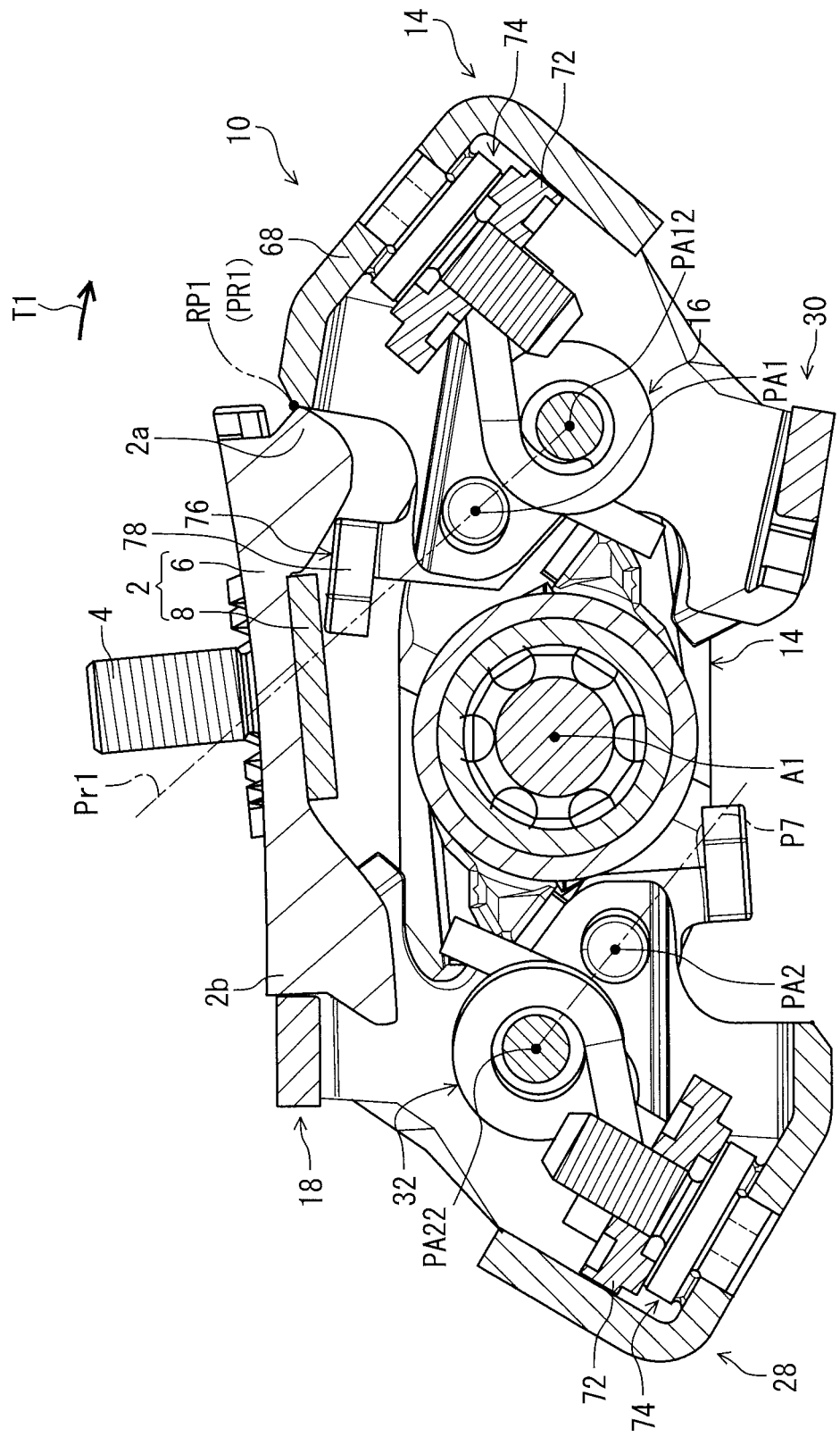
FIG. 16 is a cross-sectional view of the bicycle pedal illustrated in FIG. 1 for explaining the step-in operation of the bicycle pedal.

As seen in FIG. 16, when the actuating torque T0 reaches the first torque T1, the first engagement member 14 pivots relative to the pedal body 12 about the secondary pivot axis PA12 together with the first sub member 24. Then, as illustrated in FIGS. 7 and 8, the first engagement member 14 pivots relative to the first sub member 24 and slides in the slide direction DS1. In the state shown in FIG. 16, the bicycle cleat 2 comes into contact with the first pressed portions 78.

Figure 17:
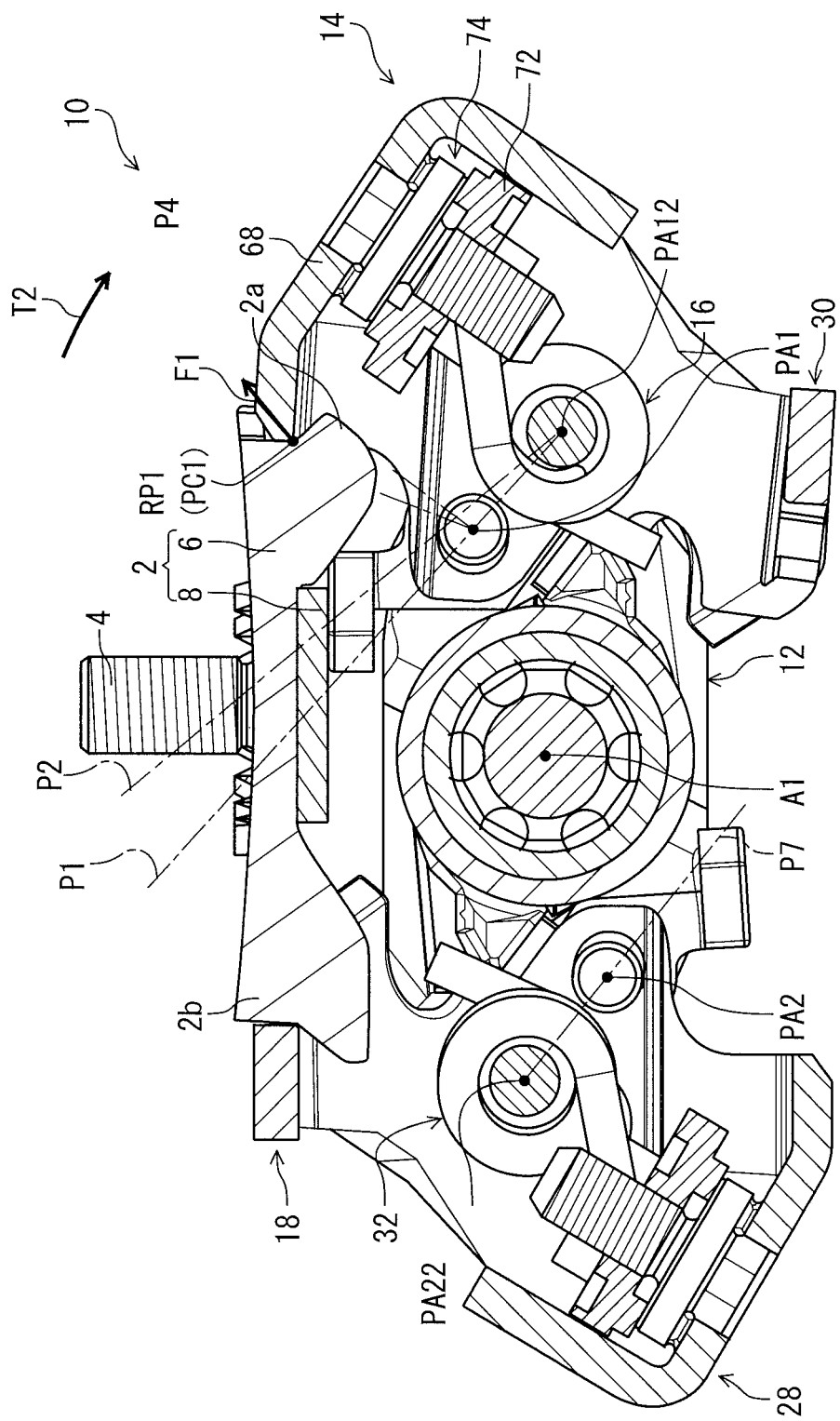
FIG. 17 is a cross-sectional view of the bicycle pedal illustrated in FIG. 1 for explaining the step-in operation of the bicycle pedal.

As seen in FIG. 17, when the bicycle cleat 2 is further pressed against the first engagement member 14, the rear end 2a of the bicycle cleat 2 enters under the first engagement member 14. Thus, the bicycle cleat 2 is clamped between the first engagement member 14 and the second engagement member 18. In this state, the first engagement member 14 is positioned at the clamping position PC1. The first pressed portions 78 of the restricting structure 76 are in contact with the bicycle cleat 2 in a state where the bicycle cleat 2 is clamped between the first engagement member 14 and the second engagement member 18. The first sub member 24 is positioned at the first position P1 in a state where the first pressed portions 78 are in contact with the bicycle cleat 2. In this state, the restricting structure 76 restricts the first sub member 24 from pivoting relative to the pedal body 12 about the secondary pivot axis PA12 toward the second position P2.

During a step-out operation (an operation in which the user releases the bicycle cleat 2 of the shoe from the bicycle pedal 10), for example, the user (e.g., a rider) twists the shoe about a vertical axis to apply a removing force F1 via the bicycle cleat 2 to the second engagement member 18. While the rider twists the shoe, at first, as illustrated in FIG. 5, the first sub member 24 pivots relative to the pedal body 12 about the secondary pivot axis PA12 together with the first engagement member 14. Then, as illustrated in FIG. 6, the first engagement member 14 pivots relative to the first sub member 24 about the pivot axis PA1 Finally, as illustrated in FIG. 7, the first engagement member 14 slides relative to the first sub member 24 in the slide direction DS1.

With the bicycle pedal 10, the first engagement member 14 is pivotable about the pivot axis PA1 in the pivot direction DP1 and slidable in the slide direction DS1 between the clamping position PC1 and the releasing position PR1. The slide direction DS1 is different from the pivot direction DP1. Accordingly, it is possible to prevent superfluous twist of the biasing member 16 to decrease superfluous repulsive force from the biasing member 16 when the bicycle cleat 2 is mounted onto and released from the bicycle pedal 10. Therefore, it is possible to smoothly mount the bicycle cleat 2 onto the bicycle pedal 10 and release the bicycle cleat 2 from the bicycle pedal 10, because the first engagement member 14 is pivotable and slidable.

Second Embodiment

A bicycle pedal 110 in accordance with a second embodiment will be described below referring to FIGS. 18 to 20. Elements having substantially the same function as those in the first embodiment will be numbered the same here, and will not be described and/or illustrated again in detail here for the sake of brevity.

Figure 18:
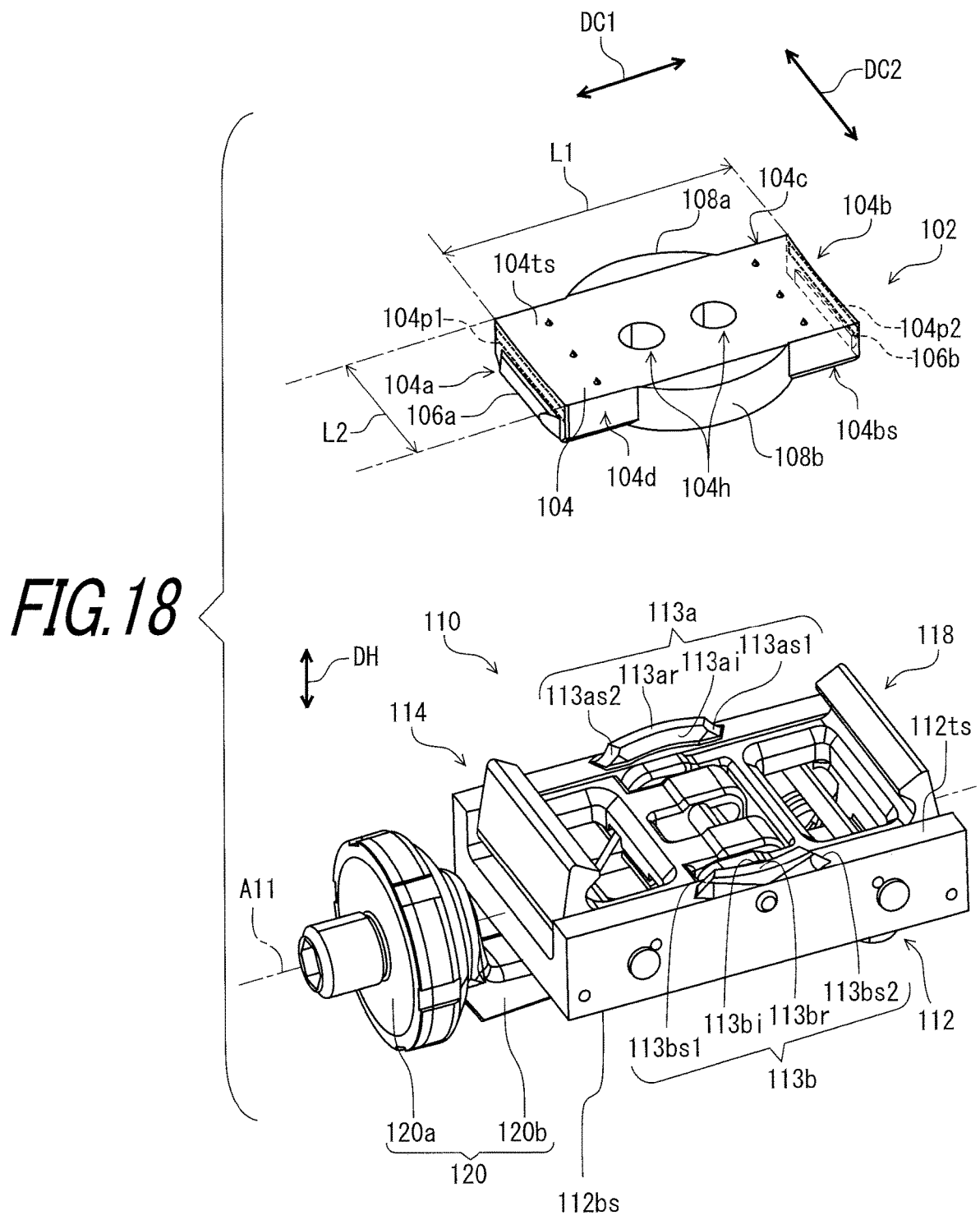
FIG. 18 is a perspective view of a bicycle pedal in accordance with a second embodiment, with a bicycle cleat.
Figure 19:
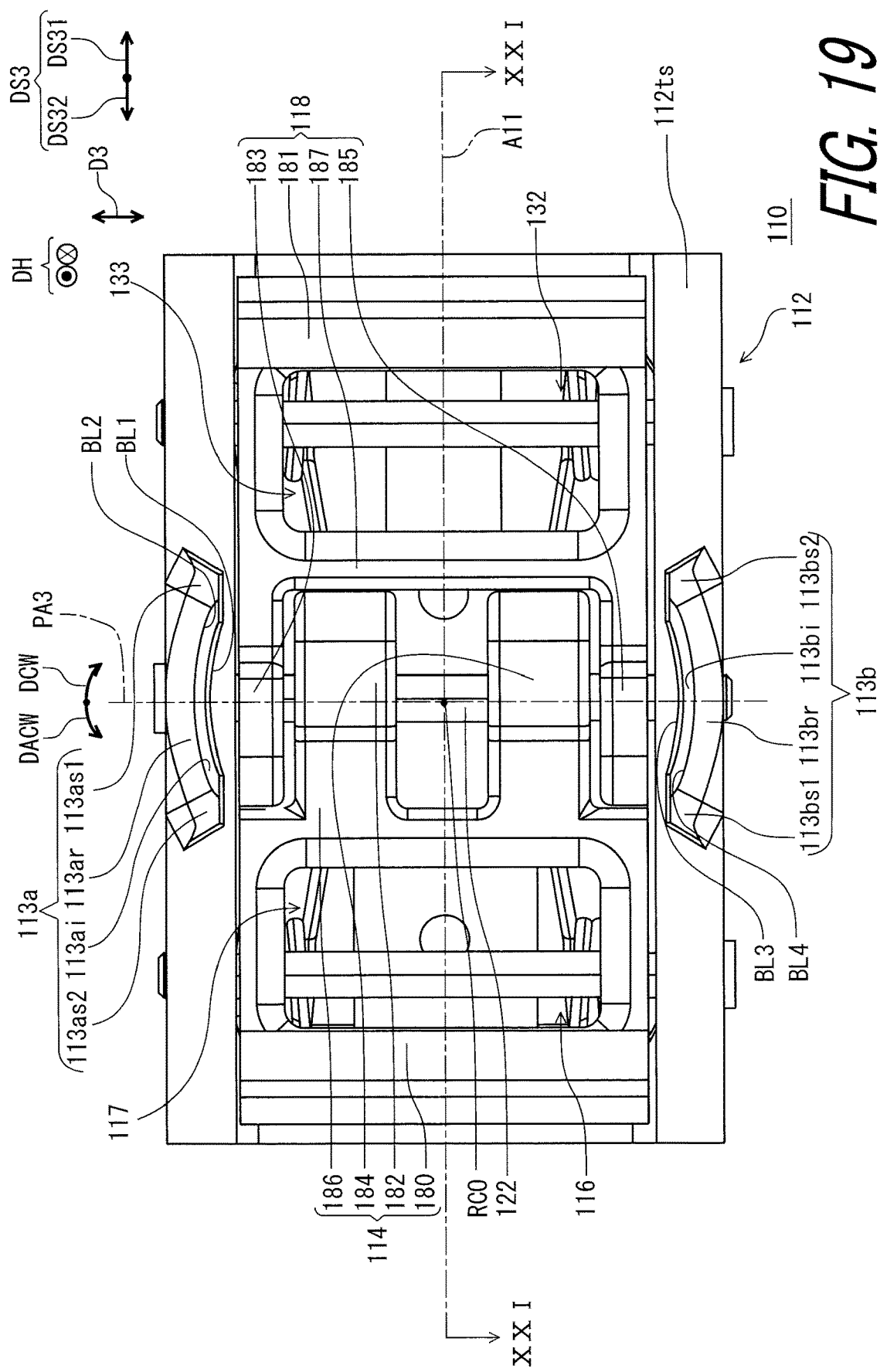
FIG. 19 is a top view of the bicycle pedal illustrated in FIG. 18.

Referring initially to FIGS. 18 and 19, a bicycle pedal 110 in accordance with the second embodiment comprises a pedal body 112, a first engagement member 114, and a biasing member 116. The bicycle pedal 110 further comprises a second engagement member 118. The bicycle pedal 110 further comprises a pedal axle 120 having a pedal axis A11. The pedal axle 120 is configured to be secured to a crank arm (not shown). The pedal axle 120 includes a pedal axle main body 120a and a pedal support portion 120b. The pedal axle main body 120a is configured to be secured to the crank arm. The pedal support portion 120b is rotatable about the pedal axis A11 relative to the pedal axle main body 120a such that the pedal support portion 120b deviates from the pedal axis A11. The pedal body 112 is supported on the pedal support portion 120b. More specifically, as seen in FIG. 18, the pedal body 112 has a top surface 112ts and a bottom surface 112bs opposite to the top surface 112ts in a height direction DH along a height of the bicycle pedal 110, and the pedal support portion 120b is attached to the bottom surface 112bs of the pedal body. Accordingly, the center of gravity of the pedal body 112 is positioned on or adjacent to the pedal axis A11. Since the pedal support portion 120b is rotatable about the pedal axis A11, the pedal body 112 is rotatable relative to the pedal axle 120 about the pedal axis A11. The first engagement member 114 is coupled to the pedal body 112. The second engagement member 118 is coupled to the pedal body 112. The second engagement member 118 is configured to clamp a bicycle cleat 102 together with the first engagement member 114.

In the illustrated embodiment, the first engagement member 114 is a left engagement member configured to engage with a left end of the bicycle cleat 102. The second engagement member 118 is a right engagement member configured to engage with a right end of the bicycle cleat 102. However, the first engagement member 114 can be a right or front/rear engagement member, and the second engagement member 118 can be a left or front/rear engagement member if needed and/or desired. Further, as seen in FIGS. 18 and 20, the bicycle cleat 102 comprises a main body 104, a first pedal engagement portion 106a, and a second pedal engagement portion 106b. The main body 104 is configured to be attached to a sole of a bicycle shoe. The main body 104 is attached to the sole of the bicycle shoe for example, by using bolts (e.g. bolt 4 in FIG. 1) extending through bolt holes 104h of the main body 104. The main body 104 has a first end portion 104a and a second end portion 104b opposite to the first end portion 104a in a first direction DC1. The first pedal engagement portion 106a is provided on the first end portion 104a of the main body 104 and extends in a second direction DC2 substantially perpendicular to the first direction DC1. The second pedal engagement portion 106b is provided on the second end portion 104b of the main body 104 and extends in the second direction DC2. A ratio of a first length L1 of the bicycle cleat 102 in the first direction DC1 to a second length L2 of the bicycle cleat 102 in the second direction DC2 is more than or equal to 4/3 and less than or equal to 2. Suppose the first engagement member 114 of the bicycle pedal 110 contacts a first part 104p1 of the first end portion 104a of the bicycle cleat 102 and the second engagement member 118 of the bicycle pedal 110 contacts a second part 104p2 of the second end portion 104b when the bicycle cleat 102 engages with the bicycle pedal 110, the first length L1 is a distance between the first part 104p1 of the first end portion 104a and the second part 104p2 of the second end portion 104b in the first direction DC1, and the second length L2 is a distance of the first part 104p1 of the first end portion 104a and a distance of the second part 104p2 of the second end portion 104b in the second direction DC2.

As seen in FIGS. 18 and 19, the bicycle pedal 110 further comprises a first guide portion 113a and a second guide portion 113b opposite to the first guide portion 113a in a direction (substantially the same as a pivot axial direction D3 along a pivot axis PA3 about the first engagement member 114 and the second engagement member 118 are pivotable, which is explained in detail below) perpendicular to the pedal axis A11. The first guide portion 113a and the second guide portion 113b protrude from the top surface 112ts of the pedal body 112 in the height direction DH. Each of the first guide portion 113a and the second guide portion 113b is substantially arc shaped. Preferably, as seen in FIG. 19, a shape of the first guide portion 113a is substantially symmetrical with respect to the pivot axis PA3 as viewed in the height direction DH. Preferably, a shape of the second guide portion 113b is substantially symmetrical with respect to the pivot axis PA3 as viewed in the height direction DH. Preferably, the shape of the first guide portion 113a and the shape of the second guide portion 113b are substantially symmetrical with respect to the pedal axis A11 as viewed in the height direction DH.

The first guide portion 113a includes a first ridge 113ar, a first clockwise-side end slope 113as1, a first anticlockwise-side end slope 113as2, and a first inner slope 113ai. The first ridge 113ar is a projection tip of the first guide portion 113a. Each of the first clockwise-side end slope 113as1 and the first anticlockwise-side end slope 113as2 connects the first ridge 113ar and the top surface 112ts of the pedal body 112. The first anticlockwise-side end slope 113as2 is opposite to the first clockwise-side end slope 113*as*1 with respect to the first ridge 113*ar*. The first inner slope 113*ai* connects the first ridge 113*ar* and the top surface 112*ts* of the pedal body 112 and inclines toward the second guide portion 113*b* in the direction perpendicular to the pedal axis A11. A first boundary line BL1 between the first inner slope 113*ai* and the top surface 112*ts* of the pedal body 112 has an arc shape. A second boundary line BL2 between the first inner slope 113*ai* and the first ridge 113*ar* has an arc shape. A length of the second boundary line BL2 is longer than a length of the first boundary line BL1.

The second guide portion 113*b* includes a second ridge 113*br*, a second clockwise-side end slope 113*bs*1, a second anticlockwise-side end slope 113*bs*2, and a second inner slope 113*bi*. The second ridge 113*br* is a projection tip of the second guide portion 113*b*. Each of the second clockwise-side end slope 113*bs*1 and the second anticlockwise-side end slope 113*bs*2 connects the second ridge 113*br* and the top surface 112*ts* of the pedal body 112. The second anticlockwise-side end slope 113*bs*2 is opposite to the second clockwise-side end slope 113*bs*1 with respect to the second ridge 113*br*. The second inner slope 113*bi* connects the second ridge 113*br* and the top surface 112*ts* of the pedal body 112 and inclines toward the first guide portion 113*a* in the direction perpendicular to the pedal axis A11. A third boundary line BL3 between the second inner slope 113*bi* and the top surface 112*ts* of the pedal body 112 has an arc shape. A fourth boundary line BL4 between the second inner slope 113*bi* and the second ridge 113*br* has an arc shape. A length of the fourth boundary line BL4 is longer than a length of the third boundary line BL3.

Figure 20:
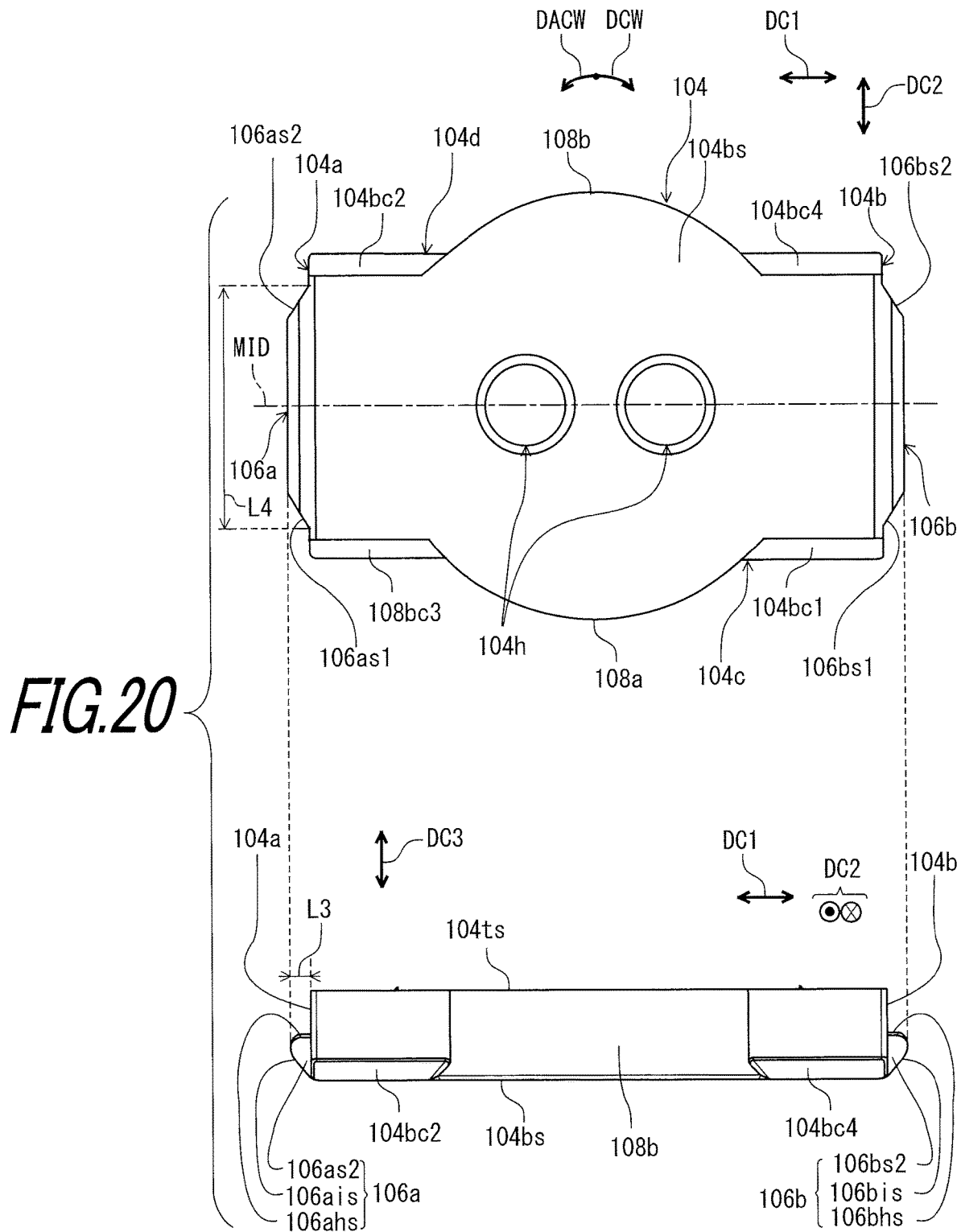
FIG. 20 is a bottom view and a front view of the bicycle cleat illustrated in FIG. 18.

As seen in FIGS. 18 and 20, the main body 104 of the bicycle cleat 102 further has a third end portion 104*c* and a fourth end portion 104*d*. The third end portion 104*c* connects the first end portion 104*a* and the second end portion 104*b*. The fourth end portion 104*d* connects the first end portion 104*a* and the second end portion 104*b* opposite to the third end portion 104*c* in the second direction DC2. The bicycle cleat 2 further comprises a first guided portion 108*a* and a second guided portion 108*b* opposite to the first guided portion 108*a* in the second direction DC2. The first guided portion 108*a* protrudes from the third end portion 104*c* in the second direction DC2. The second guided portion 108*b* protrudes from the fourth end portion 104*d* in the second direction DC2. Preferably, a shape of the second guided portion 108*b* is substantially the same as a shape of the first guided portion 108*a*. Accordingly, the second guided portion 108*b* can be referred to as the first guided portion 108*a*, and vice versa.

The first guided portion 108*a* has an outer peripheral edge which fits with the first boundary line BL1. The outer peripheral edge of the first guided portion 108*a* has an arc shape. The second guided portion 108*b* has an outer peripheral edge which fits with the third boundary line BL3. The outer peripheral edge of the second guided portion 108*b* has an arc shape. Since the first inner slope 113*ai*, the second inner slope 113*bi*, and the outer peripheral edges of the first guided portion 108*a* and the second guided portion 108*b* have shapes as described above, the first guided portion 108*a* and the second guided portion 108*b* of the bicycle cleat 102 is guided to a position between the first boundary line BL1 and the third boundary line BL3 during the step-in operation, the bicycle cleat 102 is rotatable about a rotation center axis RCO (See FIG. 19) which extends in the height direction DH, and the first inner slope 113*ai* and the second inner slope 113*bi* restrain the bicycle cleat 102 from deviating in the direction perpendicular to the pedal axis A11.

Preferably, the rotation center RCO is an intersection of the pedal axis A11 and the pivot axis PA3 as viewed in the height direction DH.

The main body 104 of the bicycle cleat 102 has a top surface 104*ts* to which the sole of the bicycle shoe is attached, and a bottom surface 104*bs* provided opposite to the top surface 104*ts* to face the bicycle pedal 110. As seen in FIG. 20, the main body 104 includes a first chamfer 104*bc*1, a second chamfer 104*bc*2, a third chamfer 104*bc*3, and a fourth chamfer 104*bc*4. The first chamfer 104*bc*1 and the third chamfer 104*bc*3 are provided between the bottom surface 104*bs* and the third end portion 104*c*. The second chamfer 104*bc*2 and the fourth chamfer 104*bc*4 are provided between the bottom surface 104*bs* and the fourth end portion 104*d*. As seen in FIGS. 18 and 19, the first clockwise-side end slope 113*as*1 of the first guide portion 113*a* and the second clockwise-side end slope 113*as*1 of the second guide portion 113*b* are inclined to the top surface 112*ts* of the pedal body 112 in a clockwise direction DCW about the rotation center axis RCO. The first anticlockwise-side end slope 113*as*2 of the first guide portion 113*a* and the second anticlockwise-side end slope 113*bs*2 of the second guide portion 113*b* are inclined to the top surface 112*ts* of the pedal body 112 in an anticlockwise direction DACW about the rotation center axis RCO. The first chamfer 104*bc*1 of the bicycle cleat 102 is configured to slide on the first clockwise-side end slope 113*as*1 of the first guide portion 113*a* when the bicycle cleat 102 rotates in the anticlockwise direction DACW after the first engagement member 114 engages with the first pedal engagement portion 106*a* and the second engagement member 118 engages with the second pedal engagement portion 106*b*. The second chamfer 104*bc*2 of the bicycle cleat 102 is configured to slide on the second clockwise-side end slope 113*bs*1 of the second guide portion 113*b* when the bicycle cleat 102 rotates in the anticlockwise direction DACW after the first engagement member 114 engages with the first pedal engagement portion 106*a* and the second engagement member 118 engages with the second pedal engagement portion 106*b*. The third chamfer 104*bc*3 of the bicycle cleat 102 is configured to slide on the first anticlockwise-side end slope 113*as*2 of the first guide portion 113*a* when the bicycle cleat 102 rotates in the clockwise direction DCW after the first engagement member 114 engages with the first pedal engagement portion 106*a* and the second engagement member 118 engages with the second pedal engagement portion 106*b*. The fourth chamfer 104*bc*4 of the bicycle cleat 102 is configured to slide on the second anticlockwise-side end slope 113*bs*2 of the second guide portion 113*b* when the bicycle cleat 102 rotates in the clockwise direction DCW after the first engagement member 114 engages with the first pedal engagement portion 106*a* and the second engagement member 118 engages with the second pedal engagement portion 106*b*. Accordingly, the bicycle cleat 102 can be easily released from the bicycle pedal 110 by rotating the bicycle cleat 102 in either the clockwise direction DCW or the anticlockwise direction DACW.

As seen in FIG. 20, the first pedal engagement portion 106*a* includes a first hook surface 106*ahs*, a first insertion surface 106*ais*, a first side chamfer 106*as*1, and a second side chamfer 106*as*2. The first hook surface 106*ahs* is configured to engage with the first engagement member 114 while the bicycle cleat 102 is attached to the bicycle pedal 110. Preferably, the first hook surface 106*ahs* is substantially parallel to the first direction DC1 and the second direction DC2. Alternatively, the first hook surface 106*ahs* is preferably inclined such that an angle made by the first hook surface 106*ahs* and the first end portion 104*a* viewed in the second direction DC2 is an acute angle, i.e. the first hook surface 106*ahs* is preferably inclined such that the first hook surface 106*ahs* faces toward a bicycle shoe when the bicycle shoe is attached to the bicycle cleat 102. The first insertion surface 106*ais* is connected to the first hook surface 106*ahs* and inclined to the bottom surface 104*bs* of the main body 104 in a third direction DC3 perpendicular to both the first direction DC1 and the second direction DC2. The first insertion surface 106*ais* is configured to contact the first engagement member 114 during the step-in operation.

The first side chamfer 106*as*1 connects the first hook surface 106*ahs*, the first insertion surface 106*ais*, and the first end portion 104*a*. The first side chamfer 106*as*1 is inclined from the first end portion 104*a* toward a middle MID of the first pedal engagement portion 106*a* in the second direction DC2. The second side chamfer 106*as*2 is opposite to the first side chamfer 106*as*1 in the second direction DC2. The second side chamfer 106*as*2 connects the first hook surface 106*ahs*, the first insertion surface 106*ais*, and the first end portion 104*a*. The second side chamfer 106*as*2 is inclined from the first end portion 104*a* toward the middle MID of the first pedal engagement portion 106*a* in the second direction DC2. As shown in an upper drawing in FIG. 20, the first pedal engagement portion 106*a* is apart from the third end portion 104*c* and the fourth end portion 104*d* in the second direction DC2. That is, the first side chamfer 106*as*1 is apart from the third end portion 104*c* in the second direction DC2, and the second side chamfer 106*as*2 is apart from the fourth end portion 104*d* in the second direction DC2. Since the first side chamber 106*as*1 and the second side chamber 106*as*2 are inclined toward the middle MID of the first pedal engagement portion 106*a* in the second direction DC2, the first pedal engagement portion 106*a* tapers off as it separates from the first end portion 104*a*.

Similarly, the second pedal engagement portion 106*b* includes a second hook surface 106*bhs*, a second insertion surface 106*bis*, a third side chamfer 106*bs*1, and a fourth side chamfer 106*bs*2. The second hook surface 106*bhs* is configured to engage with the second engagement member 118 while the bicycle cleat 102 is attached to the bicycle pedal 110. Preferably, the second hook surface 106*bhs* is substantially parallel to the first direction DC1 and the second direction DC2. Alternatively, the second hook surface 106*bhs* is preferably inclined such that an angle made by the second hook surface 106*bhs* and the second end portion 104*b* viewed in the second direction DC2 is an acute angle, i.e. the second hook surface 106*bhs* s is preferably inclined such that the second hook surface 106*bhs* faces toward a bicycle shoe when the bicycle shoe is attached to the bicycle cleat 102. The second insertion surface 106*bis* is connected to the second hook surface 106*bhs* and inclined to the bottom surface 104*bs* of the main body 104 in the third direction DC3. The second insertion surface 106*bis* is configured to contact the second engagement member 118 during the step-in operation.

The third side chamfer 106*bs*1 connects the second hook surface 106*bhs*, the second insertion surface 106*bis*, and the second end portion 104*b*. The third side chamfer 106*bs*1 is inclined from the second end portion 104*b* toward the middle MID of the second pedal engagement portion 106*b* in the second direction DC2. The fourth side chamfer 106*bs*2 is opposite to the third side chamfer 106*bs*1 in the second direction DC2. The fourth side chamfer 106*bs*2 connects the second hook surface 106*bhs*, the second insertion surface 106*bis*, and the second end portion 104*b*. The fourth side chamfer 106*bs*2 is inclined from the second end portion 104*b* toward the middle MID of the second pedal engagement portion 106*b* in the second direction DC2. As shown in an upper drawing in FIG. 20, the second pedal engagement portion 106*b* is apart from the third end portion 104*c* and the fourth end portion 104*d* in the second direction DC2. That is, the third side chamfer 106*bs*1 is apart from the third end portion 104*c* in the second direction DC2, and the fourth side chamfer 106*bs*2 is apart from the fourth end portion 104*d* in the second direction DC2. Since the third side chamber 106*bs*1 and the fourth side chamber 106*bs*2 are inclined toward the middle MID of the second pedal engagement portion 106*b* in the second direction DC2, the second pedal engagement portion 106*b* tapers off as it separates from the second end portion 104*b*.

Preferably, a shape of the second pedal engagement portion 106*b* is substantially the same as a shape of the first pedal engagement portion 106*a*. Accordingly, the second pedal engagement portion 106*b* can be referred to as the first pedal engagement portion 106*a*, and vice versa. As seen in FIG. 20, a length of each of the first pedal engagement portion 106*a* and the second pedal engagement portion 106*b* in the first direction DC1 is L3, and a length of each of the first pedal engagement portion 106*a* and the second pedal engagement portion 106*b* in the second direction DC2 is L4. L4 is shorter than L2. A necessary rotation amount of the bicycle cleat 102 to be released from the bicycle pedal 110 is defined based on L3 and L4.

Figure 21:
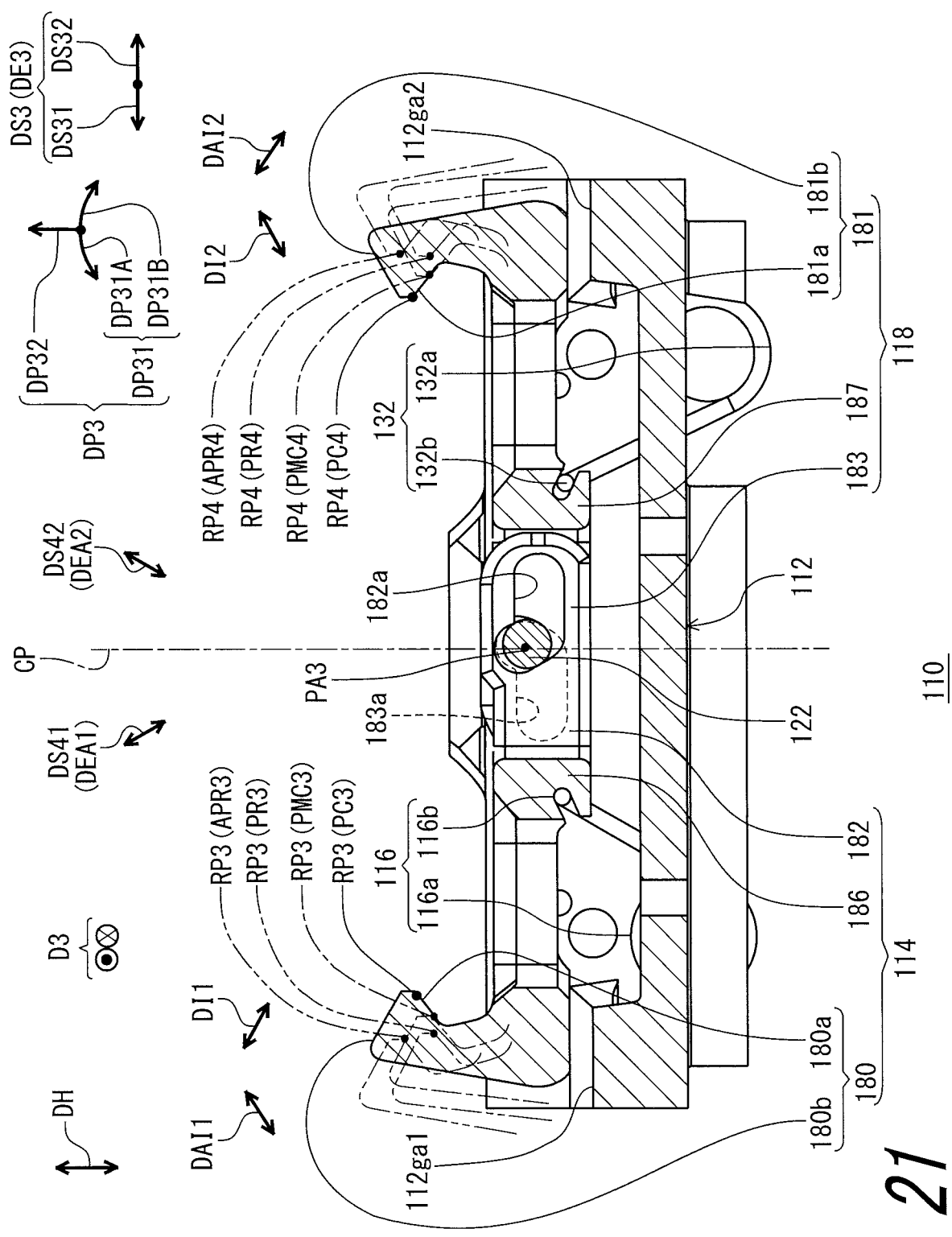
FIG. 21 is a cross-sectional view of the bicycle pedal taken along line XXI-XXI of FIG. 19.

As seen in FIG. 21, the first engagement member 114 is movably coupled to the pedal body 112 between a clamping position PC3 and a releasing position PR3. The first engagement member 114 is positioned at the clamping position PC3 in a state where the bicycle cleat 102 (FIG. 18) is clamped by the first engagement member 114. In this embodiment, the first engagement member 114 is positioned at the releasing position PR3 in the course of attaching the bicycle cleat 102 to the bicycle pedal 110. The first engagement member 114 returns to the clamping position PC3 when the bicycle cleat 102 engages with the first engagement member 114 and the second engagement member 118. In the illustrated embodiment, the first engagement member 114 is pivotable about the pivot axis PA3 in a pivot direction DP3 (more specifically, a pivot direction DP31A) and slidable in a slide direction DS3 (more specifically, DS31) between the clamping position PC3 and the releasing position PR3. The slide direction DS3 (DS31) is different from the pivot direction DP3 (DP31A). Ordinarily, the first engagement member 114 slides in the slide direction DS3 (DS31) after pivoting in the pivot direction DP3 (DP31A) during a clamping operation in which the first engagement member 114 moves from the clamping position PC3 toward the releasing position PR3 when the bicycle cleat 102 is pushed onto the first engagement member 114. FIG. 21 illustrates a movement change position PMC3 at which the movement of the first engagement member 114 changes from a pivotal movement about the pivot axis PA3 in the pivot direction DP3 (DP31A) to a slide movement in the slide direction DS3 (DS31). The first engagement member 114 contacts a first engagement member abutting portion 112*ga*1 of the pedal body 112 when the first engagement member 114 reaches the movement change position PMC3. Preferably, the first engagement member abutting portion 112*ga*1 extends in the slide direction DS3. The first engagement member 114 slides in the slide direction DS3 (DS31) with abutting on the first engagement member abutting portion 112*ga*1 to reach the releasing position PR3. After the first engagement member 114 reaches the releasing position PR3 during the clamping operation, then the first engagement member 114 usually pivots and returns to the clamping position PC3 to engage with the bicycle cleat 102 (more specifically, the first pedal engagement portion 106a). That is, during the clamping operation, the first engagement member 114 moves from the clamping position PC3 to the releasing position PR3 via the movement change position PMC3, then the first engagement member 114 returns to the clamping position PC3. While the first engagement member 114 returns to the clamping position PC3, the first engagement member 114 may pivot in the pivot direction DP3 (DP31A) after sliding in the slide direction DS3 (DS31). That is, the first engagement member 114 may pivot in the pivot direction DP3 (DP31A) after sliding in the slide direction DS3 (DS31) during the clamping operation in which the first engagement member 114 moves from the releasing position PR3 toward the clamping position PC3. During a releasing operation, the first engagement member 114 moves from the clamping position PC3 to another releasing position APR3. During the releasing operation, ordinarily the first engagement member 114 slides in an additional slide direction DS41 that is different from the slide direction DS3 (DS31), then slides in the slide direction DS3 (DS31). That is, the first engagement member 114 at least slides in the slide direction DS3 (DS31) during the releasing operation in which the first engagement member 114 moves from the clamping position PC3 toward another releasing position APR3. Here, in the illustrated embodiment, another releasing position APR3 is separated from the releasing position PR3, but another releasing position APR3 can be substantially the same as the releasing position PR3. Further, the first engagement member 114 can slide in the slide direction DS3 (DS31) after pivoting in the pivot direction DP3 (DP31A) during the releasing operation.

The pedal body 112 includes a pivot axle 122 that defines the pivot axis PA3. The pivot axis PA3 is defined as a center axis of the pivot axle 122. The pivot axle 122 is configured to pivotably support the first engagement member 114 about the pivot axis PA3. The pedal body 112 includes a pedal body main body to which the pivot axle 122 is attached. The pivot axis PA3 is perpendicular to the pedal axis A11 of the pedal body 112 as viewed in the height direction DH which is perpendicular to the pivot axis PA3 and the pedal axis A11. As seen in FIG. 19, the slide direction DS3 is parallel to the pedal axis A11. However, the bicycle pedal 110 can be attached to the pedal axle 120 in a manner as explained in the first embodiment. In such case, the slide direction DS3 can be perpendicular to the pedal axis A11. As seen in FIG. 21, in the illustrated embodiment, the clamping position PC3, the movement change position PMC3, the releasing position PR3, and another releasing position APR3 of the first engagement member 114 are defined based on a reference point RP3 of the first engagement member 114 with respect to the pivot axis PA3. An exterior wall of the first engagement member 114 which is disposed at the movement change position PMC3 is shown by a one-dot chain line. Exterior walls of the first engagement member 114 which are disposed at the releasing position PR3 and another releasing position APR3, respectively are shown by two-dot chain lines.

The second engagement member 118 is movably coupled to the pedal body 112 about the pivot axis PA3 between an additional clamping position PC4 and an additional releasing position PR4. The second engagement member 118 is positioned at the additional clamping position PC4 in a state where the bicycle cleat 102 (FIG. 18) is clamped by the second engagement member 118. In this embodiment, the second engagement member 118 is positioned at the additional releasing position PR4 in the course of attaching the bicycle cleat 102 to the bicycle pedal 110. The second engagement member 118 returns to the additional clamping position PC4 when the bicycle cleat 102 engages with the first engagement member 114 and the second engagement member 118. The second engagement member 118 is pivotable in the pivot direction DP3 (more specifically a pivot direction DP31B) and slidable in the slide direction DS3 (more specifically, DS32) between the additional clamping position PC4 and the additional releasing position PR4. The slide direction DS3 (the second slide direction DS32) is different from the pivot direction DP31B. Ordinarily, the second engagement member 118 slides in the slide direction DS3 (DS32) after pivoting in the pivot direction DP3 (DP31B) during a clamping operation in which the second engagement member 118 moves from the additional clamping position PC4 toward the additional releasing position PR4 when the bicycle cleat 102 is pushed onto the second engagement member 118. FIG. 21 illustrates an additional movement change position PMC4 at which the movement of the second engagement member 118 changes from a pivotal movement about the pivot axis PA3 in the pivot direction DP3 (DP31B) to a slide movement in the slide direction DS3 (DS32). The second engagement member 118 contacts a second engagement member abutting portion 112ga2 of the pedal body 112 when the second engagement member 118 reaches the additional movement change position PMC4. Preferably, the second engagement member abutting portion 112ga2 extends in the slide direction DS3. The second engagement member 118 slides in the slide direction DS3 (DS32) with abutting on the second engagement member abutting portion 112ga2 to reach the additional releasing position PR4. After the second engagement member 118 reaches the additional releasing position PR4 during the clamping operation, then the second engagement member 118 usually pivots and returns to the additional clamping position PC4 to engage with the bicycle cleat 102 (more specifically, the second pedal engagement portion 106b). That is, during the clamping operation, the second engagement member 118 moves from the additional clamping position PC4 to the additional releasing position PR4 via the additional movement change position PMC4, then the second engagement member 118 returns to the additional clamping position PC4. While the second engagement member 118 returns to the additional clamping position PC4, the second engagement member 118 may pivot in the pivot direction DP3 (DP31B) after sliding in the slide direction DS3 (DS32). That is, the second engagement member 118 may pivot in the pivot direction DP3 (DP31B) after sliding in the slide direction DS3 (DS32) during the clamping operation in which the second engagement member 118 moves from the additional releasing position PR4 toward the additional clamping position PC4. During a releasing operation, the second engagement member 118 moves from the additional clamping position PC4 to another additional releasing position APR4. During the releasing operation, ordinarily the second engagement member 118 slides in the secondary additional slide direction DS42 that is different from the slide direction DS3 (DS32), then slides in the slide direction DS3 (DS32). That is, the second engagement member 118 at least slides in the slide direction DS3 (DS32) during the releasing operation in which the second engagement member 118 moves from the additional clamping position PC4 toward another additional releasing position APR4. Here, in the illustrated embodiment, another additional releasing position APR4 is separated from the additional releasing position PR4, but another additional releasing position APR4 can be substantially the same as the additional releasing position PR4. Further, the second engagement member 118 can slide in the slide direction DS3 (DS32) after pivoting in the pivot direction DP3 (DP31B) during the releasing operation. As seen in FIG. 21, in the illustrated embodiment, the additional clamping position PC4, the additional movement change position PMC4, the additional releasing position PR4, and another additional releasing position APR4 of the second engagement member 118 are defined based on a reference point RP4 of the second engagement member 118 with respect to the pivot axis PA3. An exterior wall of the second engagement member 118 which is disposed at the additional movement change position PMC4 is shown by a one-dot chain line. Exterior walls of the second engagement member 118 which are disposed at the additional releasing position PR4 and another additional releasing position APR4, respectively are shown by two-dot chain lines.

In this embodiment, the slide direction DS3 is a bilateral direction including a first slide direction DS31 and a second slide direction DS32 opposite to the first slide direction DS31. Further, the pivot direction DP3 is a bilateral direction including a first pivot direction DP31 and a second pivot direction DP32 opposite to the first pivot direction DP31. In other words, the pivot directions DP31A and DP31B are directed downward in the height direction DH, whereas the second pivot direction DP32 is directed upward in the height direction DH. The first engagement member 114 and the second engagement member 118 pivot in the second pivot direction DP32 when the bicycle cleat 102 moves apart from the bicycle pedal 110 in the height direction. The movements of the first engagement member 114 and the second engagement member 118 are explained in detail posteriorly.

Further, a shape of the first engagement member 114 and a shape of the second engagement member 118 is substantially symmetrically similar with respect to a center plane CP that includes the pivot axis PA3 and is perpendicular to the pedal axis A11. More specifically, as seen in FIG. 19, the first engagement member 114 has a cleat engagement portion 180. In addition, the first engagement member 114 has a first coupling portion 182, a second coupling portion 184, and a biasing member hook portion 186. The second engagement member 118 has an additional cleat engagement portion 181. The second engagement member 118 has an additional first coupling portion 183, an additional second coupling portion 185, and an additional biasing member hook portion 187.

As seen in FIG. 21, the cleat engagement portion 180 includes a cleat engagement surface 180a and a cleat receiving surface 180b. That is, the first engagement member 114 has the cleat engagement surface 180a and the cleat receiving surface 180b. The cleat receiving surface 180b is inclined toward the pedal body 112 in an inclination direction DI1 that is slanted from the slide direction DS3. The cleat engagement surface 180a faces toward the pedal body 112 and is inclined toward the pedal body 112 in an additional inclination direction DAI1 when viewed in the pivot axial direction D3 along the pivot axis PA3. The inclination direction DI1 is directed toward the pivot axle 122 from the cleat receiving surface 180b. Preferably, the additional inclination direction DAI1 is different from the inclination direction DI1.

As seen in FIGS. 19 and 21, a shape of the cleat engagement portion 180 and a shape of the additional cleat engagement portion 181 are substantially symmetrical with respect to the pivot axis PA3. In other words, a shape of the cleat engagement portion 180 and a shape of the additional cleat engagement portion 181 are substantially symmetrical with respect to the center plane CP. The cleat engagement portion 180 and the additional cleat engagement portion 181 are symmetrically disposed with respect to the pivot axis PA3. More specifically, as seen in FIG. 21, the additional cleat engagement portion 181 includes an additional cleat engagement surface 181a and an additional cleat receiving surface 181b. That is, the second engagement member 118 has the additional cleat engagement surface 181a and the additional cleat receiving surface 181b. The additional cleat receiving surface 181b is inclined toward the pedal body 112 in a secondary inclination direction DI2 that is slanted from the slide direction DS3. The additional cleat engagement surface 181a faces toward the pedal body 112 and is inclined toward the pedal body 112 in a secondary additional inclination direction DAI2 when viewed in the pivot axial direction D3 along the pivot axis PA3. The secondary inclination direction DI2 is directed toward the pivot axle 122 from the additional cleat receiving surface 181b. Preferably, the secondary additional inclination direction DAI2 is different from the secondary inclination direction DI2.

As seen in FIG. 19, the second coupling portion 184 is provided opposite to the first coupling portion 182 in a pivot axial direction D3 parallel to the pivot axis PA3. The second coupling portion 184 is provided opposite to the first coupling portion 182 with respect to the pedal axis A11. A shape of the second coupling portion 184 is substantially the same as a shape of the first coupling portion 182. As seen in FIG. 21, the first coupling portion 182 has an opening 182a to which the pivot axle 122 is disposed. That is, the first engagement member 114 has the opening 182a to which the pivot axle 122 is disposed. The opening 182a is elongated in an elongating direction DE3. That is, the opening 182a of the first engagement member 114 is elongated in the elongating direction DE3. The opening 182a is elongated in a first additional elongating direction DEA1 that is different from the elongating direction DE3. Preferably, the first additional elongating direction DEA1 extends toward the cleat engagement surface 180a. Since an outer surface of the pivot axle 122 is a cylindrical surface and the first engagement member 114 can slide in the slide direction DS3 and the additional slide direction D41 with having an arbitrary orientation such that a peripheral wall of the opening 182a abuts against the pivot axle 122, the slide direction DS3 and the additional slide direction D41 is substantially the same as the elongating direction DE3 and the first additional elongating direction DEA1, respectively while the first engagement member 114 has the arbitrary orientation. Accordingly, the opening 182a of the first engagement member 114 is elongated at least in the slide direction DS3 after the first engagement member 114 pivots in the pivot direction DP3. The opening 182a of the first engagement member 114 is elongated in the slide direction DS3 and in the additional slide direction DS41 that is different from the slide direction DS3. Preferably, the additional slide direction DS41 extends towards the cleat engagement surface 180a. Since a shape of the second coupling portion 184 is substantially the same as a shape of the first coupling portion 182, the second coupling portion 184 has an opening whose shape is substantially the same as the shape of the opening 182a.

As seen in FIG. 19, the additional second coupling portion 185 is provided opposite to the additional first coupling portion 183 in the pivot axial direction D3. The additional second coupling portion 185 is provided opposite to the additional first coupling portion 183 with respect to the pedal axis A11. The first coupling portion 182 and the second coupling portion 184 are sandwiched by the additional first coupling portion 183 and the additional second coupling portion 185 in the pivot axial direction D3. A shape of the additional second coupling portion 185 is substantially the same as a shape of the additional first coupling portion 183. As seen in FIG. 21, the additional first coupling portion 183 has an opening 183*a* to which the pivot axle 122 is disposed. That is, the second engagement member 118 has the opening 183*a* to which the pivot axle 122 is disposed. The opening 183*a* is elongated in the elongating direction DE3. That is, the opening 183*a* of the second engagement member 118 is elongated in the elongating direction DE3. The opening 183*a* is elongated in a second additional elongating direction DEA2 that is different from the elongating direction DE3. In the illustrated embodiment, the second additional elongating direction DEA2 is different from the first additional elongating direction DEA1. However, the second additional elongating direction DEA2 can be the same as the first additional elongating direction DEA1. For example, the first additional elongating direction DEA1 and the second additional elongating direction DEA2 can be a direction perpendicular to the elongating direction DE3 and the pivot axial direction D3. Preferably, the first additional elongating direction DEA1 and the second additional elongating direction DEA2 is substantially symmetrical with respect to the center plane CP. Preferably, the second additional elongating direction DEA2 extends toward the additional cleat engagement surface 181*a*. Since the outer surface of the pivot axle 122 is a cylindrical surface and the second engagement member 118 can slide in the slide direction DS3 and the secondary additional slide direction D42 with having an arbitrary orientation such that a peripheral wall of the opening 183*a* abuts against the pivot axle 122, the slide direction DS3 and the secondary additional slide direction D42 is substantially the same as the elongating direction DE3 and the second additional elongating direction DEA2, respectively while the second engagement member 118 has the arbitrary orientation. Accordingly, the opening 183*a* of the second engagement member 118 is elongated at least in the slide direction DS3 after the second engagement member 118 pivots in the pivot direction DP3. The opening 183*a* of the second engagement member 118 is elongated in the slide direction DS3 and in the secondary additional slide direction DS42 that is different from the slide direction DS3. Preferably, the secondary additional slide direction DS42 extends towards the additional cleat engagement surface 181*a*. Since a shape of the additional second coupling portion 185 is substantially the same as a shape of the additional first coupling portion 183, the additional second coupling portion 185 has an opening whose shape is substantially the same as the shape of the opening 183*a*.

Figure 22:
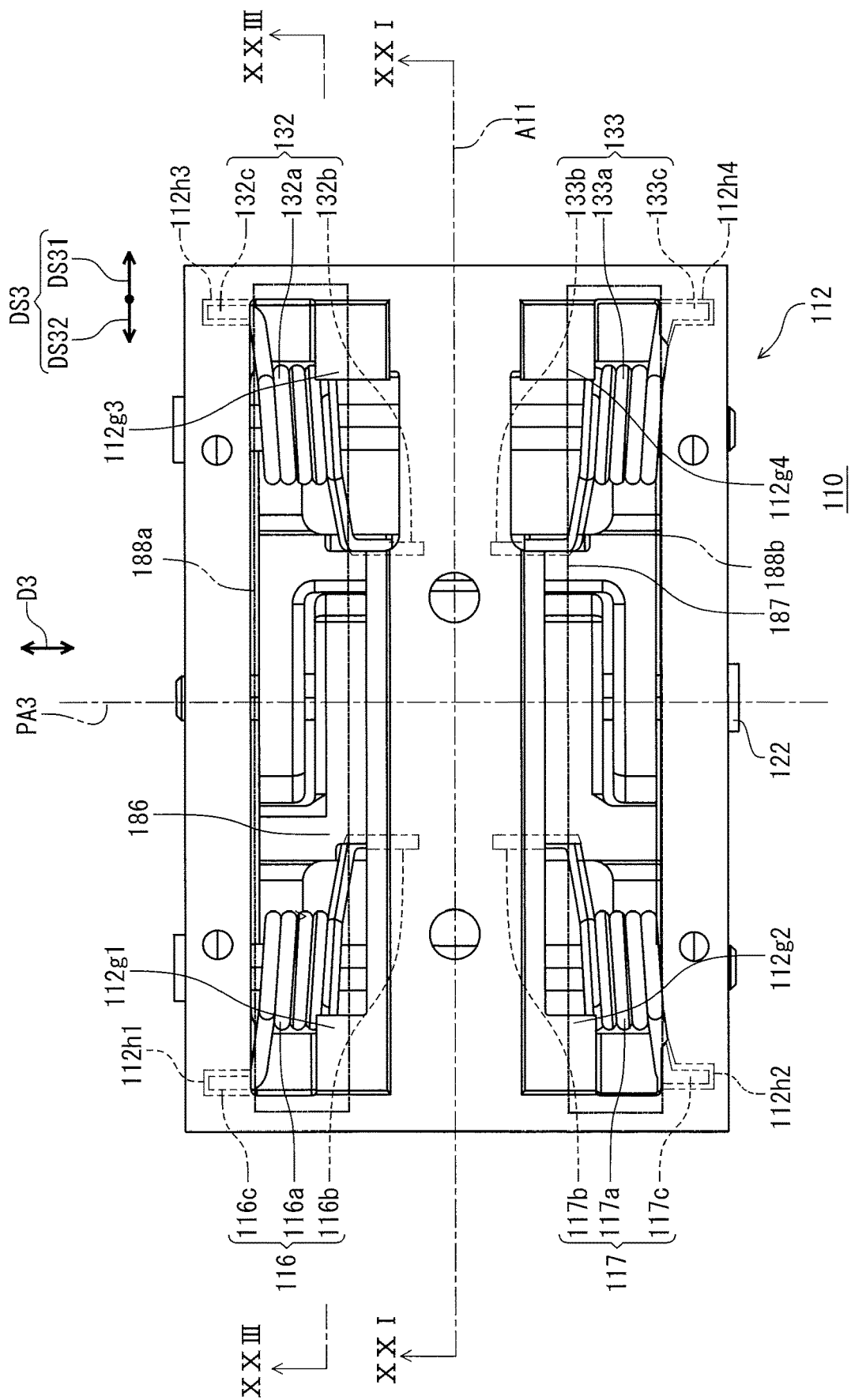
FIG. 22 is a bottom view of the bicycle pedal illustrated in FIG. 18.
Figure 23:
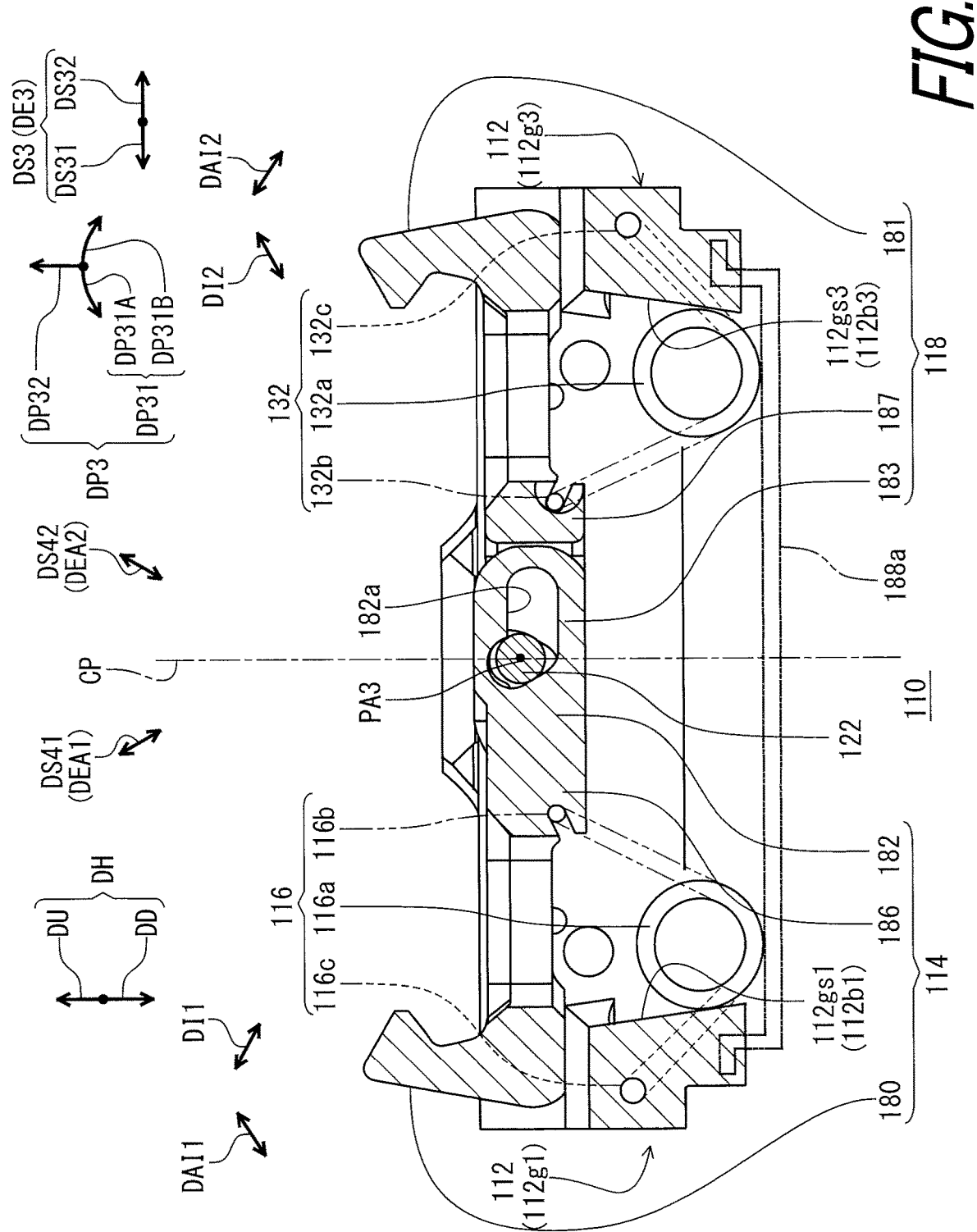
FIG. 23 is a cross-sectional view of the bicycle pedal taken along line XXIII-XXIII of FIG. 22.

As seen in FIG. 22, the biasing member 116 has a biasing body 116*a*, a first biasing end 116*b*, and a second biasing end 116*c* opposite to the first biasing end 116*b* with respect to the biasing body 116*a*. As seen in FIGS. 21 to 23, the biasing body 116*a* is coupled to the pedal body 112. The first biasing end 116*b* is hooked by the biasing member hook portion 186 of the first engagement member 114. That is, the first biasing end 116*b* is in contact with the first engagement member 114. The second biasing end 116*c* is inserted into a hole 112*h*1 of the pedal body 112. That is, the second biasing end 116*c* is in contact with the pedal body 112. The pedal body 112 includes a guide portion 112*g*1 having a guide surface 112*gs*1 on which the biasing body 116*a* abuts the guide surface 112*gs*1 such that the biasing body 116*a* slides on the guide surface 112*gs*1. The guide surface 112*gs*1 is inclined toward a downward direction DD opposite to an upward direction DU directed to the first engagement member 114 and toward the center plane CP. The upward direction DU and the downward direction DD are parallel to the height direction DH and perpendicular to the slide direction DS3 and the pivot axial direction D3. Accordingly, the guide surface 112*gs*1 guides the biasing body 116*a* in the downward direction DD while the first engagement member 114 moves from the clamping position PC3 toward the releasing position PR3. The biasing body 116*a* is immovable away from the pivot axle 122 in the slide direction DS3 while the first engagement member 114 slides from the clamping position PC3 toward the releasing position PR3 in the slide direction DS3. Further, the guide surface 112*gs*1 biases the biasing body 116*a* toward the upward direction DU. Accordingly, the guide surface 112*gs*1 can be referred to as a biasing portion 112*b*1 configured to bias the biasing body 116*a* toward the upward direction DU. Due to such function of the guide surface 112*gs*1 and restoring force of the biasing member 116, the biasing member 116 biases the first engagement member 114 toward the clamping position PC3.

As seen in FIG. 22, the bicycle pedal 110 further comprises a secondary biasing member 117, an additional biasing member 132, and an additional secondary biasing member 133. The secondary biasing member 117 together with the biasing member 116 biases the first engagement member 114 toward the clamping position PC3. The additional biasing member 132 together with the additional secondary biasing member 133 biases the second engagement member 118 toward the additional clamping position PC4. The structures of the secondary biasing member 117, the additional biasing member 132, and the additional secondary biasing member 133 are substantially the same as the structure of the biasing member 116. The secondary biasing member 117 has a secondary biasing body 117*a*, a first secondary biasing end 117*b*, and a second secondary biasing end 117*c* opposite to the first secondary biasing end 117*b* with respect to the secondary biasing body 117*a*. The first secondary biasing end 117*b* is hooked by the biasing member hook portion 186 of the first engagement member 114. The second secondary biasing end 117*c* is inserted into a hole 112*h*2 of the pedal body 112. The additional biasing member 132 has an additional biasing body 132*a*, an additional first biasing end 132*b*, and an additional second biasing end 132*c* opposite to the additional first biasing end 132*b* with respect to the additional biasing body 132*a*. The additional first biasing end 132*b* is hooked by the additional biasing member hook portion 187 of the second engagement member 118. The additional second biasing end 132*c* is inserted into a hole 112*h*3 of the pedal body 112. The additional secondary biasing member 133 has an additional secondary biasing body 133*a*, an additional first secondary biasing end 133*b*, and an additional second secondary biasing end 133*c* opposite to the additional first secondary biasing end 133*b* with respect to the additional secondary biasing body 133*a*. The additional first secondary biasing end 133*b* is hooked by the additional biasing member hook portion 187 of the second engagement member 118. The additional second secondary biasing end 133*c* is inserted into a hole 112*h*4 of the pedal body 112.

The pedal body 112 includes a secondary guide portion 112*g*2 having a secondary guide surface (not shown) on which the secondary biasing body 117*a* abuts such that the secondary biasing body 117*a* slides on the secondary guide surface. The pedal body 112 includes an additional guide portion 112*g*3 having an additional guide surface 112*gs*3 (FIG. 23) on which the additional biasing body 132*a* abuts such that the additional biasing body 132a slides on the additional guide surface 112gs3. The pedal body 112 includes an additional secondary guide portion 112g4 having an additional secondary guide surface (not shown) on which the additional secondary biasing body 133a abuts such that the additional secondary biasing body 133a slides on the additional secondary guide surface. The functions of the secondary guide portion 112g2, the additional guide portion 112g3, the additional secondary guide portion 112g4 are substantially the same as the function of the guide portion 112g1. Accordingly, the detailed explanation of the secondary guide portion 112g2, the additional guide portion 112g3, the additional secondary guide portion 112g4 is omitted.

Further, as seen in FIGS. 22 and 23, the bicycle pedal 110 can further comprise a first extra biasing member 188a and a second extra biasing member 188b. The first extra biasing member 188a and the second extra biasing member 188b are, for example, plate springs. The first extra biasing member 188a is attached to the pedal body 112 and in contact with the biasing member 116 and the additional biasing member 132 to push the biasing member 116 and the additional biasing member 132 to the upward direction DU. The second extra biasing member 188b is attached to the pedal body 112 and in contact with the secondary biasing member 117 and the additional secondary biasing member 133 to push the secondary biasing member 117 and the additional secondary biasing member 133 to the upward direction DU. Accordingly, the first extra biasing member 188a and the second extra biasing member 188b can increase the biasing forces of the biasing member 116, the secondary biasing member 117, the additional biasing member 132, and the additional secondary biasing member 133. In the illustrated embodiment, the first extra biasing member 188a and the second extra biasing member 188b are separated from each other, but the first extra biasing member 188a and the second extra biasing member 188b can be integrated into a one-piece unitary member.

Figure 24:
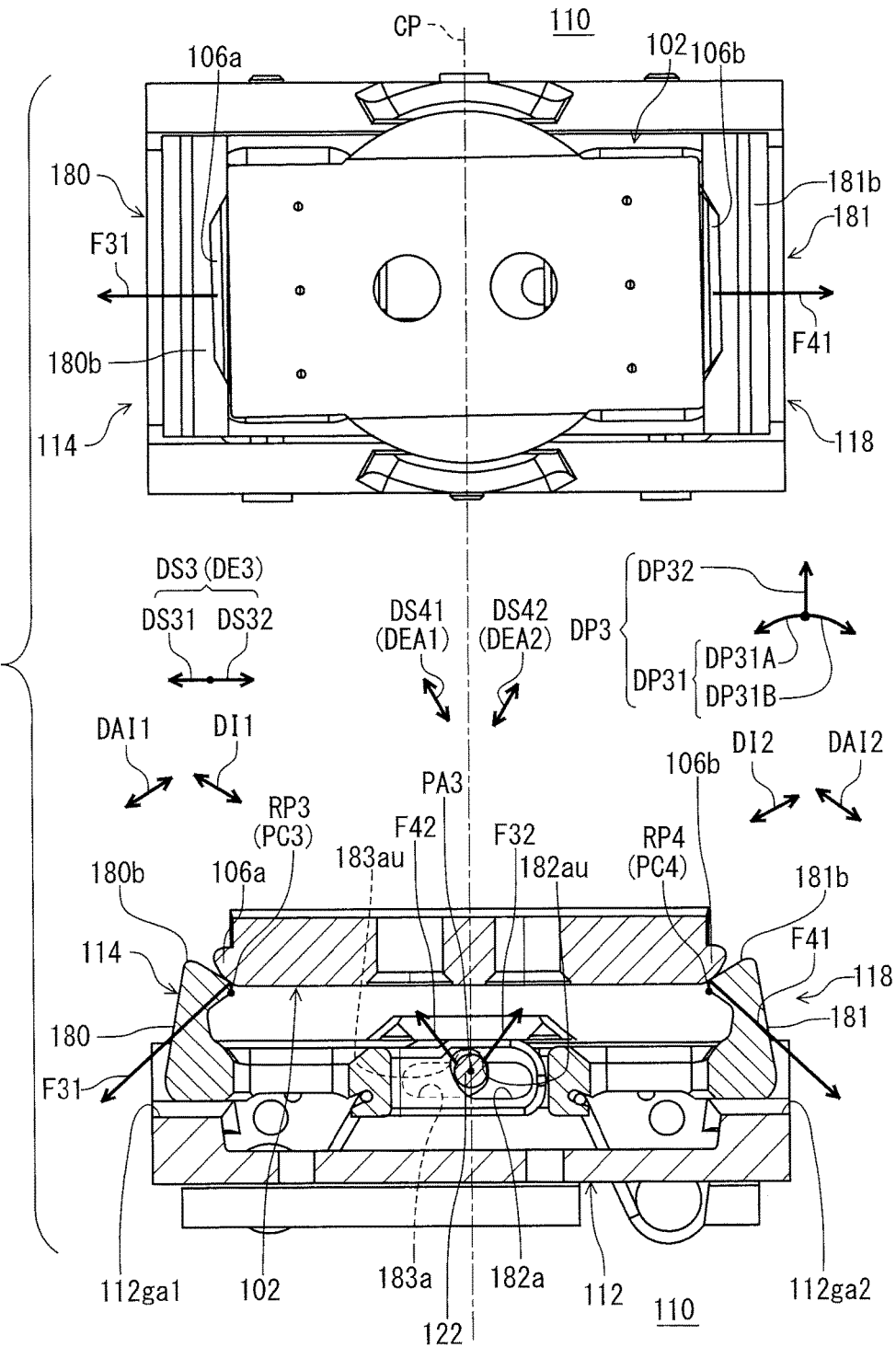
FIG. 24 includes a top view and a cross-sectional view of the bicycle pedal illustrated in FIG. 18 for explaining a step-in operation of the bicycle pedal.

As seen in FIG. 24, at the beginning of the step-in operation, the user puts the bicycle cleat 102 on the cleat receiving surface 180b of the first engagement member 114 and the additional cleat receiving surface 181b of the second engagement member 118. Since the cleat receiving surface 180b is inclined in the inclination direction DI1 and the additional cleat receiving surface 181b is inclined in the secondary inclination direction DI2, forces F31 and F41 are applied to the cleat receiving surface 180b of the first engagement member 114 and the additional cleat receiving surface 181b of the second engagement member 118, respectively. Then, the pivot axle 122 hits on an upper surface 182au of the opening 182a of the first engagement member 114 and an upper surface 183au of the opening 183a of the second engagement member 118. Accordingly, the pivot axle 122 applies forces F32 to the first coupling portion 182 and the second coupling portion 184 of the first engagement member 114, and the pivot axle 122 applies forces F42 to the additional first coupling portion 183 and the additional second coupling portion 185 of the second engagement member 118. Then, the first engagement member 114 pivots in the pivot direction DP3 (more specifically the first pivot direction DP31A), and the second engagement member 118 pivots in the pivot direction DP3 (more specifically the second pivot direction DP31B).

Figure 25:
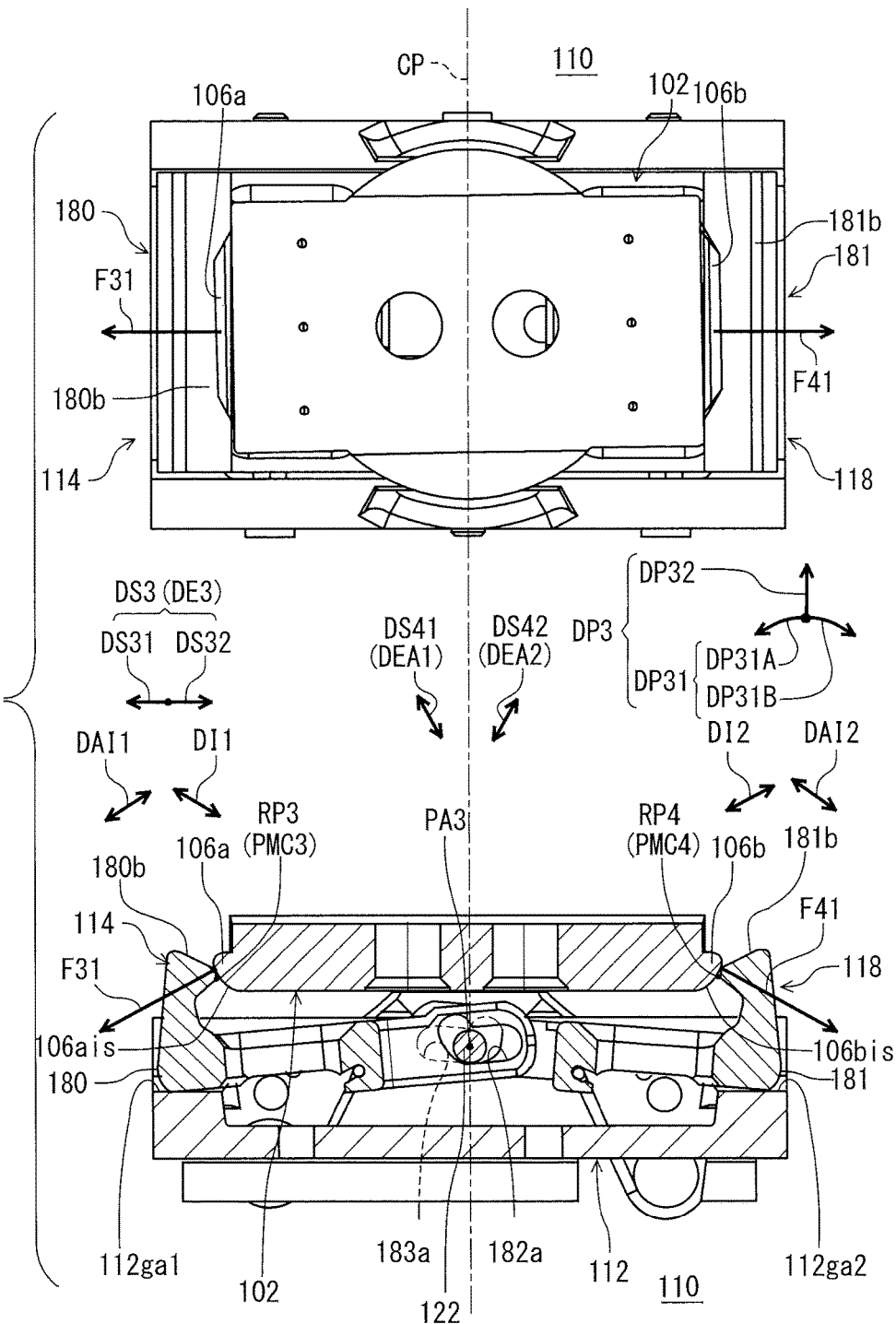
FIG. 25 includes a top view and a cross-sectional view of the bicycle pedal illustrated in FIG. 18 for explaining a step-in operation of the bicycle pedal.

Then, as seen in FIG. 25, the first engagement member 114 contacts the first engagement member abutting portion 112ga1 of the pedal body 112 when the first engagement member 114 reaches the movement change position PMC3. Since the first engagement member abutting portion 112ga1 obstructs further pivotal movement of the first engagement member 114 in the first pivot direction DP31A, the first engagement member 114 slides in the slide direction DS3 (more specifically the first slide direction DS31) from the movement change position PMC3 to the releasing position PR3 with abutting on the first engagement member abutting portion 112ga1. When the first engagement member 114 slides in the slide direction DS3, an edge of the cleat engagement surface 180a slides on the first insertion surface 106ais of the first pedal engagement portion 106a of the bicycle cleat 102. Similarly, the second engagement member 118 contacts the second engagement member abutting portion 112ga2 of the pedal body 112 when the second engagement member 118 reaches the additional movement change position PMC4. Since the second engagement member abutting portion 112ga2 obstructs further pivotal movement of the second engagement member 118 in the second pivot direction DP31B, the second engagement member 118 slides in the slide direction DS3 (more specifically the second slide direction DS32) from the additional movement change position PMC4 to the additional releasing position PR4 with abutting on the second engagement member abutting portion 112ga2. When the second engagement member 118 slides in the slide direction DS3, an edge of the additional cleat engagement surface 181a slides on the second insertion surface 106bis of the second pedal engagement portion 106b of the bicycle cleat 102.

Figure 26:
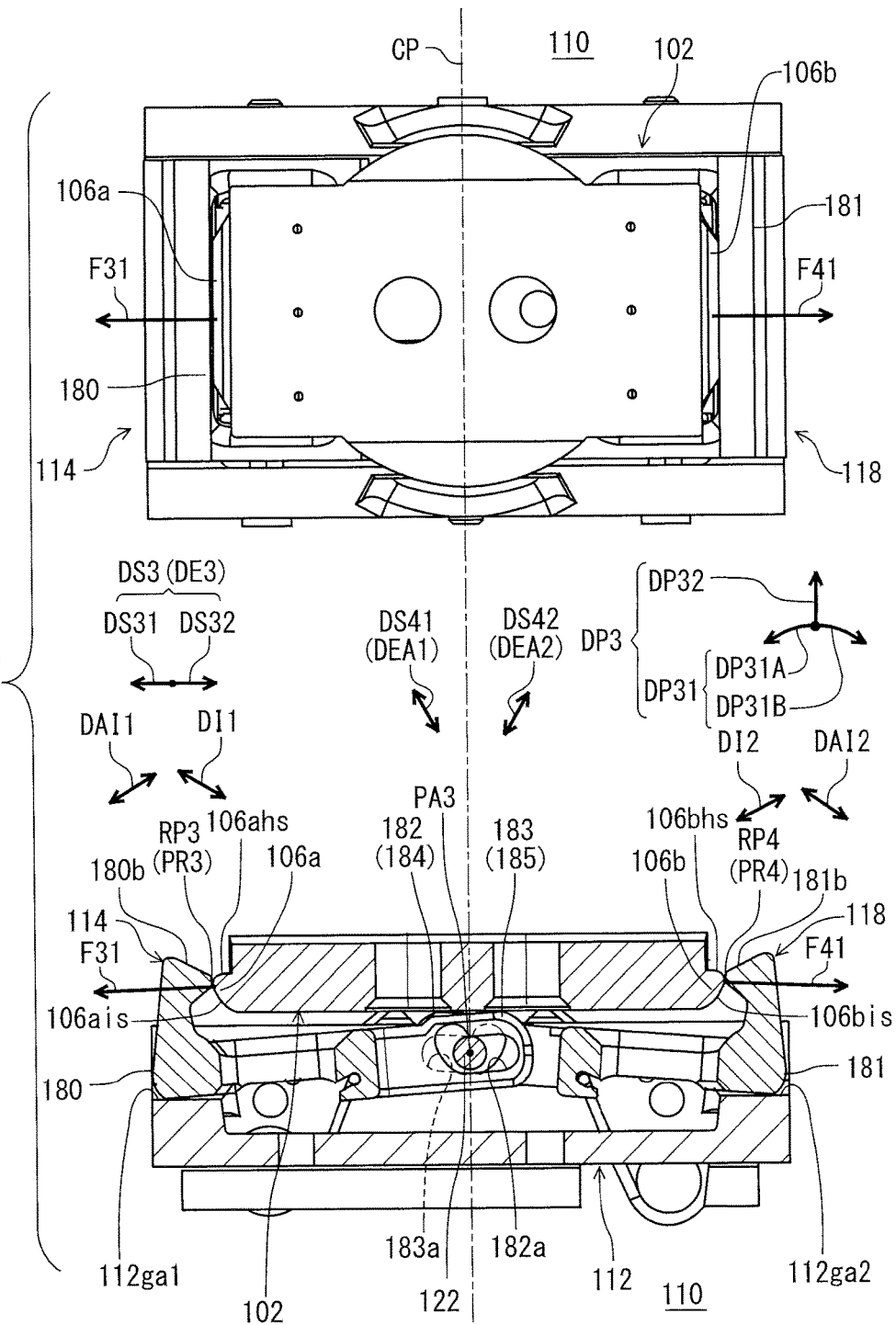
FIG. 26 includes a top view and a cross-sectional view of the bicycle pedal illustrated in FIG. 18 for explaining a step-in operation of the bicycle pedal.

Then, as seen in FIG. 26, when the first engagement member 114 reaches the releasing position PR3 and the second engagement member 118 reaches the additional releasing position PR4, the first pedal engagement portion 106a does not overlap with the cleat engagement portion 180 of the first engagement member 114 and the second pedal engagement portion 106b does not overlap with the additional cleat engagement portion 181 of the second engagement member 118 as viewed in the height direction DH. When the first engagement member 114 reaches the vicinity of the releasing position PR3, the bicycle cleat 102 can contact the first coupling portion 182 and the second coupling portion 184 and push them downward to start pivoting about the pivot axis PA3. When the second engagement member 118 reaches the vicinity of the additional releasing position PR4, the bicycle cleat 102 can contact the additional first coupling portion 183 and the additional second coupling portion 185 and push them downward to start pivoting about the pivot axis PA3.

Figure 27:
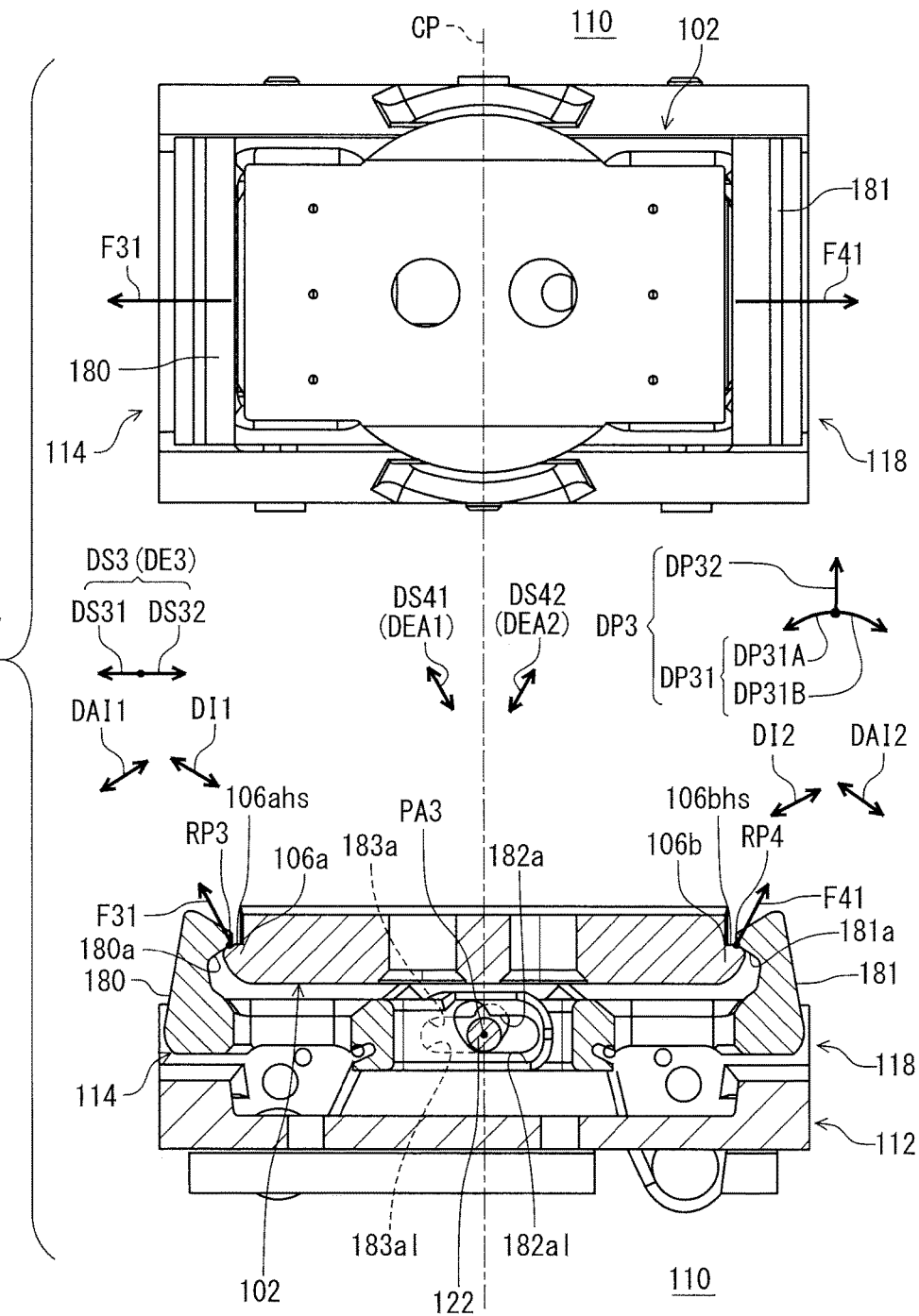
FIG. 27 includes a top view and a cross-sectional view of the bicycle pedal illustrated in FIG. 18 for explaining a step-in operation of the bicycle pedal.

Then, when the bicycle cleat 102 approaches the bicycle pedal 110 as seen in FIG. 27, the first engagement member 114 and the second engagement member 118 can pivot and slide in the slide direction DS3. In this situation, the elongating direction DE3 of the openings 182a and 183a can become substantially parallel to the slide direction DS3 in which the first engagement member abutting portion 112ga1 and the second engagement member abutting portion 112ga2 of the pedal body 112 extend, because upward forces F31 and F41 are applied to the cleat engagement surface 180a of the first engagement member 114 and the additional cleat engagement surface 181a of the second engagement member 118 from the first hook surface 106ahs of the first pedal engagement portion 106a and the second hook surface 106bhs of the second pedal engagement portion 106b, respectively. The upward forces F31 and F41 is applied because the cleat engagement surface 180a is inclined toward the pedal body 112 in the additional inclination direction DAI1 and the additional cleat engagement surface 181a is inclined in the secondary additional inclination direction DAI2. Since upward forces F31 and F41 is applied to the cleat engagement surface 180a of the first engagement member 114 and the additional cleat engagement surface 181a of the second engagement member 118, the pivot axle 122 abuts a lower surface 182a1 of the opening 182a of the first engagement member 114 and a lower surface 183a1 of the opening 183a of the second engagement member 118.

Figure 28:
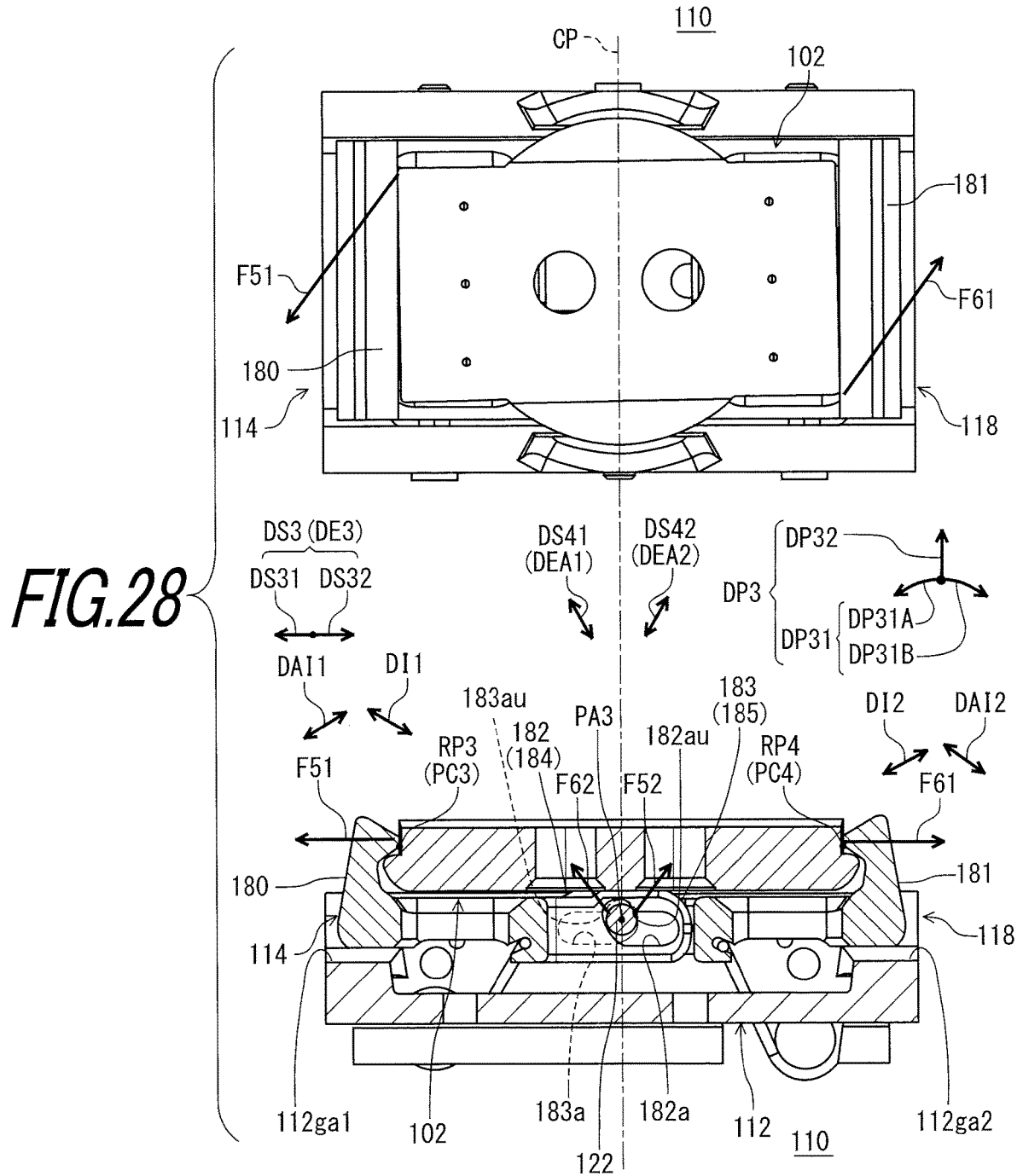
FIG. 28 includes a top view and a cross-sectional view of the bicycle pedal illustrated in FIG. 18 for describing a state in which the bicycle pedal engages with the bicycle cleat.
Figure 29:
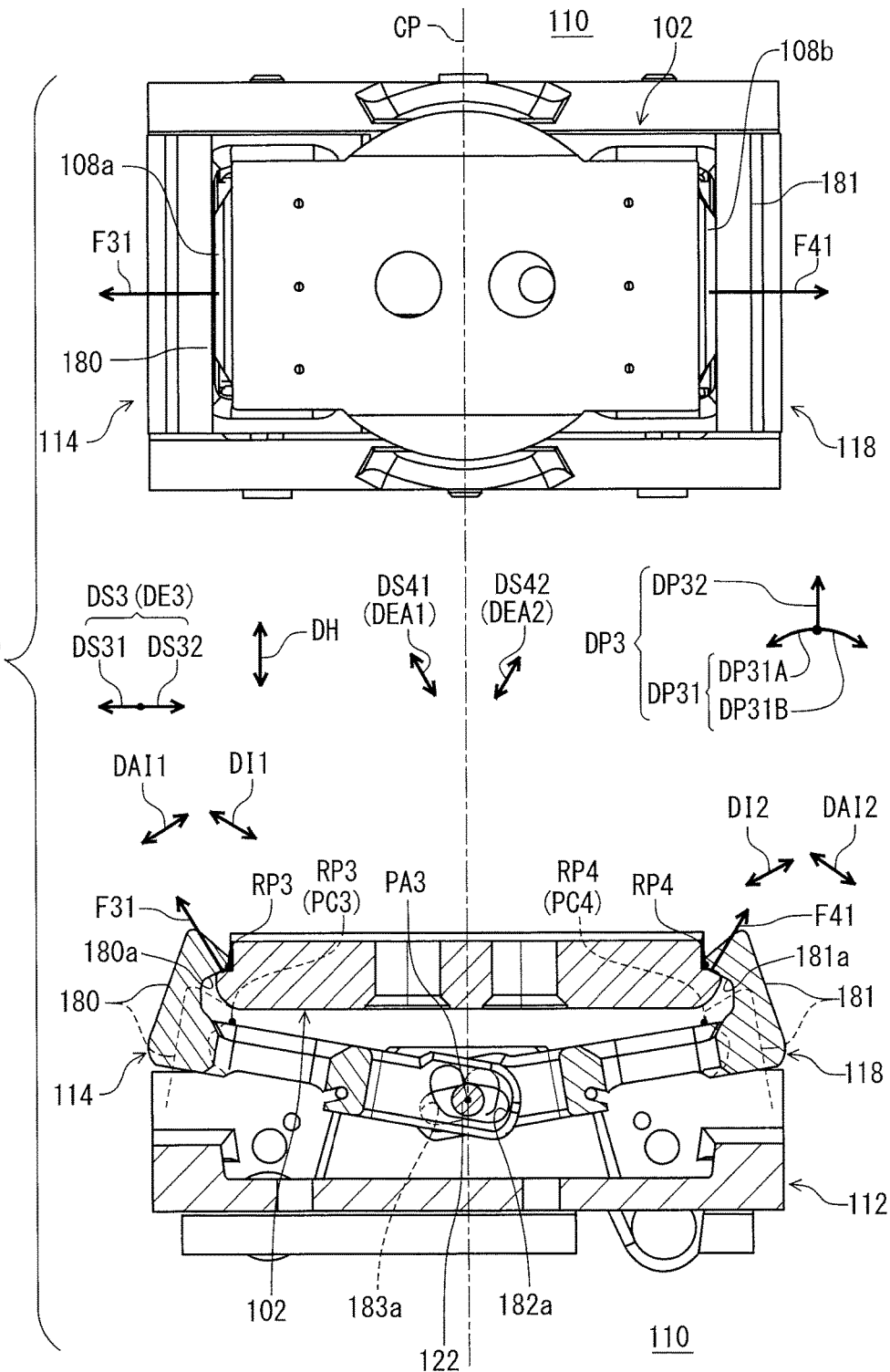
FIG. 29 includes a top view and a cross-sectional view of the bicycle pedal illustrated in FIG. 18 for explaining movement of the bicycle pedal when the bicycle cleat is moved apart from the bicycle pedal.

Then, finally the bicycle cleat 102 is engaged with the bicycle pedal 110 as shown in FIG. 28. After the bicycle cleat 102 is engaged with the bicycle pedal 110, as seen in FIG. 29, the cleat engagement surface 180a is configured to move apart from the pedal body 112 in the second pivot direction DP32 when the first engagement member 114 is in the clamping position PC3. More specifically, the cleat engagement surface 180a of the first engagement member 114 and the additional cleat engagement surface 181a of the second engagement member 118 pivot in the second pivot direction DP32 to tightly fasten the bicycle cleat 102 when the bicycle cleat 102 moves apart from the bicycle pedal 110 in the height direction DH. Accordingly, the bicycle pedal 110 can prevent the bicycle cleat 102 from being accidentally disengaged from the bicycle pedal 110.

Figure 30:
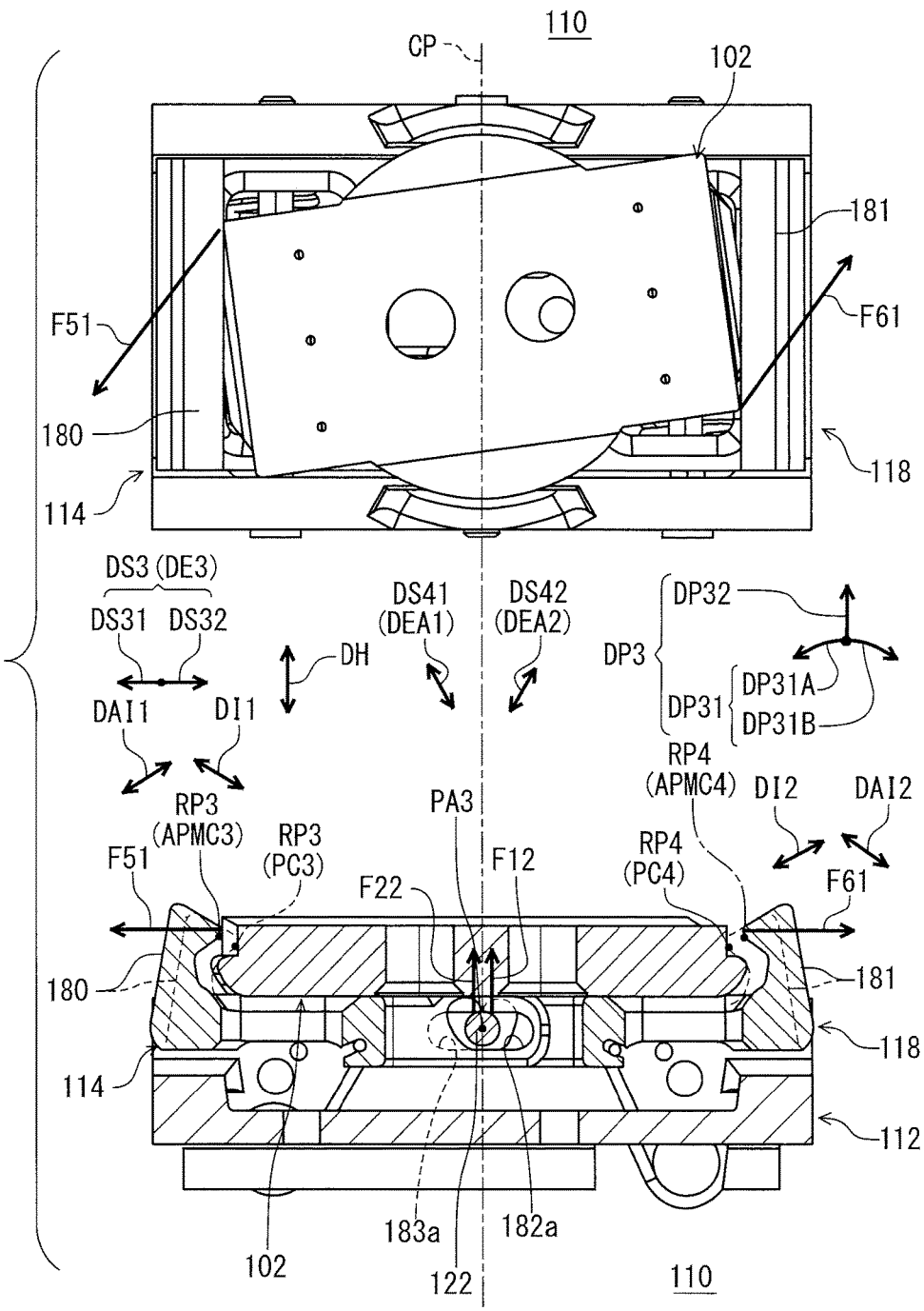
FIG. 30 includes a top view and a cross-sectional view of the bicycle pedal illustrated in FIG. 18 for explaining a step-out operation of the bicycle pedal.

As seen in FIG. 28, at the beginning of the step-out operation, the user turns around the bicycle cleat 102, thereby forces F51 and F61 are applied to the cleat engagement portion 180 of the first engagement member 114 and the additional cleat engagement portion 181 of the second engagement member 118, respectively. Then, the pivot axle 122 hits on an upper surface 182au of the opening 182a of the first engagement member 114 and an upper surface 183au of the opening 183a of the second engagement member 118. Accordingly, the pivot axle 122 applies forces F52 to the first coupling portion 182 and the second coupling portion 184 of the first engagement member 114, and the pivot axle 122 applies forces F62 to the additional first coupling portion 183 and the additional second coupling portion 185 of the second engagement member 118. In this case, since the bicycle cleat 102 contacts the first coupling portion 182, the additional first coupling portion 183, the second coupling portion 184, and the additional second coupling portion 185 to push them downward, the first engagement member 114 is likely to slide in the additional slide direction DS41, and the second engagement member 118 is likely to slide in the secondary additional slide direction DS42. However, when the bicycle cleat 102 rotates with separating from the first coupling portion 182, the additional first coupling portion 183, the second coupling portion 184, and the additional second coupling portion 185, the first engagement member 114 and the second engagement member 118 may pivot a little. Then, as seen in FIG. 30, the first engagement member 114 and the second engagement member 118 are moved to upper positions APMC3, APMC4, respectively. Hereinafter, an upper position APMC3 can be referred to as a secondary movement change position APMC3. An upper position APMC4 can be referred to as a secondary additional movement change position APMC4. When the first engagement member 114 reaches the secondary movement change position APMC3, the elongating direction DE3 of the opening 182a of the first engagement member 114 can become substantially parallel to the slide direction DS3 in which the first engagement member abutting portion 112ga1 of the pedal body 112 extends. When the second engagement member 118 reaches the secondary additional movement change position APMC4, the elongating direction DE3 of the opening 183a of the second engagement member 118 can become substantially parallel to the slide direction DS3 in which the second engagement member abutting portion 112ga2 of the pedal body 112 extends. Accordingly, the first engagement member 114 can slide in the slide direction DS3 (more specifically the first slide direction DS31) from the secondary movement change position APMC3, and the second engagement member 118 can slide in the slide direction DS3 (more specifically the second slide direction DS32) from the secondary additional movement change position APMC4.

After the first engagement member 114 slides in the slide direction DS3 (the first slide direction DS31) from the secondary movement change position APMC3 to reach another releasing position APR3 and the second engagement member 118 slides in the slide direction DS3 (the second slide direction DS32) from the secondary additional movement change position APMC4 to reach another additional releasing position APR4, as seen in FIG. 31, the first pedal engagement portion 106a does not overlap with the cleat engagement portion 180 of the first engagement member 114 and the second pedal engagement portion 106b does not overlap with the additional cleat engagement portion 181 of the second engagement member 118 as viewed in the height direction DH. Accordingly, the user can release the bicycle cleat 102 from the bicycle pedal 110 by moving the bicycle cleat 102 in the upward direction DU.

Examples shown in FIGS. 24 to 31 are examples in which the user applies force equally to the first engagement member 114 and the second engagement member 118. So, the first engagement member 114 and the second engagement member 118 might move differently from examples shown in FIGS. 24 to 31 especially when the user apply force mainly to one of the first engagement member 114 and the second engagement member 118.

With the bicycle pedal 110, the first engagement member 114 is pivotable about the pivot axis PA3 in the pivot direction DP3 and slidable in the slide direction DS3 between the clamping position PC3 and the releasing position PR3. The slide direction DS3 is different from the pivot direction DP3. Accordingly, it is possible to prevent superfluous twist of the biasing member 116 to decrease superfluous repulsive force from the biasing member 116 when the bicycle cleat 102 is mounted onto and released from the bicycle pedal 110. Therefore, it is possible to smoothly mount the bicycle cleat 102 onto the bicycle pedal 110 and release the bicycle cleat 102 from the bicycle pedal 110, because the first engagement member 114 is pivotable and slidable.

Modifications

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the terra "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle pedal comprising:
a pedal body;
a first engagement member movably coupled to the pedal body between a clamping position and a releasing position, the first engagement member being pivotable about a pivot axis in a pivot direction and slidable in a slide direction between the clamping position and the releasing position, the slide direction being different from the pivot direction; and
a biasing member biasing the first engagement member toward the clamping position,
wherein the first engagement member is positioned at the clamping position in a state where a bicycle cleat is clamped by the first engagement member.

2. The bicycle pedal according to claim 1, wherein
the first engagement member slides in the slide direction after pivoting in the pivot direction during a releasing operation in which the first engagement member moves from the clamping position toward the releasing position.

3. The bicycle pedal according to claim 1, wherein
the first engagement member pivots in the pivot direction after sliding in the slide direction during a clamping operation in which the first engagement member moves from the releasing position toward the clamping position.

4. The bicycle pedal according to claim 1, wherein
the pedal body includes a pivot axle that defines the pivot axis, and
the first engagement member has an opening to which the pivot axle is disposed.

5. The bicycle pedal according to claim 4, wherein
an outer surface of the pivot axle is a cylindrical surface.

6. The bicycle pedal according to claim 1, wherein
an opening of the first engagement member is elongated at least in the slide direction after the first engagement member pivots in the pivot direction.

7. The bicycle pedal according to claim 6, wherein
the opening of the first engagement member is elongated in an additional slide direction that is different from the slide direction.

8. The bicycle pedal according to claim 1, wherein
the biasing member has a biasing body, a first biasing end, and a second biasing end opposite to the first biasing end with respect to the biasing body,
the first biasing end contacts the first engagement member,
the second biasing end contacts the pedal body,
the biasing body is coupled to the pedal body such that the biasing body is immovable away from the pivot axle in the slide direction while the first engagement member slides from the clamping position toward the releasing position in the slide direction.

9. The bicycle pedal according to claim 1, further comprising:
a pedal axle having a pedal axis,
wherein the slide direction is perpendicular to the pedal axis.

10. The bicycle pedal according to claim 1, further comprising:
a second engagement member coupled to the pedal body,
wherein the second engagement member is pivotally coupled to the pedal body about the pivot axis between an additional clamping position and an additional releasing position.

11. The bicycle pedal according to claim 10, wherein
the second engagement member is pivotable in the pivot direction and slidable in the slide direction between the additional clamping position and the additional releasing position.

12. The bicycle pedal according to claim 1, wherein
the first engagement member is a one-piece unitary member.

13. A bicycle pedal comprising:
a pedal body;
a first engagement member movably coupled to the pedal body between a clamping position and a releasing position, the first engagement member being pivotable about a pivot axis in a pivot direction and slidable in a slide direction between the clamping position and the releasing position, the slide direction being different from the pivot direction;
a biasing member biasing the first engagement member toward the clamping position; and
a pedal axle having a pedal axis, wherein
the slide direction is parallel to the pedal axis.

14. A bicycle pedal comprising:
a pedal body;
a first engagement member movably coupled to the pedal body between a clamping position and a releasing position, the first engagement member being pivotable about a pivot axis in a pivot direction and slidable in a slide direction between the clamping position and the releasing position, the slide direction being different from the pivot direction; and
a biasing member biasing the first engagement member toward the clamping position,
wherein the pedal body includes a restriction member that prevents the first engagement member from sliding in the slide direction during a pivotal movement of the first engagement member in the pivot direction.

15. The bicycle pedal according to claim 14, wherein
the first engagement member is configured to abut against the restriction member such that the first engagement member does not slide in the slide direction during the pivotal movement of the first engagement member in the pivot direction.

16. The bicycle pedal according to claim 14, wherein
the first engagement member has a first contact portion,
the restriction member has a second contact portion to contact the first contact portion during a pivotal movement of the first engagement member in the pivot direction, and at least one of the first contact portion and the second contact portion has curvature.

17. A bicycle pedal comprising:
a pedal body;
a first engagement member movably coupled to the pedal body between a clamping position and a releasing position, the first engagement member being pivotable about a pivot axis in a pivot direction and slidable in a slide direction between the clamping position and the releasing position, the slide direction being different from the pivot direction; and
a biasing member biasing the first engagement member toward the clamping position, wherein
the first engagement member has a cleat engagement surface,
the pivot direction is a bidirectional direction including a first pivot direction and a second pivot direction opposite to the first pivot direction, and
the cleat engagement surface is configured to move apart from the pedal body in the first pivot direction when the first engagement member is in the clamping position.

18. The bicycle pedal according to claim 17, wherein the first engagement member at least slides in the slide direction during a releasing operation in which the first engagement member moves from the clamping position toward another releasing position.

19. The bicycle pedal according to claim 17, wherein an opening of the first engagement member is elongated in the slide direction and in an additional slide direction that is different from the slide direction.

20. The bicycle pedal according to claim 19, wherein the additional slide direction extends toward the cleat engagement surface.

21. The bicycle pedal according to claim 17, wherein the first engagement member has a cleat receiving surface inclined toward the pedal body in an inclination direction that is slanted from the slide direction.

22. The bicycle pedal according to claim 17, wherein the cleat engagement surface faces toward the pedal body and is inclined toward the pedal body in an additional inclination direction that is slanted from the slide direction when viewed in a pivot axial direction along the pivot axis.

23. A bicycle pedal comprising:
a pedal body;
a first engagement member movably coupled to the pedal body between a clamping position and a releasing position, the first engagement member being pivotable about a pivot axis in a pivot direction and slidable in a slide direction between the clamping position and the releasing position, the slide direction being different from the pivot direction;
a biasing member biasing the first engagement member toward the clamping position; and
a second engagement member coupled to the pedal body, wherein
the first engagement member has a cleat engagement portion,
the second engagement member has an additional cleat engagement portion, and
the cleat engagement portion and the additional cleat engagement portion are symmetrically disposed with respect to the pivot axis.

24. The bicycle pedal according to claim 23, wherein a shape of the cleat engagement portion and a shape of the additional cleat engagement portion are substantially symmetrical with respect to the pivot axis.

25. A bicycle pedal comprising:
a pedal body including a pivot axle that defines a pivot axis;
a first engagement member pivotally coupled to the pedal body about the pivot axis between a clamping position and a releasing position, the first engagement member having an opening to which the pivot axle is disposed, the opening of the first engagement member being elongated in an elongating direction; and
a biasing member biasing the first engagement member toward the clamping position,
wherein the first engagement member is positioned at the clamping position in a state where a bicycle cleat is clamped by the first engagement member.

26. The bicycle pedal according to claim 25, wherein the first engagement member is a one-piece unitary member.

27. A bicycle cleat comprising;
a main body configured to be attached to a sole of a bicycle shoe, the main body having a first end portion and a second end portion opposite to the first end portion in a first direction;
a first pedal engagement portion provided on the first end portion of the main body and extending in a second direction substantially perpendicular to the first direction; and
a second pedal engagement portion provided on the second end portion of the main body and extending in the second direction,
the main body comprising:
a third end portion connecting the first end portion and the second end portion; and
a fourth end portion connecting the first end portion and the second end portion opposite to the third end portion in the second direction,
the bicycle cleat comprising:
a first guided portion protruding from the third end portion of the main body in the second direction; and
a second guided portion protruding from the fourth end portion of the main body in the second direction, the first guided portion and the second guided portion having an arc shape such that the bicycle cleat is rotatable about a rotation center axis between the first guided portion and the second guided portion in the second direction, the first guided portion being configured to abut against a first guide portion of a bicycle pedal and the second guided portion being configured to abut against a second guide portion of the bicycle pedal,
the first pedal engagement portion being configured to engage with a bicycle pedal, and
the second pedal engagement portion being configured to engage with the bicycle pedal.

* * * * *